US012440766B2

(12) United States Patent
Fukada et al.

(10) Patent No.: US 12,440,766 B2
(45) Date of Patent: Oct. 14, 2025

(54) INFORMATION PROCESSING SYSTEM FOR BONDING OBJECTS IN A GAME SPACE

(71) Applicant: NINTENDO CO., LTD., Kyoto (JP)

(72) Inventors: Naoki Fukada, Kyoto (JP); Takahiro Takayama, Kyoto (JP); Yuya Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 417 days.

(21) Appl. No.: 18/304,241

(22) Filed: Apr. 20, 2023

(65) Prior Publication Data

US 2023/0277941 A1 Sep. 7, 2023

Related U.S. Application Data

(63) Continuation of application No. PCT/JP2022/009226, filed on Mar. 3, 2022.

(51) Int. Cl.

*A63F 13/577* (2014.01)
*A63F 13/5375* (2014.01)
*A63F 13/55* (2014.01)
*A63F 13/56* (2014.01)
*A63F 13/57* (2014.01)

(Continued)

(52) U.S. Cl.

CPC ........ *A63F 13/577* (2014.09); *A63F 13/5375* (2014.09); *A63F 13/55* (2014.09); *A63F 13/56* (2014.09); *A63F 13/57* (2014.09); *A63F 13/60* (2014.09); *A63F 13/63* (2014.09); *A63F 13/80* (2014.09); *A63F 13/52* (2014.09);

(Continued)

(58) Field of Classification Search

CPC .......... A63F 13/63; A63F 13/56; A63F 13/52; A63F 13/577; A63F 13/69; A63F 13/822; A63F 13/55; A63F 13/57; A63F 13/5375; A63F 13/60; A63F 13/80; A63F 2300/66; A63F 2300/64

See application file for complete search history.

(56) References Cited

U.S. PATENT DOCUMENTS 6,290,565 B1 * 9/2001 Galyean III ............ A63H 3/16 446/99
7,755,620 B2 * 7/2010 Scherer .................. G06T 19/00 345/157

(Continued)

FOREIGN PATENT DOCUMENTS

JP 2007-500906 1/2007
JP 2007-021248 2/2007

(Continued)

OTHER PUBLICATIONS

May 10, 2022 Written Opinion issued in International Application No. PCT/JP2022/009226, with English translation.

(Continued)

*Primary Examiner* — William H McCulloch, Jr.
(74) *Attorney, Agent, or Firm* — Nixon & Vanderhye PC

(57) ABSTRACT

An example of an information processing system selects a first object among a plurality of virtual objects by a selection operation of a user and generates a bonding object indicating respective bonding positions on the selected first object and a second object among the plurality of virtual objects. In accordance with a bonding instruction from the user, the first object and the second object are bonded to each other at the respective bonding positions.

23 Claims, 29 Drawing Sheets

(51) Int. Cl.

| | |
|---|---|
| ***A63F 13/60*** | (2014.01) |
| ***A63F 13/63*** | (2014.01) |
| ***A63F 13/80*** | (2014.01) |
| *A63F 13/52* | (2014.01) |
| *A63F 13/69* | (2014.01) |
| *A63F 13/822* | (2014.01) |

(52) U.S. Cl.
CPC ............. *A63F 13/69* (2014.09); *A63F 13/822* (2014.09); *A63F 2300/64* (2013.01); *A63F 2300/66* (2013.01)

(56) References Cited

U.S. PATENT DOCUMENTS

| | | | | |
|---|---|---|---|---|
| 7,874,921 | B2 * | 1/2011 | Baszucki | A63F 13/63 463/2 |
| 8,751,950 | B2 * | 6/2014 | Loberg | G06T 15/00 715/765 |
| 9,555,326 | B2 * | 1/2017 | Scott | A63F 13/245 |
| 9,595,108 | B2 * | 3/2017 | Horovitz | G06V 20/647 |
| 9,773,074 | B2 * | 9/2017 | Balon | A63F 13/50 |
| 10,583,354 | B2 * | 3/2020 | Muthyala | A63H 33/042 |
| 11,083,968 | B2 * | 8/2021 | Walker | A63F 13/213 |
| 11,103,786 | B2 | 8/2021 | Keefe et al. | |
| 11,144,114 | B2 * | 10/2021 | Suzuki | G06F 3/017 |
| 11,192,027 | B2 * | 12/2021 | Kojima | A63F 13/795 |
| 11,433,310 | B2 * | 9/2022 | Walker | A63F 13/63 |
| 11,478,708 | B1 * | 10/2022 | Holm | A63F 13/577 |
| 11,583,774 | B2 * | 2/2023 | Døssing | A63F 13/69 |
| 11,675,488 | B2 * | 6/2023 | Qiu | G06F 3/0488 345/173 |
| 12,097,432 | B2 * | 9/2024 | Timmins | A63F 13/573 |
| 12,151,166 | B2 * | 11/2024 | Bakalash | A63F 13/70 |
| 12,208,326 | B2 * | 1/2025 | Peng | A63F 13/52 |
| 12,220,643 | B2 * | 2/2025 | Bakalash | A63F 13/65 |
| 12,343,636 | B2 * | 7/2025 | Bakalash | G06N 3/047 |
| 2002/0196250 | A1 * | 12/2002 | Anderson | A63H 33/042 345/420 |
| 2006/0258447 | A1 * | 11/2006 | Baszucki | A63F 13/335 463/31 |
| 2007/0063997 | A1 * | 3/2007 | Scherer | G06F 3/04845 345/419 |
| 2011/0087479 | A1 * | 4/2011 | Baszucki | A63F 13/63 703/22 |
| 2014/0163930 | A1 * | 6/2014 | Balon | A63F 13/12 703/1 |
| 2017/0189797 | A1 | 7/2017 | Muthyala et al. | |
| 2021/0232299 | A1 * | 7/2021 | Qiu | A63F 13/533 |
| 2022/0366813 | A1 * | 11/2022 | Shaw | A63H 33/044 |
| 2023/0065252 | A1 * | 3/2023 | Døssing | A63F 13/65 |
| 2023/0158405 | A1 * | 5/2023 | Holm | A63F 13/5375 463/31 |
| 2023/0277935 | A1 * | 9/2023 | Fukada | A63F 13/426 463/31 |
| 2023/0277936 | A1 * | 9/2023 | Fukada | A63F 13/69 463/31 |
| 2023/0277940 | A1 * | 9/2023 | Fukada | A63F 13/45 463/31 |
| 2023/0277941 | A1 * | 9/2023 | Fukada | A63F 13/63 463/31 |
| 2024/0050854 | A1 * | 2/2024 | Bakalash | G06N 3/045 |
| 2024/0165520 | A1 * | 5/2024 | Bakalash | A63F 13/655 |
| 2024/0252926 | A1 * | 8/2024 | Yamamoto | A63F 13/56 |
| 2024/0331254 | A1 * | 10/2024 | An | G06T 13/40 |
| 2024/0342603 | A1 * | 10/2024 | Kawamura | A63F 13/45 |
| 2024/0350917 | A1 * | 10/2024 | Fukada | A63F 13/56 |
| 2024/0350921 | A1 * | 10/2024 | Sato | A63F 13/56 |

FOREIGN PATENT DOCUMENTS

| | | |
|---|---|---|
| JP | 2019/155062 | 9/2019 |
| KR | 10-2014-0099415 | 8/2014 |

OTHER PUBLICATIONS

May 10, 2022 Written Opinion issued in International Application No. PCT/JP2022/009227, with English translation.

Lego Star Wars: The Force Awakens, Weekly Famitsu, Mar. 31, 2016, vol. 31 Issue 15 No. 1426, pp. 34-37.

N. Fukada et al, U.S. Appl. No. 18/304,071, filed Apr. 20, 2023.

Lego Star Wars: Force Awakens video game, published by Warner Bros. Interactive Entertainment, Feral Interactive and released on OSX on Jun. 28, 2016 (evidenced by Wikipedia article) (Year 2016).

Lego Star Wars: Force Awakens and publised by Warner Bros. Interactive Entertainment, Feral Interactive and released on OSX on Jun. 28, 2016 (Year 2016) https://www.youtube.com/watch?v=SOOxEKhCA80.

* cited by examiner

INFORMATION PROCESSING SYSTEM FOR BONDING OBJECTS IN A GAME SPACE

CROSS REFERENCE TO RELATED APPLICATION

This application is a continuation of International Patent Application No. PCT/JP2022/009226 filed on Mar. 3, 2022, the entire contents of which is incorporated herein by reference.

FIELD

An exemplary embodiment relates to an information processing system, a non-transitory computer-readable storage medium having stored therein an information processing program, an information processing method, and an information processing apparatus that are capable of assembling a plurality of virtual objects by an operation of a user.

BACKGROUND AND SUMMARY

As a related art, there is a game system for moving an operation target object and bringing the operation target object into contact with an object present in a virtual space, thereby forming a plurality of objects in a unified manner.

However, there is room for improvement in increasing usability in a case where, using a plurality of individual virtual objects, an object composed of the plurality of virtual objects is generated by an operation of a user.

Therefore, it is an object of the exemplary embodiment to provide an information processing system, an information processing program, an information processing method, and an information processing apparatus that are capable of increasing usability in a case where, using a plurality of virtual individual objects, an object composed of the plurality of virtual objects is generated.

To achieve the above object, the exemplary embodiment employs the following configurations.

An information processing system according to the exemplary embodiment is an information processing system, including: at least one processor and a memory coupled thereto, the at least one processor being configured to control the information processing system to at least: place in a game space a plurality of virtual objects that can be moved in the game space and bonded to each other; select, by a selection operation of a user, a first object among the plurality of virtual objects placed in the game space; generate a bonding object indicating respective positions on the first object selected by the selection operation and a second object among the plurality of virtual objects; in accordance with a bonding instruction from the user, bond the first object and the second object at the respective positions on the first object and the second object indicated by the bonding object; and in accordance with a movement of the selected first object or a change in an orientation of the selected first object in the game space before the bonding instruction is given, change the respective positions on the first object and the second object indicated by the bonding object.

Based on the above, a bonding object can indicate which position on a first object and which position on a second object are to be bonded to each other. Consequently, in a case where a user bonds a plurality of virtual objects, thereby forming an object composed of the plurality of virtual objects, it is possible to improve convenience.

Further, the at least one processor may be further configured to control the information processing system to, if the first object moves, make a collision determination between the first object and the second object, and if the first object and the second object collide with each other, control a movement of at least either one of the first object and the second object.

Based on the above, when the first object and the second object are assembled, a collision determination is made, and the behaviors of the objects are controlled. Consequently, the user can assemble the first object and the second object while recognizing the distance between the first object and the second object.

Further, the at least one processor may be further configured to control the information processing system to generate a projected image obtained by projecting the first object onto a surface of the second object.

Based on the above, it is possible to cause the user to easily recognize the positional relationship between the first object and the second object.

Further, the at least one processor may generate a first projected image obtained by projecting the selected first object in a first direction and a second projected image obtained by projecting the selected first object in a second direction orthogonal to the first direction.

Based on the above, it is possible to project the first object in two directions orthogonal to each other. Thus, the user can recognize the positional relationship between the first object and the second object more easily.

Further, the at least one processor may be further configured to control the information processing system to, based on a light source set in the game space, generate a shadow of the first object separately from the projected image.

Based on the above, it is possible to generate a shadow of the first object and a projected image.

Further, the selected first object may be displayed in a predetermined color, and the projected image of the first object may be displayed in the predetermined color.

Based on the above, the first object and a projected image of the first object are displayed in the same color. Thus, the user can easily recognize that a projected image on the surface of the second object is the projected image of the first object. Thus, it is possible to easily recognize the positional relationship between the first object and the second object.

Further, in each of the virtual objects, a preferential bonding portion that is more likely to be bonded than another portion may be set.

Based on the above, it is possible to preferentially bond the plurality of virtual objects at preferential bonding portions.

Further, if the preferential bonding portion on the first object and the preferential bonding portion on the second object satisfy a first condition, the at least one processor may generate the bonding object indicating the preferential bonding portion on the first object and the preferential bonding portion on the second object. If the preferential bonding portion on the first object and the preferential bonding portion on the second object do not satisfy the first condition, the at least one processor may generate the bonding object indicating respective positions on the first object and the second object that satisfies a second condition.

Based on the above, if preferential bonding portions on both the first object and the second object satisfy a first condition, it is possible to bond the first object and the second object at these preferential bonding portions. If the first condition is not satisfied, it is possible to bond the first object and the second object at positions on the first object and the second object that satisfy a second condition.

Further, if the preferential bonding portion on the first object and the preferential bonding portion on the second object satisfy a first condition, the at least one processor may generate the bonding object indicating the preferential bonding portion on the first object and the preferential bonding portion on the second object. If the preferential bonding portion is not set on at least one of the first object and the second object, the at least one processor may generate the bonding object indicating respective positions on the first object and the second object that satisfies a second condition.

Based on the above, if a preferential bonding portion on the first object and a preferential bonding portion on the second object satisfy a first condition, it is possible to preferentially bond these preferential bonding portions. If a preferential bonding portion is not set in at least one of the first object and the second object, it is possible to bond the first object and the second object at positions on the first object and the second object that satisfy a second condition.

Further, if the first object and the second object are bonded to each other at the preferential bonding portions on the first object and the second object, using a predetermined direction based on the preferential bonding portions, the at least one processor may adjust an orientation of at least either one of the first object and the second object, and bond the first object and the second object to each other.

Based on the above, if preferential bonding portions are bonded to each other, it is possible to adjust the orientation of the first object or the second object using predetermined directions based on the preferential bonding portions. For example, based on directions set on preferential bonding portions, it is possible to adjust the orientations of the objects and bond the objects.

Further, if the first object and the second object are bonded to each other at the preferential bonding portions on the first object and the second object, the at least one processor may bond the first object and the second object to each other so that directions normal to the preferential bonding portions are parallel to each other.

Based on the above, it is possible to match directions normal to the preferential bonding portions. For example, it is possible to bond the two objects by adjusting the orientations of the first object and the second object so that a certain surface of the first object and a certain surface of the second object are parallel to each other.

Further, if the first object and the second object are bonded to each other at the preferential bonding portions on the first object and the second object, the at least one processor may bond the first object and the second object to each other so that a direction tangent to the preferential bonding portion on the first object and a direction tangent to the preferential bonding portion on the second object have a preset angle.

Based on the above, it is possible to bond the two objects by adjusting the orientations of the first object and the second object so that directions tangent to the preferential bonding portions have a preset angle.

Further, the bonding object may be an object connecting the position on the first object and the position on the second object.

Based on the above, it is possible to cause the user to intuitively recognize that the first object and the second object are bonded to each other at bonding positions indicated by the bonding object.

Further, in a state where the first object and the second object are bonded to each other, the at least one processor may select either one of the first object and the second object. The at least one processor may generate the bonding object indicating respective positions on the selected either one virtual object and a third object among the plurality of virtual objects. In accordance with a bonding instruction from the user, the at least one processor may bond the selected either one virtual object and the third object to each other at the respective positions on the selected either one virtual object and the third object indicated by the bonding object.

Based on the above, the user can easily further bond at a desired position a third object to an object composed of the first and second objects.

Further, a cover object that covers bonding positions on the bonded first object and second object may be displayed.

Based on the above, at the positions where the first object and the second object are bonded to each other, a cover object that covers the bonding positions is displayed. Thus, it is possible to cause the user to recognize the bonding positions.

Further, after the first object and the second object are bonded at the positions indicated by the bonding object, the bonding object may stay as the cover object at the positions.

Based on the above, it is possible to cause the bonding object to stay as the cover object also after a bonding instruction is given.

Further, after the first object and the second object are bonded to each other at the respective positions indicated by the bonding object, the bonding object may stay in a certain range including the respective positions.

Based on the above, even after the first object and the second object are bonded to each other, it is possible to indicate that these objects are bonded to each other by an operation of the user.

Further, in a case where the first object and the second object are bonded to each other, the at least one processor may move the first object and the second object to come close to each other and bond the first object and the second object to each other.

Based on the above, when the first object and the second object are bonded to each other, it is possible to move the first object and the second object while bringing the first object and the second object close to each other.

Further, a weight may be set for each of the plurality of virtual objects. The at least one processor may move the first object and the second object so that a moving distance of a lighter object is longer than a moving distance of a heavier object.

Based on the above, for example, based on the behaviors of two virtual objects when bonded to each other, the user can grasp the weight relationship between the two virtual objects.

Further, in accordance with the bonding instruction, the at least one processor may generate an assembled object obtained by bonding the plurality of virtual objects. The at least one processor may: detach at least any one of the virtual objects from the assembled object including the plurality of virtual objects; based on the plurality of virtual objects forming the assembled object, calculate assembled object information regarding the assembled object and store the assembled object information; based on the assembled object information, control an action of the assembled object; and every time the virtual objects are bonded to each other, calculate and store the assembled object information, and every time the virtual object is detached from the assembled object, calculate and store the assembled object information.

Based on the above, when the behavior of an assembled object is calculated, it is possible to calculate the behavior of the assembled object using assembled object information without examining the bonding between a plurality of virtual objects included in the assembled object each time.

Another exemplary embodiment may be an information processing program executed by a computer of an information processing apparatus. Another exemplary embodiment may be an information processing method performed by the above information processing system.

According to the exemplary embodiment, a bonding object can indicate which position on a first object and which position on a second object are to be bonded to each other.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2.

Figure 1:
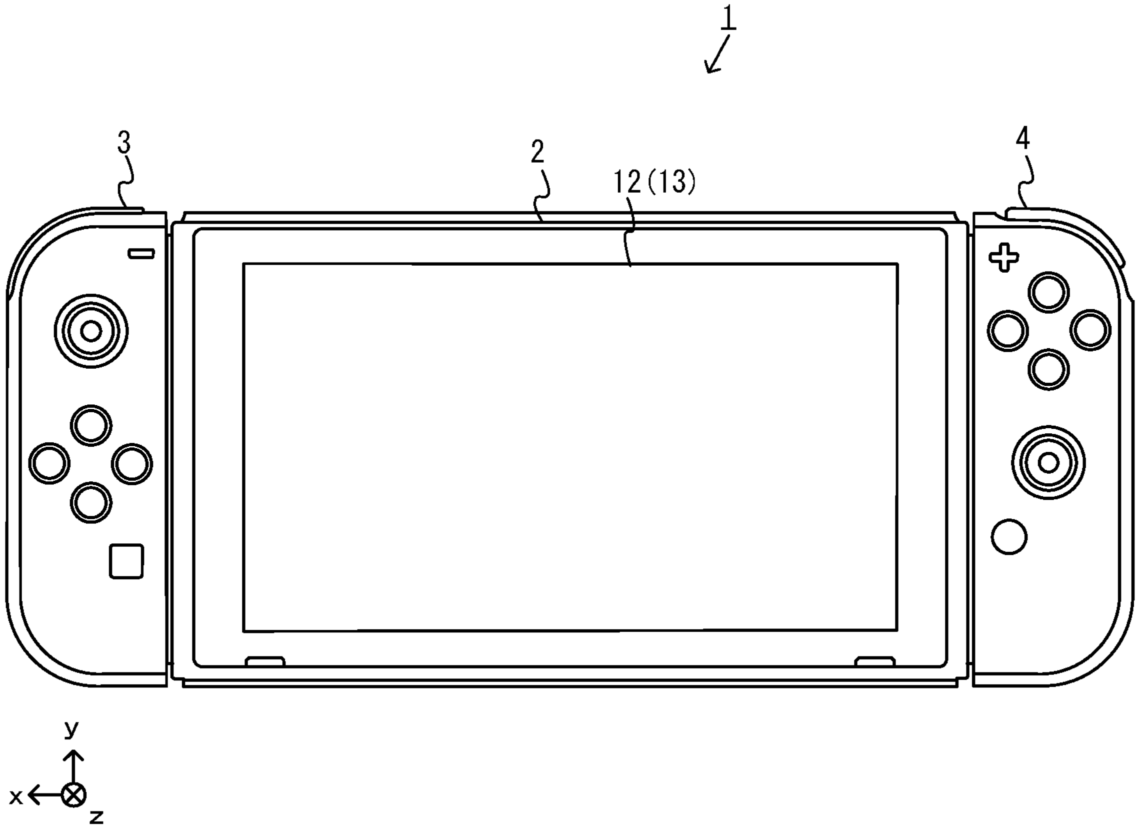
FIG. 1 is an example non-limiting diagram showing an example of the state where a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
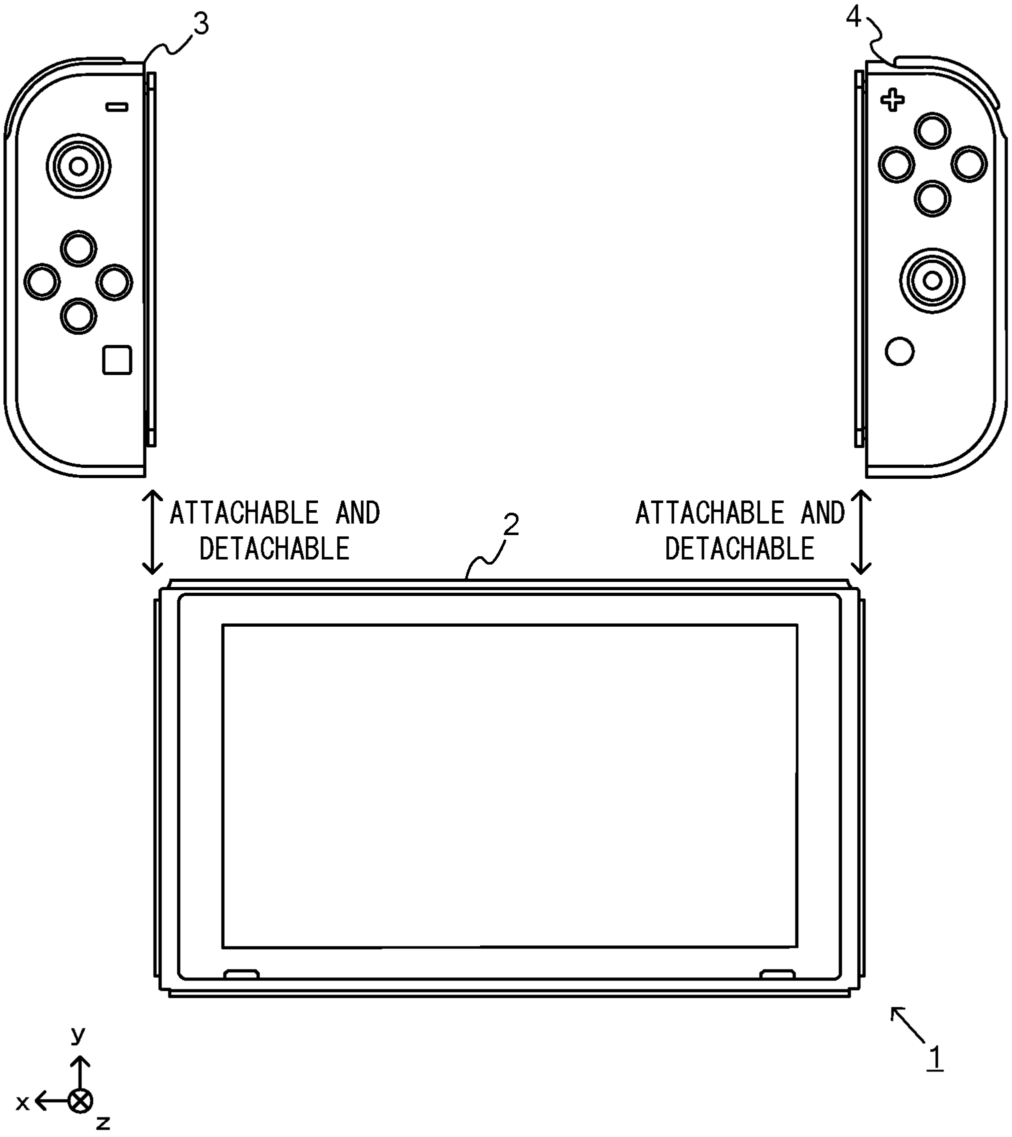
FIG. 2 is an example non-limiting diagram showing an example of the state where the left controller 3 and the right controller 4 are detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
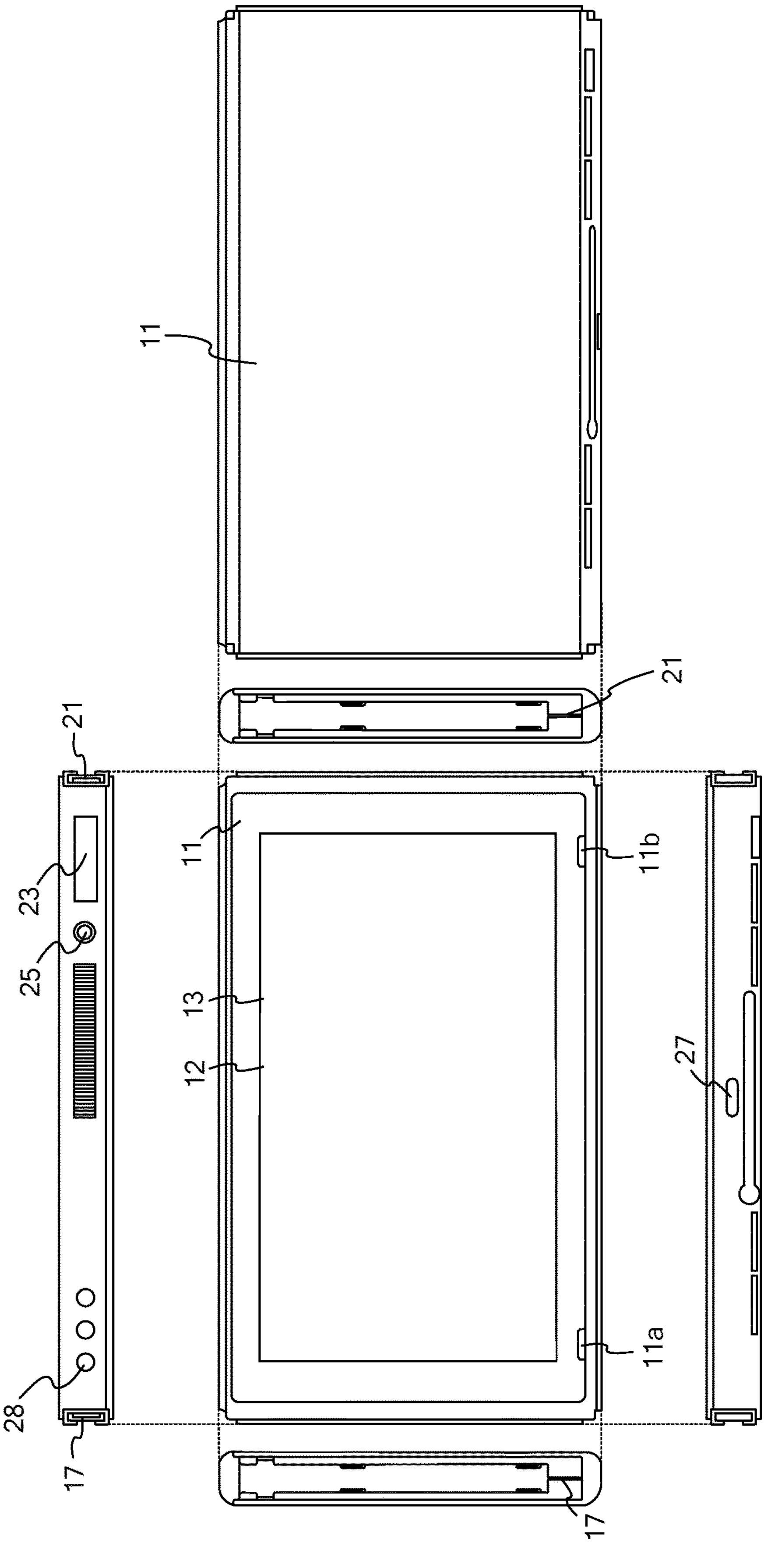
FIG. 3 is example non-limiting six orthogonal views showing an example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

As shown in FIG. 3, the main body apparatus 2 includes the display 12, which is provided on the main surface of the housing 11. The display 12 displays an image generated by the main body apparatus 2.

Further, the main body apparatus 2 includes a touch panel 13 on a screen of the display 12. In the exemplary embodiment, the touch panel 13 is of a type that allows a multi-touch input (e.g., a capacitive type).

The main body apparatus 2 includes speakers (i.e., speakers 88 shown in FIG. 6) within the housing 11. As shown in FIG. 3, speaker holes **11*a* and 11*b* are formed on the main surface of the housing 11**.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2.

Figure 4:
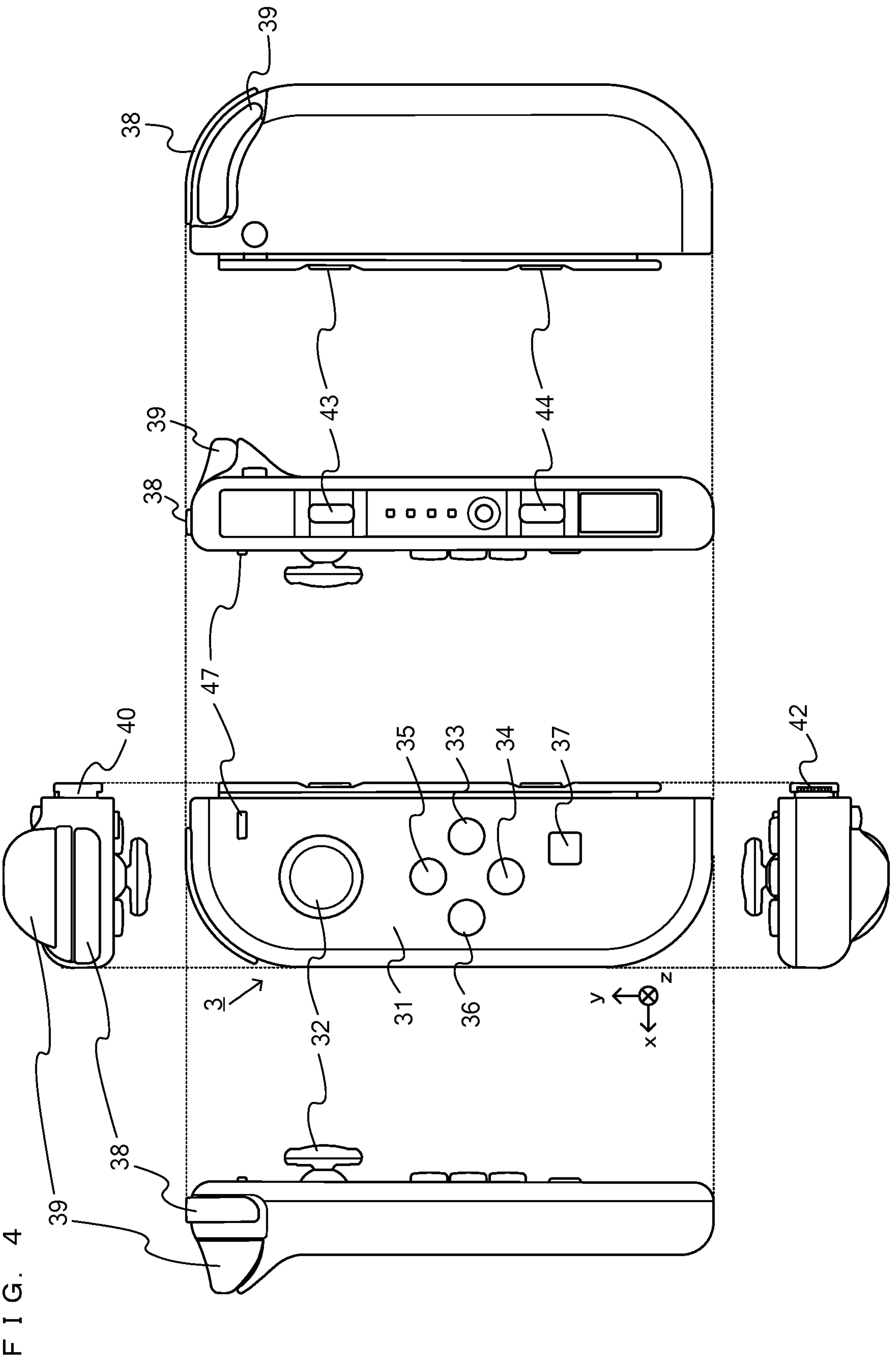
FIG. 4 is example non-limiting six orthogonal views showing an example of the left controller 3.

FIG. 4 is six orthogonal views showing an example of the left controller 3. As shown in FIG. 4, the left controller 3 includes a housing 31.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
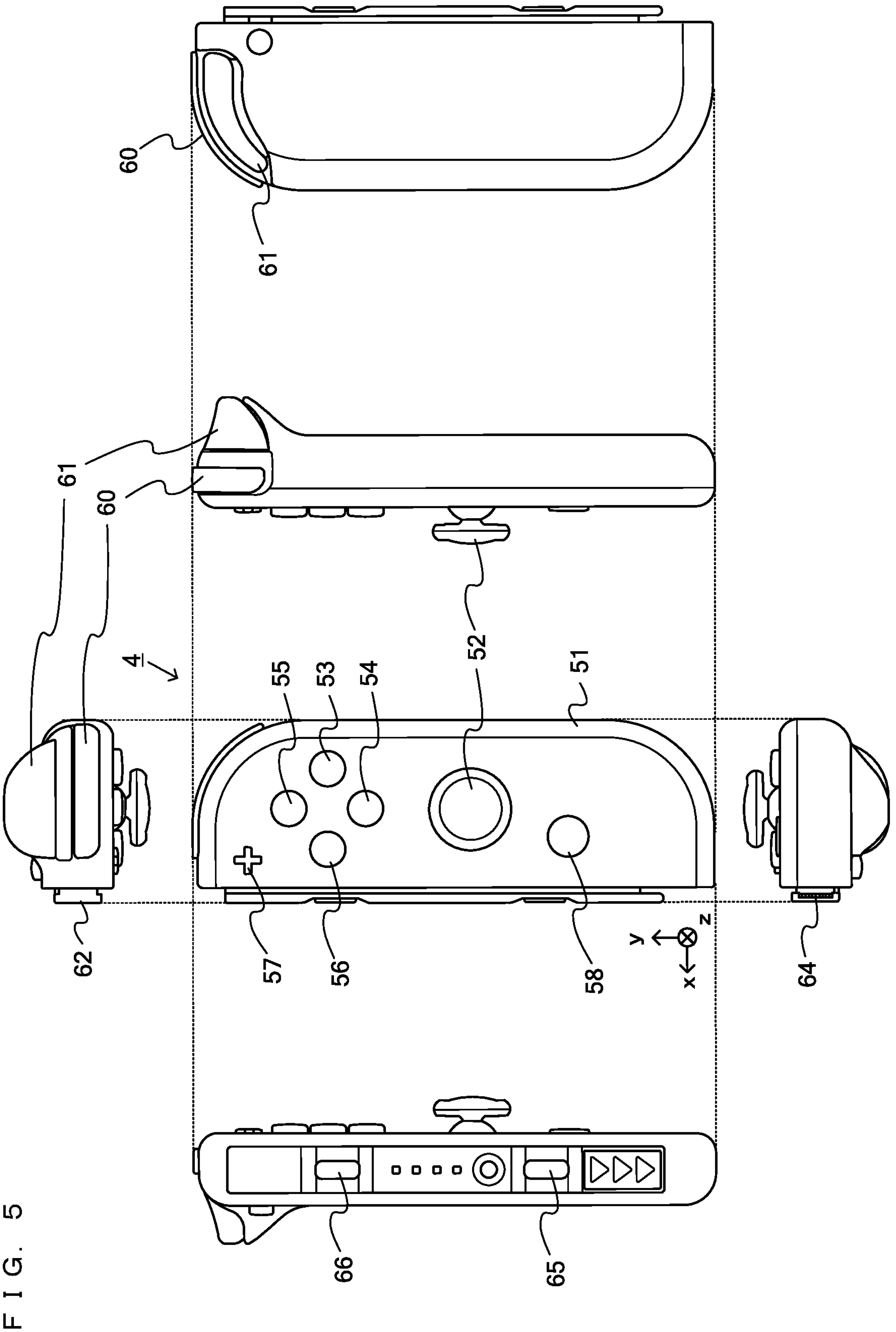
FIG. 5 is example non-limiting six orthogonal views showing an example of the right controller 4.

FIG. 5 is six orthogonal views showing an example of the right controller 4. As shown in FIG. 5, the right controller 4 includes a housing 51.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
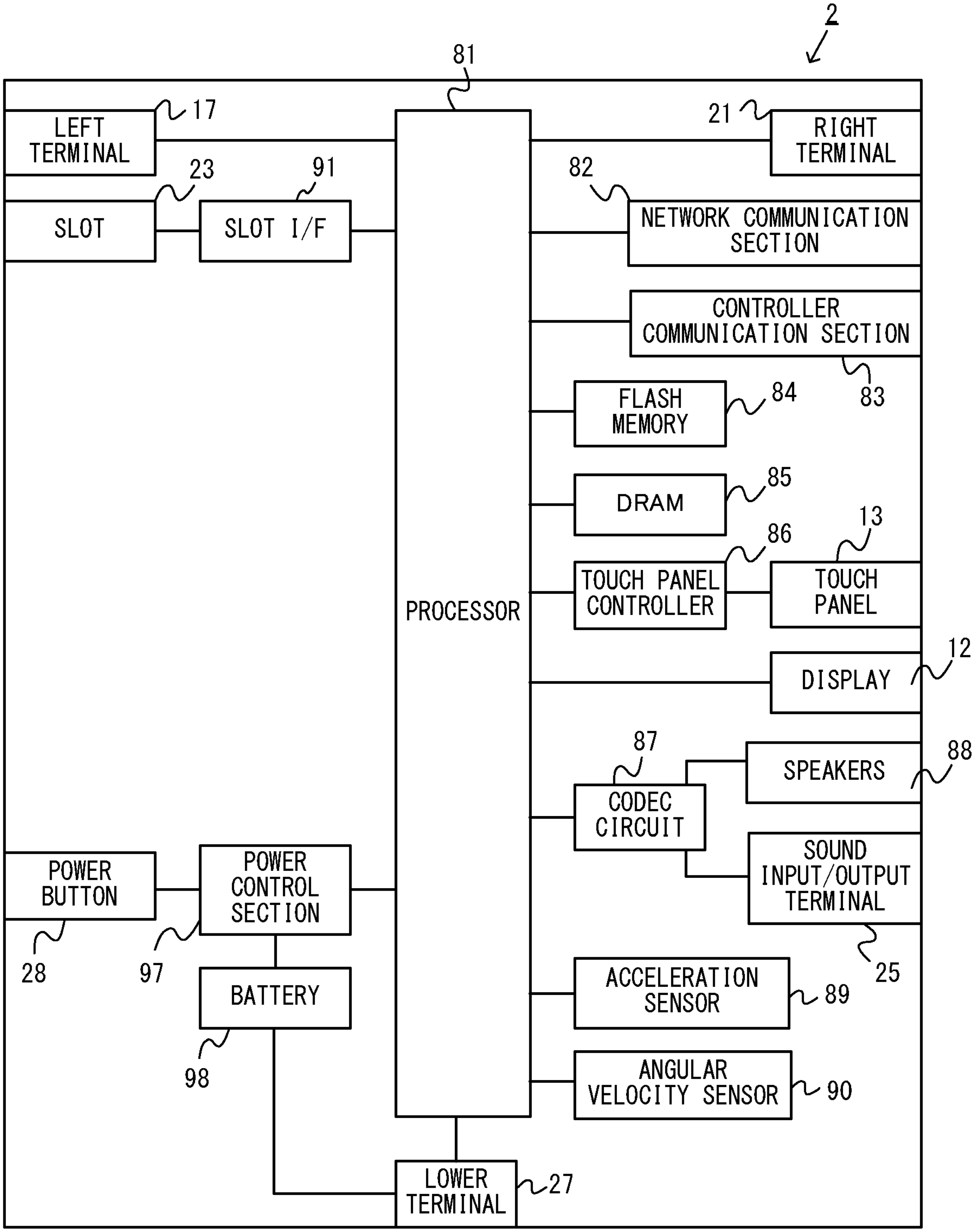
FIG. 6 is an example non-limiting block diagram showing an example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication).

The main body apparatus 2 includes a controller communication section 83. The controller communication section 83 is connected to the processor 81. The controller communication section 83 wirelessly communicates with the left controller 3 and/or the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81.

Figure 7:
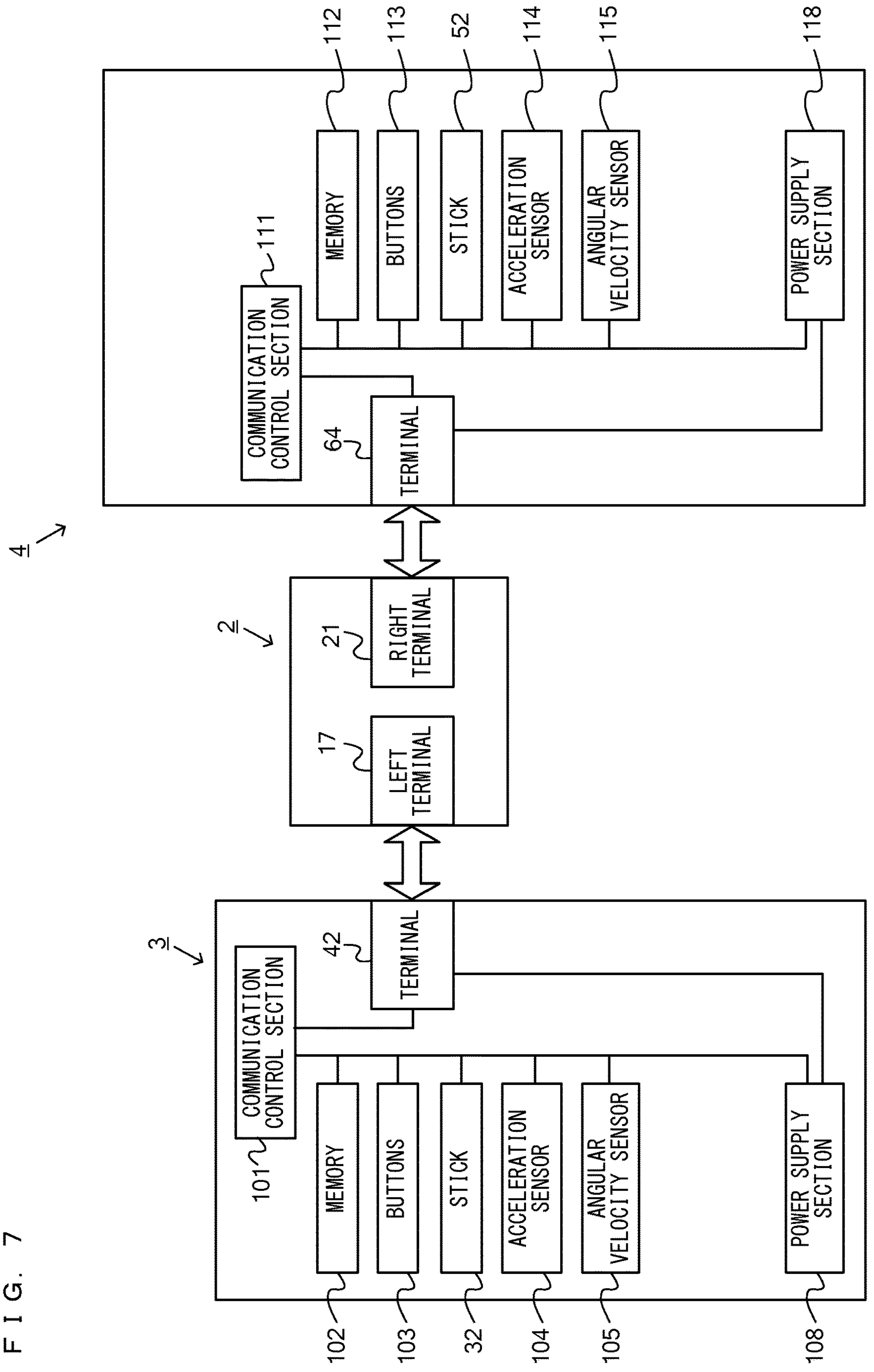
FIG. 7 is an example non-limiting block diagram showing examples of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

(Overview of Game)

Next, a game according to the exemplary embodiment is described. In the game according to the exemplary embodiment, a user character PC is placed in a virtual space (a game space), and the user character PC moves in the virtual space, performs a predetermined action, or defeats an enemy character, whereby the game progresses. In the virtual space, a virtual camera is placed. The virtual camera is placed to include the user character PC in the image capturing range of the virtual camera. For example, the virtual camera may be set behind the user character PC. A game image including the user character PC is generated using the virtual camera and displayed on the display 12 or the stationary monitor.

Figure 8:
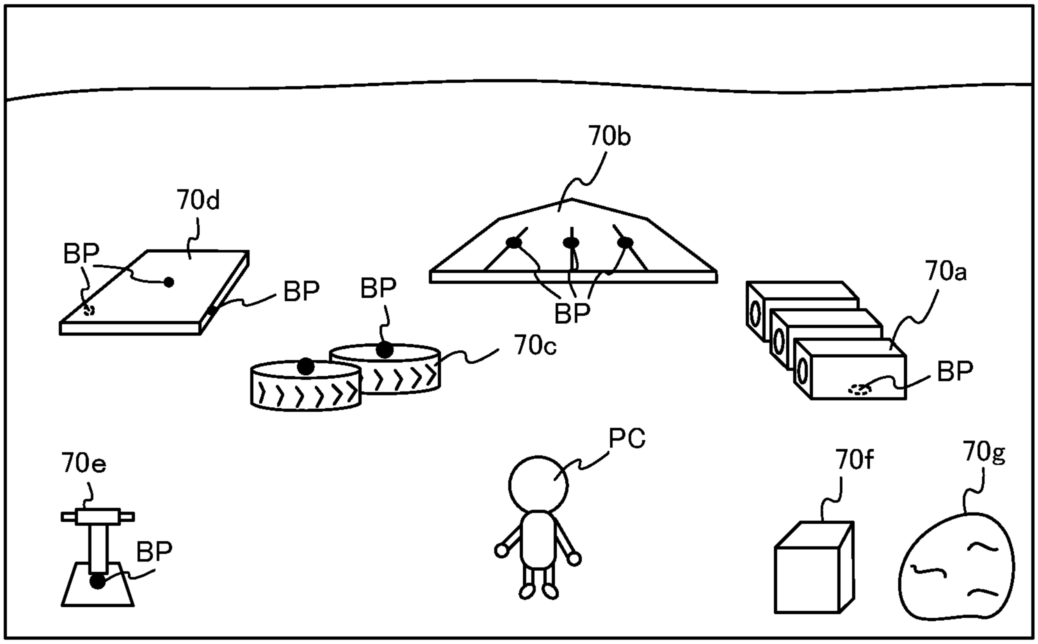
FIG. 8 is an example non-limiting diagram showing an example of a game image displayed in a case where a game according to the exemplary embodiment is executed.

FIG. 8 is a diagram showing an example of a game image displayed when the game according to the exemplary embodiment is executed. As shown in FIG. 8, in a virtual space, a user character PC and a plurality of virtual objects 70 (70*a* to 70*g*) are placed. Although not shown in the figures, in the virtual space, objects such as a tree and a building fixed to the virtual space are placed.

The user character PC is a character operated by the user. In accordance with an input to the controller (3 or 4), the user character PC moves in the virtual space or performs a predetermined action in the virtual space. The user character PC assembles the plurality of virtual objects 70, thereby creating an assembled object.

The plurality of virtual objects 70 are objects that can move in the virtual space in accordance with an operation of the user and can be bonded to each other. The plurality of virtual objects 70 are bonded to each other, thereby forming an assembled object. For example, the plurality of virtual objects 70 are placed on the ground of the virtual space in advance. The plurality of virtual objects 70 may appear in the virtual space based on an operation of the user. For example, if the user character PC defeats an enemy character or clears a predetermined task, the virtual objects 70 may appear in the virtual space. The plurality of virtual objects 70 may be managed as items owned by the user character PC, may not normally be placed in the virtual space, and may be accommodated as material objects in a virtual accommodation area of the user character PC. Then, if an operation of the user is performed, the virtual objects 70 accommodated in the accommodation area may appear in the virtual space.

The user assembles the plurality of virtual objects 70 and thereby can generate an assembled object. For example, the user can generate a vehicle, a tank, an airplane, or the like as an assembled object and advance the game using the generated assembled object. For example, the user can use the generated assembled object for a movement in the virtual space or an attack on an enemy character.

For example, the plurality of virtual objects 70 include an engine object 70*a*, a wing object 70*b*, a wheel object 70*c*, a board object 70*d*, a control yoke object 70*e*, a box object 70*f*, and a rock object 70*g*. In addition to these objects, a different virtual object for forming an assembled object may be further prepared.

The engine object 70*a* is an object representing a jet engine and is a virtual object having power. If the engine object 70*a* is formed as a part of an assembled object, the engine object 70*a* applies a velocity, an acceleration, and an angular velocity to the entirety of the assembled object. The wing object 70*b* is a virtual object for flying in the sky and generates lift in a case where the wing object 70*b* moves at a predetermined velocity or more in the virtual space.

The wheel object 70*c* is a virtual object having power and is an object that can be formed as, for example, a wheel of a vehicle. The wheel object 70*c* is configured to be rotatable in a single preset direction. The board object 70*d* is a planar virtual object. The board object 70*d* can be used as, for example, the body of a vehicle. Further, a wall can also be formed in the virtual space by vertically arranging a plurality of board objects 70*d*, or a hexahedron can also be formed using a plurality of board objects 70*d*.

The control yoke object 70*e* is a virtual object for, in a case where the control yoke object 70*e* is formed as a part of an assembled object, controlling the movement of the assembled object. For example, the control yoke object 70*e* turns the assembled object, thereby controlling the moving direction of the assembled object.

The box object 70*f* is, for example, a virtual object having a cube shape and is an object that can be formed as a part of various assembled objects. The rock object 70*g* is a virtual object having a curved shape and is an object representing a rock.

As shown in FIG. 8, there is a case where one or more preferential bonding portions BP are set on the surface of a virtual object 70. Although the details will be described below, preferential bonding portions BP are positions that are bonded in preference to over other portions when virtual objects 70 are bonded to each other.

Here, in the exemplary embodiment, the "bonding" between virtual objects 70 means that the virtual objects 70 behave as a unified object at the position where the virtual objects 70 are close to each other. For example, if two virtual objects 70 are bonded to each other, the two virtual objects 70 may be in contact with each other. If two virtual objects 70 are bonded to each other, the two virtual objects 70 may not be strictly in contact with each other. For example, there may be a gap between the two virtual objects 70, or a bonding object described below may be present between the two virtual objects 70. "A plurality of virtual objects 70 behave as a unified object" includes the state where the relative positional relationship between the plurality of virtual objects 70 is maintained, and the plurality of virtual objects 70 move in the virtual space or change their orientations as if the plurality of virtual objects 70 were a single object. If the relative positional relationships between the plurality of virtual objects 70 bonded to each other may not be completely fixed, and for example, if a force or an impact is applied to any of the plurality of virtual objects 70, the positional relationships may somewhat change while the plurality of virtual objects 70 remain bonded to each other.

A preferential bonding portion BP is set in advance on each virtual object 70 by a game creator. For example, on a bottom surface of the engine object 70*a*, a single preferential bonding portion BP is set. On an upper surface of the wing object 70*b*, three preferential bonding portions BP are set. On an upper surface and a side surface of the board object 70*d*, a plurality of preferential bonding portions BP are set. Also on the wheel object 70*c* and the control yoke object 70*e*, one or more preferential bonding portions BP are set in advance.

On the other hand, a preferential bonding portion BP is not set on the box object 70*f* and the rock object 70*g*.

Figure 9:
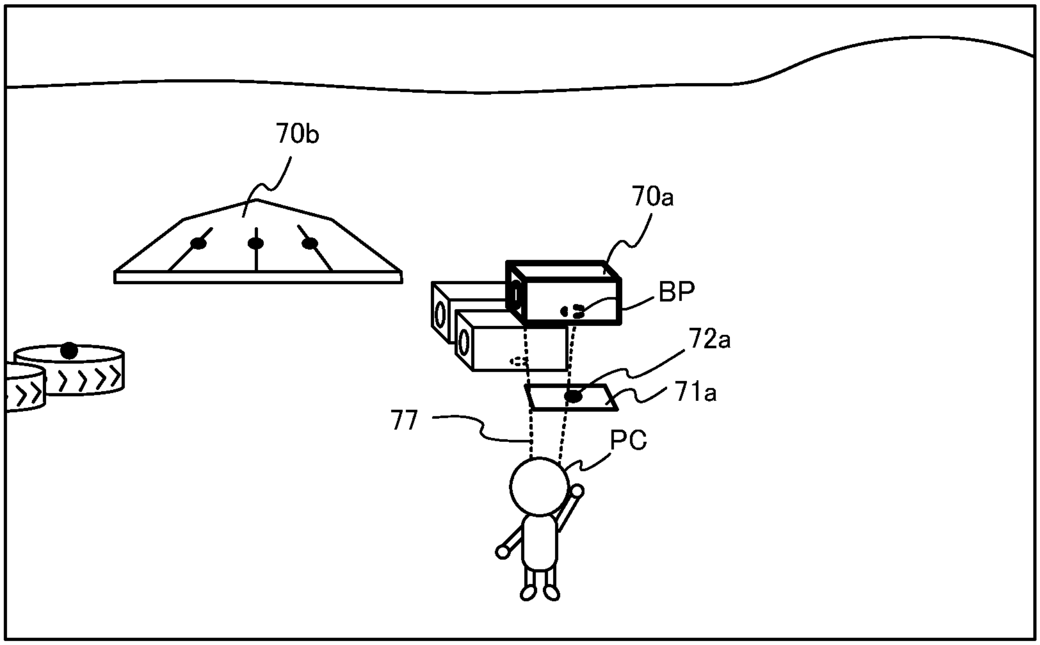
FIG. 9 is an example non-limiting diagram showing an example of a game image representing the state where a user selects an engine object 70*a;*

The user selects any one virtual object 70 placed in the virtual space and bonds the virtual object 70 to another virtual object 70, and thereby can generate an assembled object obtained by bonding a plurality of virtual objects 70. FIG. 9 is a diagram showing an example of a game image representing the state where the user selects the engine object 70*a*.

The user can move the user character PC in the virtual space, for example, using the analog stick 32 of the left controller 3. If the user character PC moves in the virtual space, a virtual camera also moves in the virtual space by following the user character PC. The user can also control the direction of the virtual camera (the direction of the line of sight) using the analog stick 52 of the right controller 4. The virtual camera moves in the virtual space so that the user character PC is included in the image capturing range of the virtual camera.

For example, at the center of a screen, an indication sign (not shown) for indicating a virtual object 70 is displayed. The user moves the user character PC or changes the direction of the virtual camera, thereby locating the engine object 70*a* at the center of the screen. If a predetermined button of the left controller 3 or the right controller 4 is pressed when the engine object 70*a* is indicated by the indication sign (i.e., the engine object 70*a* is located at the center of the screen), as shown in FIG. 9, the engine object 70*a* is selected. The display form of a virtual object 70 that is being selected is different from that of another virtual object 70. For example, each virtual object 70 has a unique color when the virtual object 70 is not being selected by the user. The virtual object 70, however, changes to a predetermined color (e.g., yellow) when the virtual object 70 is being selected by the user. For example, as shown in FIG. 9, the engine object 70*a* that is being selected is displayed in the predetermined color (e.g., yellow) different from that of another virtual object 70. Alternatively, a virtual object 70 that is being selected may be displayed in a display form different from that of another virtual object 70 by displaying an image surrounding the virtual object 70 that is being selected or displaying an arrow indicating the virtual object 70 that is being selected.

Hereinafter, a virtual object 70 that is being selected by the user will occasionally be referred to as a "selected object". A virtual object 70 that is not being selected by the user will occasionally be referred to as "another virtual object 70".

In a case where a virtual object 70 is being selected, a selection image 77 is displayed that indicates that the virtual object 70 is being selected. The selection image 77 is an image extending from the user character PC to the selected object.

In accordance with an operation of the user (or automatically), the engine object 70*a* that is being selected is displayed such that the engine object 70*a* hovers off the ground. If the engine object 70*a* that is being selected hovers off the ground, an image 71*a* (a projected image) of the engine object 70*a* is projected onto the ground. A point 72*a* indicating a predetermined position (e.g., a center position) of the engine object 70*a* is also projected onto the ground.

If the user character PC moves in the virtual space in the state where the engine object 70*a* is being selected, the engine object 70*a* also moves by following the movement of the user character PC. That is, the selected object moves in accordance with the movement of the user character PC.

As will be described below, even if the position of the user character PC does not change, the selected object may move. For example, also in a case where the direction of the user character PC changes, the selected object moves. Specifically, the selected object moves in accordance with a change in the direction of the user character PC so that the selected object is located in front of the user character PC. The selected object may also move due to a change in the distance between the user character PC and the selected object. For example, if the direction of the user character PC is changed to an upward direction in the virtual space, the selected object also moves in the upward direction in the virtual space. When the user character PC is directed in the upward direction in the virtual space, the distance between the user character PC and the selected object is longer than when the user character PC is directed in a direction parallel to the ground.

Figure 10:
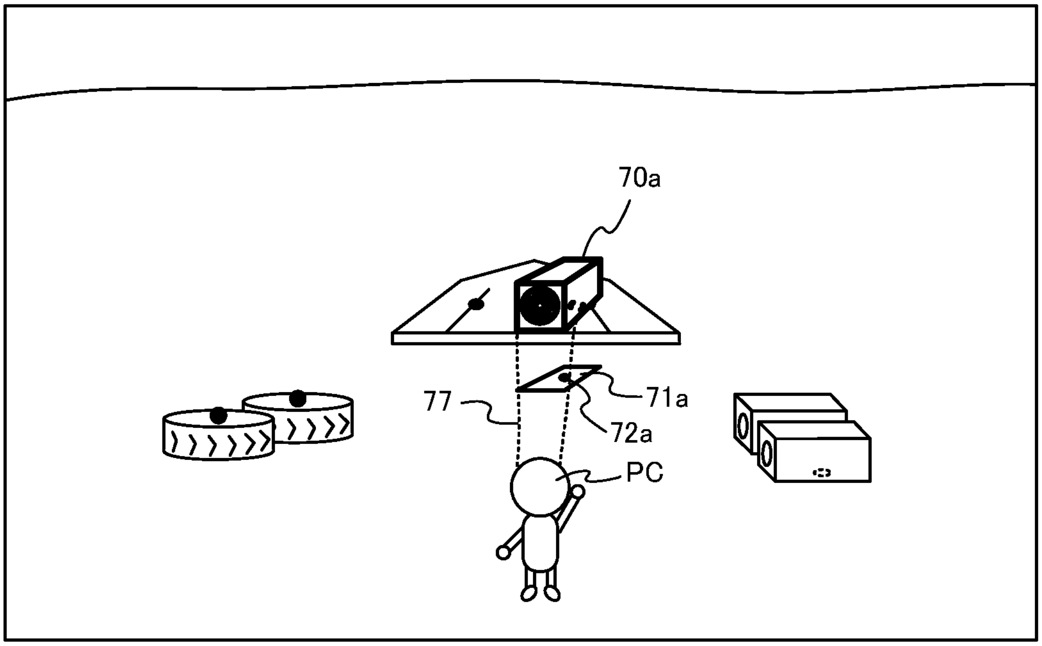
FIG. 10 is an example non-limiting diagram showing an example of a game image after a user character PC has moved in an obliquely upward direction from the position in FIG. 9.

FIG. 10 is a diagram showing an example of a game image after the user character PC has moved in an obliquely upward direction from the position in FIG. 9. As shown in FIG. 10, if the user character PC moves, the engine object 70*a* that is being selected also moves. Specifically, in accordance with the input direction of the analog stick 32 of the left controller 3, the user character PC moves, and in accordance with the movement of the user character PC, the virtual camera also moves. The selected object moves to maintain the positional relationship with the user character PC. Thus, if the user character PC moves in a predetermined direction in the virtual space, the engine object 70*a* that is being selected also moves in the predetermined direction.

Figure 11:
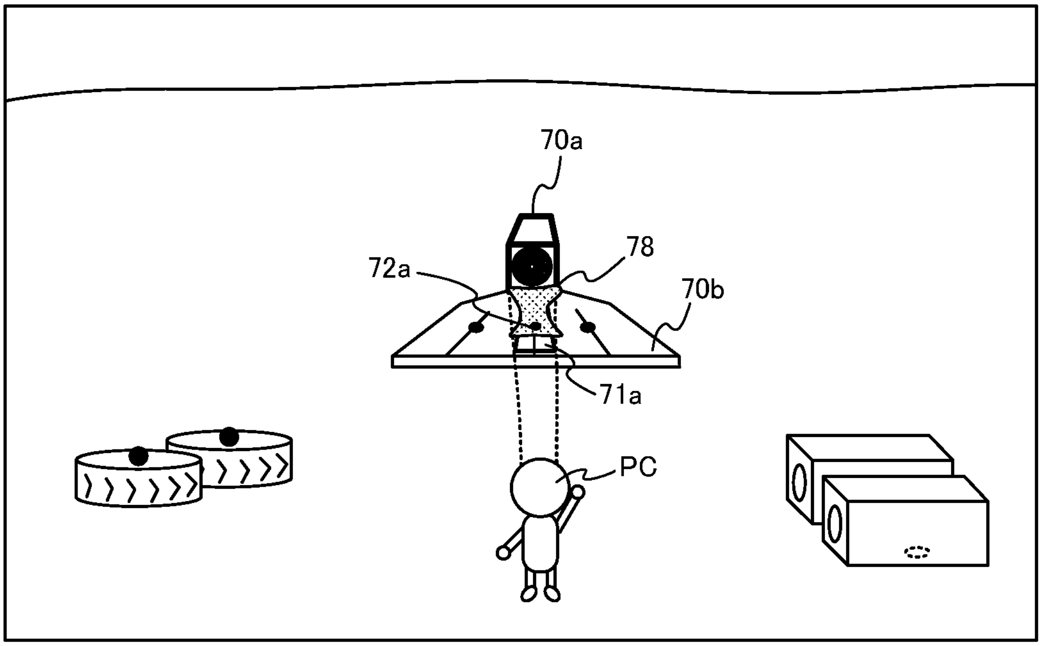
FIG. 11 is an example non-limiting diagram showing an example of a game image after the user character PC has moved further in a depth direction from the position in FIG. 10.

FIG. 11 is a diagram showing an example of a game image after the user character PC has moved further in a depth direction from the position in FIG. 10. As shown in FIG. 11, if the user character PC moves further in the depth direction from the position in FIG. 10, the engine object 70*a* also moves further in the depth direction. In this case, the engine object 70*a* is located above the wing object 70*b* placed on the ground. At this time, a bonding object 78 connecting the engine object 70*a* and the wing object 70*b* appears.

Here, the bonding object 78 is an object for bonding a selected object and another virtual object 70 and is an object representing a bonding adhesive having viscosity. The bonding object 78 is an object indicating respective bonding positions on the selected object and the other virtual object 70. Here, the "bonding positions" are the positions where the selected object and the other virtual object 70 come into contact with each other in a case where the selected object and the other virtual object 70 are bonded to each other. The bonding object 78 connects the bonding positions on the two virtual objects 70 and causes the user to recognize that if a bonding instruction is given by the user, these two virtual objects 70 are to be bonded to each other at the bonding positions. Before the selected object and the other virtual object 70 are bonded to each other and in a case where the selected object and the other virtual object 70 satisfy a predetermined bonding condition, the bonding object 78 appears. The predetermined bonding condition is a condition under which the selected object and the other virtual object 70 can be bonded to each other. For example, the predetermined bonding condition is a condition determined in accordance with the distance between the selected object and the other virtual object 70 and the sizes, the shapes, the orientations, and the like of the selected object and the other virtual object 70. Specifically, in a case where a selected object is moved, another virtual object 70 satisfying the predetermined bonding condition is searched for. If another virtual object 70 capable of coming into contact with the selected object is found as a result of the search, the bonding object 78 connecting the selected object and the other virtual object 70 appears. Before bonding, the bonding object 78 enables the user to recognize which virtual object 70 a selected object is to be bonded to, and which position of the selected object is to be bonded to which position of the other virtual object 70.

Alternatively, in accordance with the selection of a virtual object 70 (the setting of a virtual object 70 as a selected object), the bonding object 78 may appear on the surfaces of the selected object and another virtual object 70, and when the selected object and the other virtual object 70 satisfy the predetermined bonding condition after that, the bonding object 78 may be formed to connect the selected object and the other virtual object 70.

In a case where a selected object and another virtual object 70 satisfy the predetermined bonding condition, and in a case where preferential bonding portions BP are set on the selected object and the other virtual object 70, the preferential bonding portions are preferentially bonded to each other. Specifically, if a preferential bonding portion BP set on the selected object and a preferential bonding portion BP set on the other virtual object 70 satisfy a first condition (the details will be described below), these preferential bonding portions BP are set as bonding positions. Then, the bonding object 78 is formed to connect these preferential bonding portions BP.

If the preferential bonding portion BP set on the selected object and the preferential bonding portion BP set on the other virtual object 70 do not satisfy the first condition, the preferential bonding portions BP or other portions are set as bonding positions (at this time, the preferential bonding portions BP can be set as bonding positions without being particularly distinguished from the other portions). Specifically, positions satisfying a second condition in the selected object and the other virtual object 70 are set as bonding positions, and the bonding object 78 connecting the bonding positions is generated. For example, the positions satisfying the second condition are the positions where the selected object and the other virtual object 70 come closest to each other. Also in a case where a preferential bonding portion BP is not set on at least either one of the selected object and the other virtual object 70, positions (the closest positions) satisfying the second condition in the selected object and the other virtual object 70 are set as bonding positions. For example, in a case where the preferential bonding portion BP on the selected object and a portion other than the preferential bonding portion on the other virtual object 70 satisfy the second condition, the preferential bonding portion BP on the selected object and the portion other than the preferential bonding portion on the other virtual object 70 are set as bonding positions. The details of the method for generating the bonding object 78 will be described below.

In the example shown in FIG. 11, a preferential bonding portion BP on the engine object 70*a* that is being selected and a preferential bonding portion BP on the wing object 70*b* satisfy the first condition. Thus, the bonding object 78 is displayed to connect these preferential bonding portions BP.

As shown in FIG. 11, if the engine object 70*a* is moved to above the wing object 70*b*, the image 71*a* of the engine object 70*a* is projected onto the surface of the wing object 70*b*. An image 71 of a selected object and a center position 72 of the selected object are projected onto the surface of another virtual object 70, whereby the user can recognize the positional relationship between the selected object and the other virtual object 70.

Figure 12:
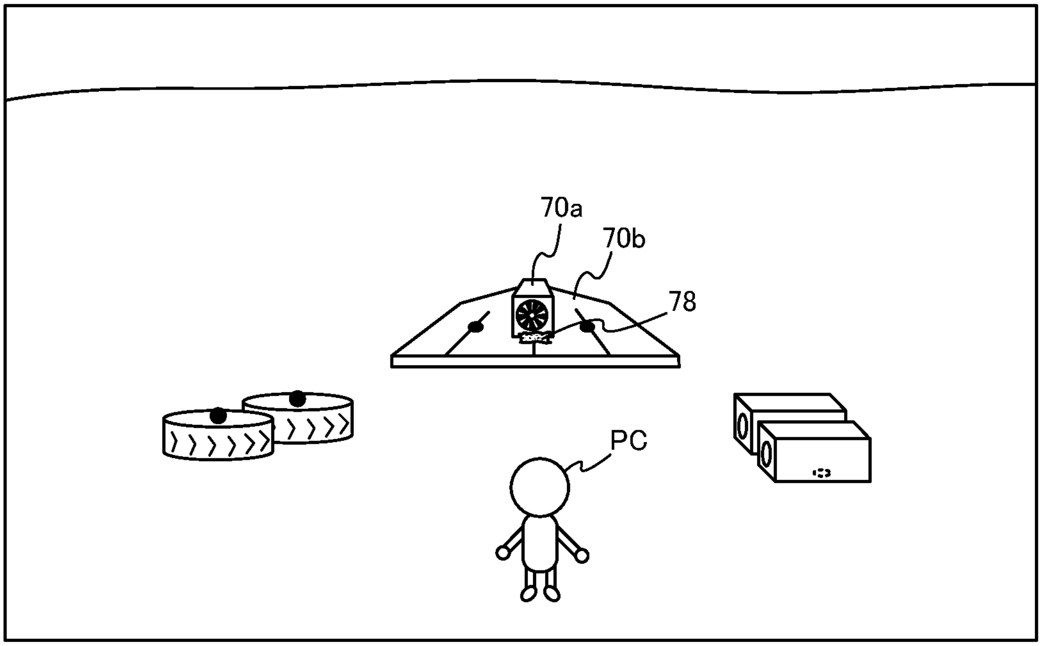
FIG. 12 is an example non-limiting diagram showing an example of a game image after a bonding instruction is given by the user in the state shown in FIG. 11.

FIG. 12 is a diagram showing an example of a game image after a bonding instruction is given by the user in the state shown in FIG. 11. As shown in FIG. 12, if a bonding instruction is given (e.g., the operation buttons 53 to 56 are pressed) by the user when the preferential bonding portions BP are bonded to each other by the bonding object 78, the engine object 70*a* and the wing object 70*b* are bonded to each other at the preferential bonding portions BP. That is, the engine object 70*a* and the wing object 70*b* are bonded to each other such that the preferential bonding portions BP overlap each other. When the two virtual objects 70*a* and 70*b* are bonded to each other, at least one of the two virtual objects 70*a* and 70*b* moves such that the two virtual objects 70*a* and 70*b* pull each other. After the two virtual objects 70*a* and 70*b* are bonded to each other, the selection of the engine object 70*a* made before the bonding instruction is given is cancelled, and the display form of the engine object 70*a* returns to normal. The engine object 70*a* and the wing object 70*b* are bonded to each other, whereby the engine object 70*a* and the wing object 70*b* are formed as an assembled object. From this point onward, these two virtual objects 70 perform an action in a unified manner. That is, after the two virtual objects 70 are bonded to each other, the relative positional relationship between the two virtual objects 70 does not change. If an input satisfying a predetermined release condition is provided, the bonding between the two virtual objects 70 is released. The details of the release of the bonding state of the two virtual objects 70 will be described below.

Also after a selected object and another virtual object 70 are bonded to each other, the bonding object 78 stays between the selected object and the other virtual object 70. Specifically, the bonding object 78 stays along the surface in the periphery of the bonding position on the selected object and the surface in the periphery of the bonding position on the other virtual object 70. In this case, the shape of the bonding object 78 changes before and after the selected object and the other virtual object 70 are bonded to each other. The change in the shape of the bonding object 78 will be described below.

Figure 13:
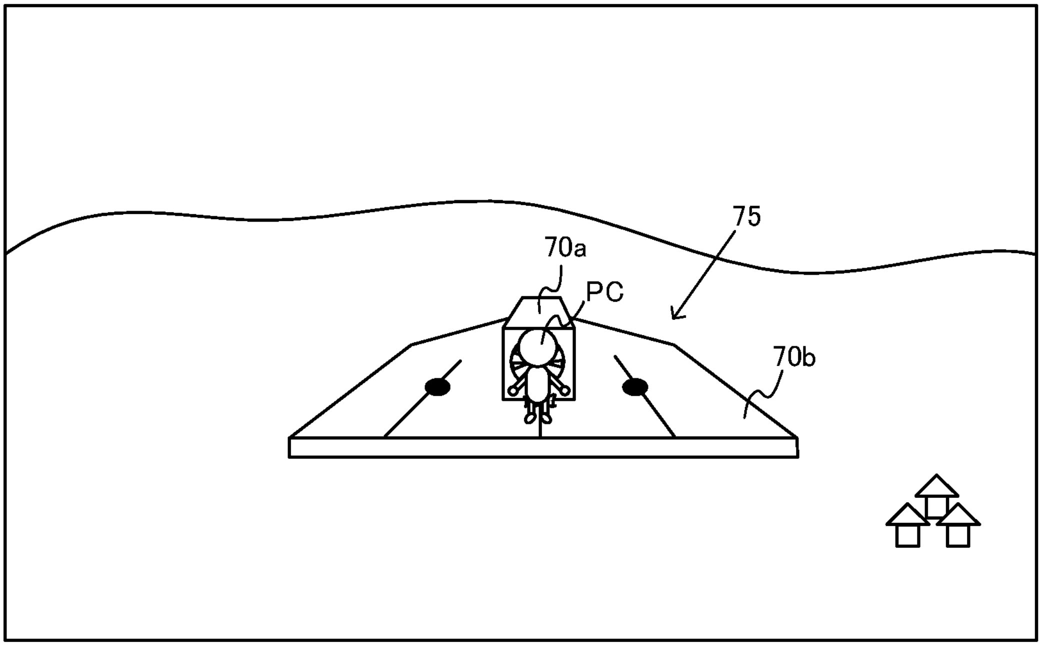
FIG. 13 is an example non-limiting diagram showing an example of an airplane object 75 as an assembled object formed by the engine object 70*a* and a wing object 70*b;*

FIG. 13 is a diagram showing an example of an airplane object 75 as an assembled object formed by the engine object 70*a* and the wing object 70*b*. FIG. 13 shows the state where the user character PC flies in the sky on the airplane object 75.

The behavior of the entirety of the airplane object 75 is determined based on components (the engine object 70*a* and the wing object 70*b*) that form a part of the airplane object 75 and an object (e.g., the user character PC) that does not form a part of the airplane object 75. Specifically, the engine object 70*a* has power and applies a predetermined velocity (or acceleration) to the entirety of the airplane object 75. The wing object 70*b* also applies lift corresponding to the velocity of the airplane object 75 to the entirety of the airplane object 75. The engine object 70*a*, the wing object 70*b*, and the user character PC each have a preset weight. The airplane object 75 is also influenced by a wind in the virtual space. The behavior of the entirety of the flying object 75 is obtained by making physical calculations based on the velocity based on the engine object 70*a*, the lift based on the wing object 70*b*, the weight of each object, the force based on a wind, and the like. For example, if a sufficient velocity is applied by the engine object 70*a*, and sufficient lift is obtained by the wing object 70*b*, the flying object 75 flies in the sky in the virtual space.

To the airplane object 75 formed by the engine object 70*a* and the wing object 70*b* shown in FIG. 13, a different virtual object 70 can also be further bonded. For example, two or more engine objects 70*a* can be bonded to the wing object 70*b*. In this case, the velocity of the airplane object 75 including the two or more engine objects 70*a* is greater. To the side of a single wing object 70*b*, a different wing object 70*b* is bonded, whereby a large wing obtained by unifying the two wing objects 70*b* can also be formed. The airplane object 75 including the two wing objects 70*b* can obtain greater lift and fly even with a heavier object on the airplane object 75.

Figure 14:
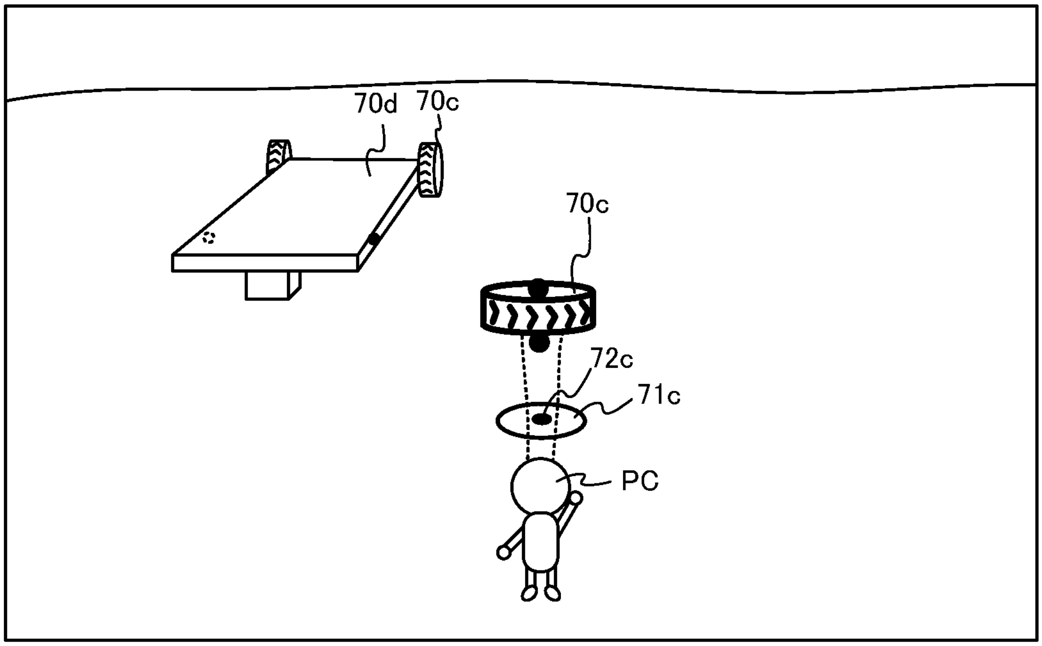
FIG. 14 is an example non-limiting diagram showing an example of a game image immediately after a wheel object 70*c* is selected.
Figure 15:
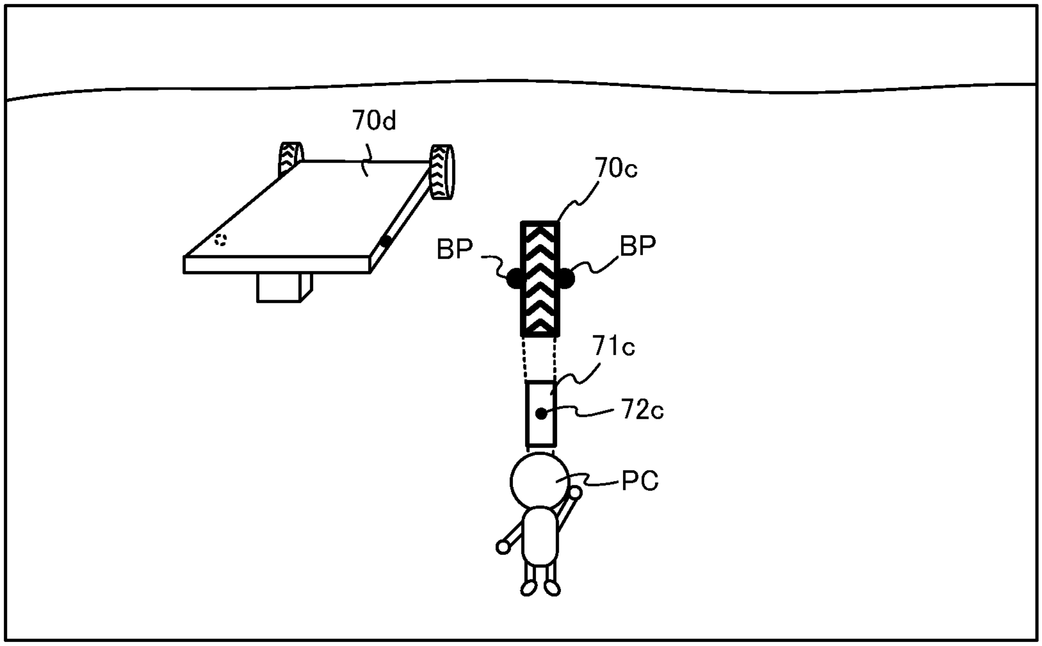
FIG. 15 is an example non-limiting diagram showing an example of a game image after the orientation of the wheel object 70*c* is changed after the wheel object 70*c* is selected.
Figure 16:
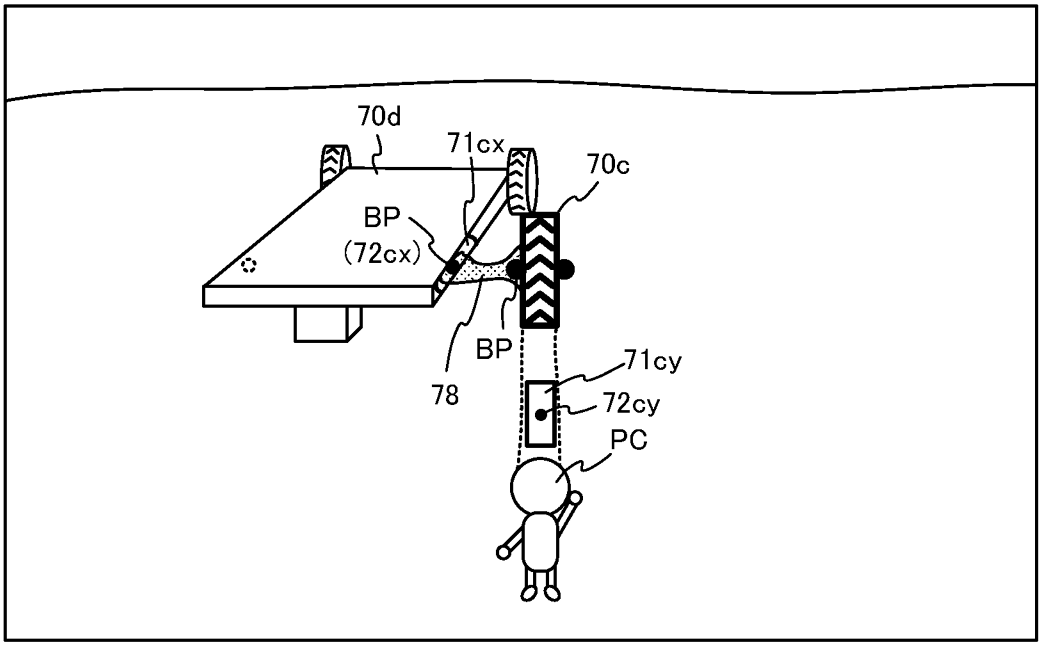
FIG. 16 is an example non-limiting diagram showing an example of a game image when the selected wheel object 70*c* is brought close to a board object 70*d;*
Figure 17:
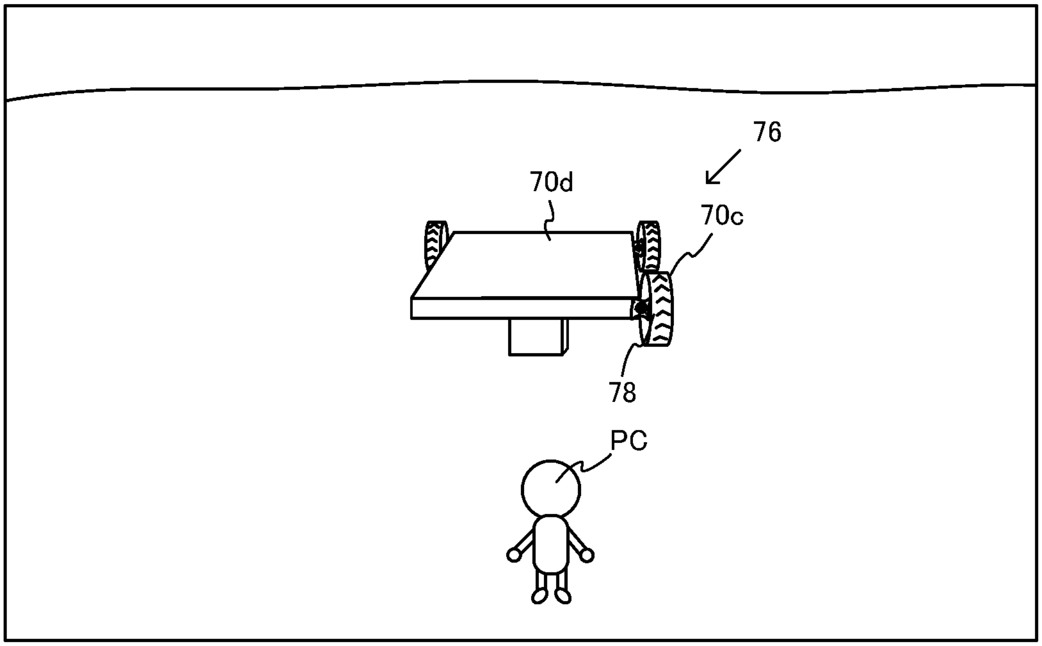
FIG. 17 is an example non-limiting diagram showing an example of a game image after the wheel object 70*c* is bonded to the board object 70*d;*
Figure 18:
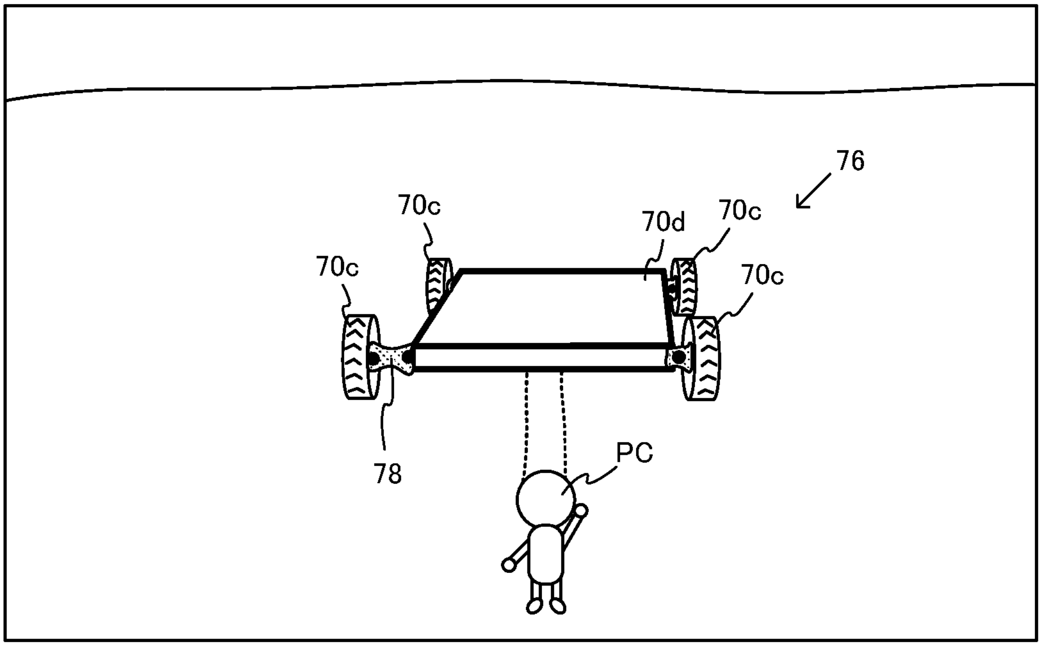
FIG. 18 is an example non-limiting diagram showing an example of the state where the board object 70*d* for forming an assembled object 76 is selected, and wheel objects 70*c* are bonded to the board object 70*d;*
Figure 19:
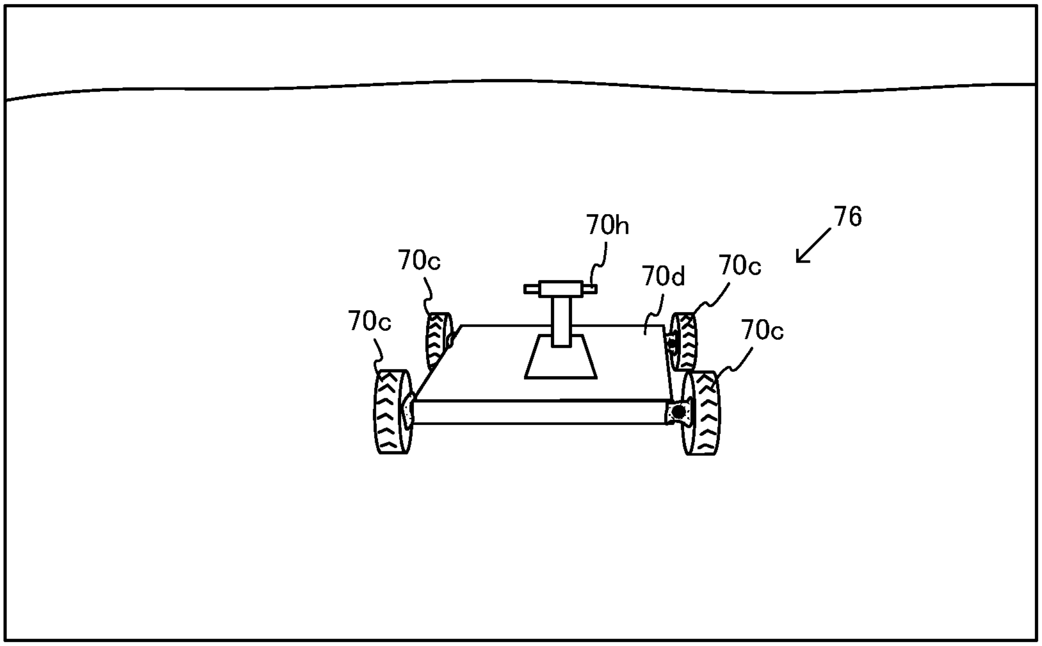
FIG. 19 is an example non-limiting diagram showing an example of a four-wheel vehicle object 76 as an assembled object.

Next, with reference to FIGS. 14 to 19, a case is described where a four-wheel vehicle object as an assembled object is generated using a plurality of virtual objects 70. FIG. 14 is a diagram showing an example of a game image immediately after the wheel object 70*c* is selected. FIG. 15 is a diagram showing an example of a game image after the orientation of the wheel object 70*c* is changed after the wheel object 70*c* is selected. FIG. 16 is a diagram showing an example of a game image when the selected wheel object 70*c* is brought close to the board object 70*d*. FIG. 17 is a diagram showing an example of a game image after the wheel object 70*c* is bonded to the board object 70*d*. FIG. 18 is a diagram showing an example of the state where the board object 70*d* for forming an assembled object 76 is selected, and wheel objects 70*c* are bonded to the board object 70*d*. FIG. 19 is a diagram showing an example of the four-wheel vehicle object 76 as an assembled object.

As shown in FIG. 14, if a selection operation is performed by the user when the wheel object 70*c* placed on the ground is displayed approximately at the center of the screen, the wheel object 70*c* is selected. If the selected wheel object 70*c* is lifted, an image 71*c* of the wheel object 70*c* is projected onto the ground. The image 71*c* projected onto the ground has the same shape as that of the wheel object 70*c* viewed from directly above in the virtual space. A point 72*c* indicating the center position of the wheel object 70*c* is also projected onto the ground.

If a rotation operation is performed by the user in the state shown in FIG. 14, the orientation of the selected wheel object 70*c* in the virtual space changes (FIG. 15). Specifically, the orientation of the wheel object 70*c* is changed so that the axis of rotation of the wheel object 70*c* (the axis about which the wheel rotates) is parallel to the ground. In this case, the image 71*c* of the wheel object 70*c* projected onto the ground also changes.

In the state shown in FIG. 15, the user character PC is moved in the direction of the board object 70*d*. FIG. 15 illustrates an example where two wheel objects 70*c* are already bonded to the board object 70*d*.

If the wheel object 70*c* and the board object 70*d* satisfy the predetermined bonding condition due to the movement of the user character PC (the movement of the wheel object 70*c*), the bonding object 78 connecting the wheel object 70*c* and the board object 70*d* appears (FIG. 16). Specifically, the bonding object 78 is generated to connect a preferential bonding portion BP on the wheel object 70*c* that is being selected and a preferential bonding portion BP set on a side surface of the board object 70*d*. Onto the side surface of the board object 70*d*, an image 71*cx* of the wheel object 70*c* is projected.

Here, the image 71*c* of the wheel object 70*c* that is being selected is projected onto both the ground and the side surface of the board object 70*d*. An image 71 of a selected object is not merely a shadow formed by a light source in the virtual space, but is a thing for making it easy for the user to recognize the positional relationship between the selected object and another virtual object 70. The image 71 of the selected object is formed in an up-down direction, a left-right direction, and the depth direction in the virtual space. Specifically, the selected object is projected based on a straight line parallel to the up-down direction in the virtual space, whereby an image 71*y* in the up-down direction of the selected object is formed on the ground. The selected object is projected based on a straight line parallel to the left-right direction of the virtual camera, whereby an image 71*x* in the left-right direction of the selected object is formed on a surface of another virtual object 70 present in the left-right direction of the selected object. The selected object is projected based on a straight line parallel to the depth direction in the virtual space viewed from the virtual camera, whereby an image 71*z* in the depth direction of the selected object is formed on a surface of another virtual object 70 present in the depth direction of the selected object. In accordance with the presence or absence of a light source and the position of the light source in the virtual space, the shadow of a virtual object 70 is also displayed separately from the image 71.

In the example shown in FIG. 16, the board object 70*d* is present to the left of the wheel object 70*c* that is being selected. Thus, on the side surface of the board object 70*d*, a part of the image 71*cx* in the left-right direction of the wheel object 70*c* is formed. On the side surface of the board object 70*d*, a point 72*cx* indicating the center position of the wheel object 70*c* that is being selected is also displayed.

As described above, a selected object is projected in three directions, namely the up-down direction, the left-right direction, and the depth direction. Thus, if another virtual object 70 is present near the selected object, the image 71 of the selected object and the point 72 indicating the center position are displayed on the surface of the other virtual object 70. Consequently, the user can easily recognize the positional relationship between the selected object and the other virtual object 70. For example, based on the image 71*x* in the left-right direction of the selected object, the user can recognize whether the selected object is located immediately beside the other virtual object 70 or shifted obliquely from the other virtual object 70. Based on the shape of the image 71 of the selected object formed on the surface of the other virtual object 70, the user can recognize the orientation of the selected object.

If a bonding instruction is given by the user when the wheel object 70*c* and the board object 70*d* are bonded to each other by the bonding object 78, the wheel object 70*c* and the board object 70*d* are bonded to each other at the preferential bonding portions BP (FIG. 17). Consequently, an assembled object 76 including three wheel objects 70*c* and a single board object 70*d* is formed.

Further, by a similar procedure, the user can bond a virtual object 70 to the assembled object 76. For example, the user can select a different wheel object 70*c* placed in the virtual space and bond the selected wheel object 70*c* to a left side surface of the board object 70*d* shown in FIG. 17. As shown in FIG. 18, the user selects the board object 70*d* forming the assembled object 76, moves the entirety of the assembled object 76 including the board object 70*d*, and brings the entirety of the assembled object 76 close to the wheel object 70*c* placed in the virtual space. As a result, the bonding object 78 connecting a preferential bonding portion BP on the board object 70*d* and a preferential bonding portion BP on the wheel object 70*c* appears. Then, by giving a bonding instruction, the user can bond the wheel object 70*c* to the select board object 70*d*.

Consequently, the assembled object 76 including four wheel objects 70*c* is generated. If a control yoke object 70*h* is further bonded onto the board object 70*d*, the four-wheel vehicle object 76 as shown in FIG. 19 is generated as an assembled object.

As shown in FIG. 19, the four-wheel vehicle object 76 includes the board object 70*d* forming a vehicle body, the four wheel objects 70*c* forming wheels, and the control yoke object 70*h*. Each of the four wheel objects 70*d* applies a velocity (a speed and a moving direction) to the entirety of the four-wheel vehicle object 76. The control yoke object 70 turns the entirety of the four-wheel vehicle object 76, thereby changing the moving direction of the entirety of the four-wheel vehicle object 76. The user places the user character PC on the four-wheel vehicle object 76, and for example, operates the analog stick 32, and thereby can move the four-wheel vehicle object 76 in a direction corresponding to the input direction of the analog stick 32. Consequently, it is possible to move the user character PC in the virtual space.

Figure 20:
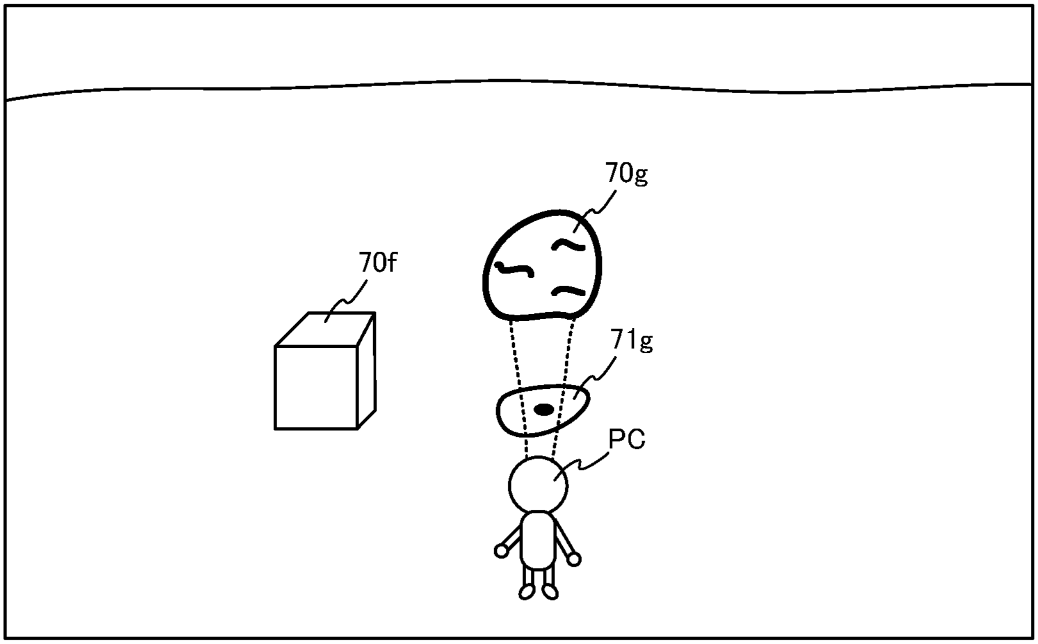
FIG. 20 is an example non-limiting diagram showing an example of a game image immediately after a rock object 70*g* is selected.
Figure 21:
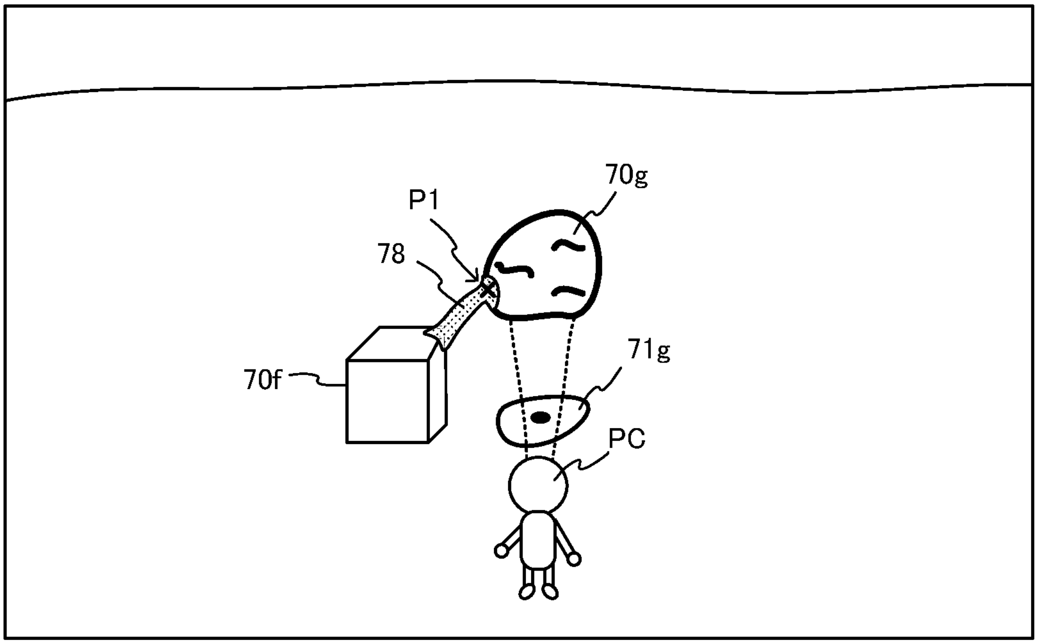
FIG. 21 is an example non-limiting diagram showing an example of a game image when the selected rock object 70*g* is brought close to a box object 70*f;*
Figure 22:
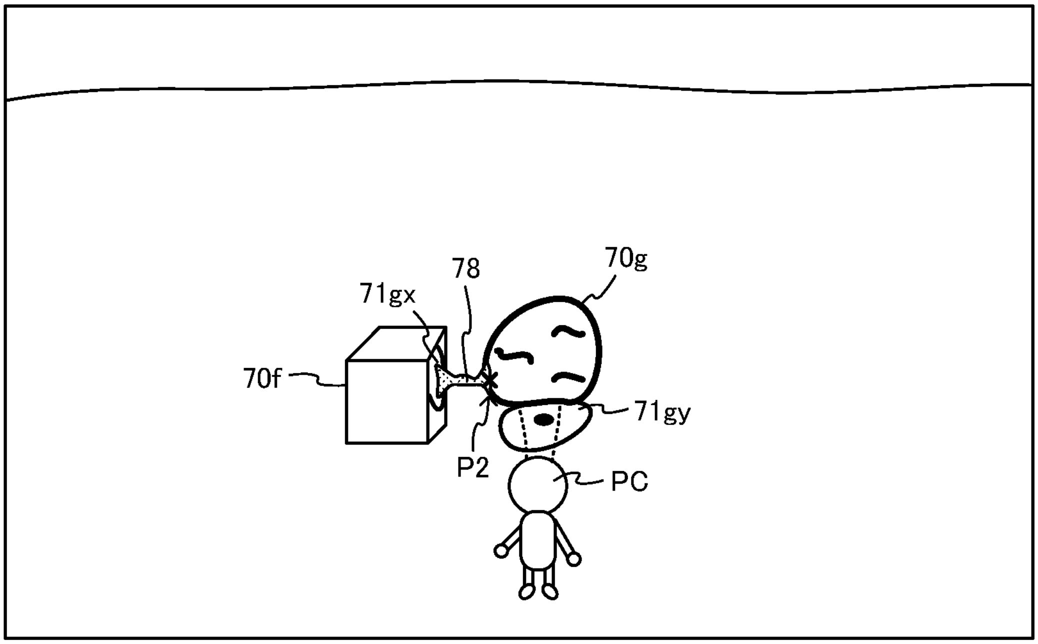
FIG. 22 is an example non-limiting diagram showing an example of a game image when the rock object 70*g* is moved from the state in FIG. 21.
Figure 23:
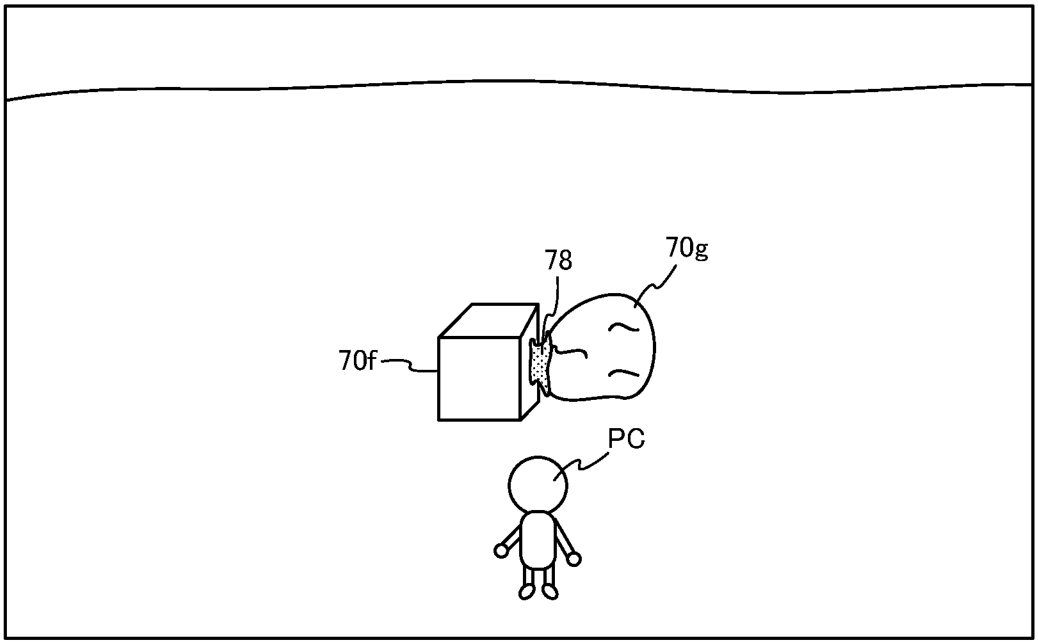
FIG. 23 is an example non-limiting diagram showing an example of a game image when a bonding instruction is given in the state in FIG. 22.

Next, with reference to FIGS. 20 to 23, a case is described where virtual objects 70 on which preferential bonding portions BP are not set are bonded to each other. FIG. 20 is a diagram showing an example of a game image immediately after the rock object 70*g* is selected. FIG. 21 is a diagram showing an example of a game image when the selected rock object 70*g* is brought close to the box object 70*f*. FIG. 22 is a diagram showing an example of a game image when the rock object 70*g* is moved from the state in FIG. 21. FIG. 23 is a diagram showing an example of a game image when a bonding instruction is given in the state in FIG. 22.

As shown in FIGS. 20 and 21, if the rock object 70*g* placed on the ground is selected and brought close to the box object 70*f*, the bonding object 78 connecting the rock object 70*g* that is being selected and the box object 70*f* appears.

Here, preferential bonding portions BP are not set on the rock object 70*g* and the box object 70*f*. In this case, the position on the surface of the rock object 70*g* closest to the box object 70*f* is set as a bonding position. Similarly, the position on the surface of the box object 70*f* closest to the rock object 70*g* is set as a bonding position. The bonding object 78 is displayed to connect these two bonding positions. For example, in FIG. 21, a point P1 on the rock object 70*g* and a corner of the box object 70*f* are the closest positions. Thus, these positions are bonded to each other by the bonding object 78.

If the rock object 70*g* is moved from the state in FIG. 21, the bonding positions indicated by the bonding object 78 change (FIG. 22). For example, in FIG. 21, the bonding object 78 indicates the point P1 on the rock object 70*g* and the corner of the box object 70*f* as bonding positions. In contrast, in FIG. 22, a point P2 on the rock object 70*g* and a central portion on a side surface of the box object 70*f* are the closest positions, the bonding object 78 indicates these positions as bonding positions.

As described above, a selected object is projected in each of the up-down direction, the left-right direction, and the depth direction in the virtual space. Thus, if a surface of projection is present in these directions, an image 71 of the selected object is generated on the surface of projection. In FIG. 21, the box object 70*f* is not present immediately beside the rock object 70*g*. Thus, an image 71*gx* of the rock object 70*g* is not displayed on the side surface of the box object 70*f*. On the other hand, in FIG. 22, the box object 70*f* is located approximately immediately beside the rock object 70*g*. Thus, the image 71*gx* of the rock object 70*g* is displayed on the side surface of the box object 70*f*. Although not shown in the figures, a point 72*gx* indicating the center position of the rock object 70*g* is also displayed on the side surface of the box object 70*f*. In FIGS. 21 and 22, an image 71*gy* of the rock object 70*g* is projected onto the ground.

If a bonding instruction is given in the state in FIG. 22, the rock object 70*g* and the box object 70*f* are bonded to each other (FIG. 23). Specifically, the point P2 on the rock object 70*g* and the central portion on the side surface of the box object 70*f* are bonded to each other. That is, at least one of the rock object 70*g* and the box object 70*f* moves so that the point P2 on the rock object 70*g* and the central portion on the side surface of the box object 70*f* overlap each other. Also after the rock object 70*g* and the box object 70*f* are bonded to each other, the bonding object 78 stays.

(Details of Method for Generating Bonding Object 78)

Next, a description is given of the details of the method for generating the bonding object 78. With reference to FIGS. 24 to 28, a case is described where two virtual objects 70 are bonded to each other at portions other than preferential bonding portions BP.

Figure 24:
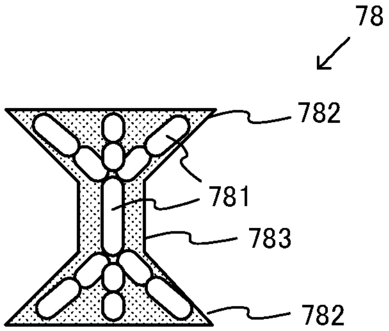
FIG. 24 is an example non-limiting diagram showing an example of the basic shape of a bonding object 78.

FIG. 24 is a diagram showing an example of the basic shape of the bonding object 78. As shown in FIG. 24, the bonding object 78 includes two first portions 782 forming a bottom surface and an upper surface, and a second portion 783 connecting the two first portions 782. The first portions 782 are bonded to bonding positions on virtual objects 70. The first portions 782 and the second portion 783 include a plurality of bones 781. The bones 781 are frames for defining the shape of the bonding object 78. A surface is formed around the plurality of bones 781. Each of the plurality of bones 781 is deformed, thereby deforming the entirety of the bonding object 78. A description is given below of the method for generating the bonding object 78 between two virtual objects 70.

FIGS. 25 to 28 are diagrams illustrating the method for deforming the bonding object 78.

As described above, if two virtual objects 70 are not bonded to each other at preferential bonding portions BP, the positions where the two virtual objects 70 come closest to each other are set as bonding positions. Specifically, first, it is determined whether or not a selected object and another virtual object 70 satisfy the predetermined bonding condition.

Figure 25:
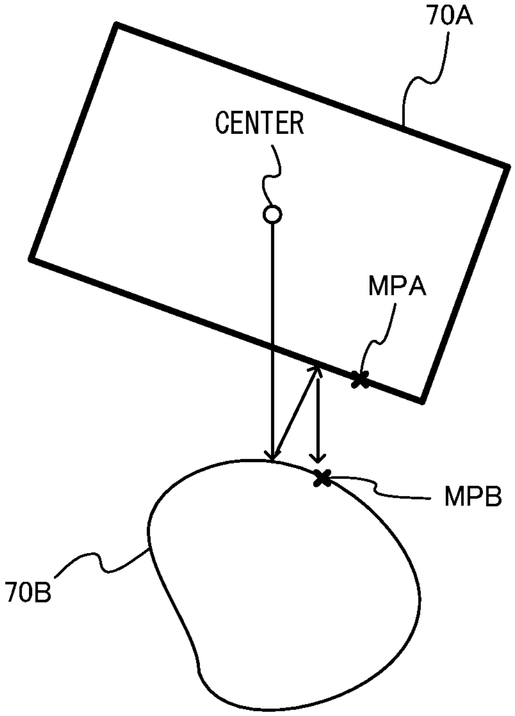
FIG. 25 is an example non-limiting diagram illustrating a method for deforming the bonding object 78.

As shown in FIG. 25, if a selected object 70A and another virtual object 70B satisfy the predetermined bonding condition, the closest positions on the selected object 70A and the other virtual object 70B to each other are calculated. The method for calculating the closest positions is any method. For example, the positions where the selected object 70A and the other virtual object 70B come closest to each other are recursively obtained starting from the center of the selected object 70A. As a result of this, for example, a point MPA on the selected object 70A and a point MPB on the other virtual object 70B are calculated as the closest positions.

Next, a normal vector at the point MPA on the selected object 70A and a normal vector at the point MPB on the other virtual object 70B are calculated, and a plane perpendicular to each normal vector is calculated. Next, a cut plane 74 is calculated by averaging the two calculated planes. Specifically, the cut plane 74 is a plane passing through the midpoint between the point MPA and the point MPB and having as a normal a vector obtained by averaging the normal vector at the point MPA and the normal vector at the point MPB.

Figure 26:
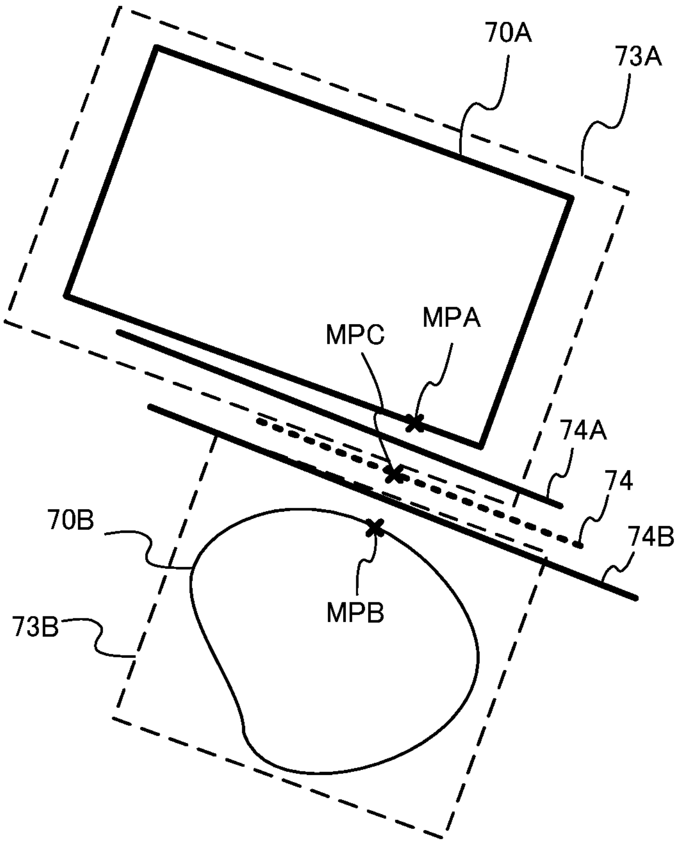
FIG. 26 is an example non-limiting diagram illustrating the method for deforming the bonding object 78.

Next, as shown in FIG. 26, using the calculated cut plane 74, a bounding box 73A of the selected object 70A and a bounding box 73B of the other virtual object 70B are cut. Here, a bounding box is a solid surrounding each virtual object 70 and is set for the virtual object 70. The bounding box is a solid having a simpler shape than or the same shape as that of the virtual object 70 corresponding to the bounding box. Specifically, the calculated cut plane 74 is placed at a position away from a midpoint MPC between the point MPA and the point MPB by a predetermined distance further on the point MPA side in a direction normal to the cut plane 74, and using a cut plane 74A placed at this position, the bounding box 73A is cut. Further, the calculated cut plane 74 is placed at a position away from the midpoint MPC by a predetermined distance further on the point MPB side in a direction normal to the cut plane 74, and using a cut plane 74B placed at this position, the bounding box 73B is cut.

Figure 27:
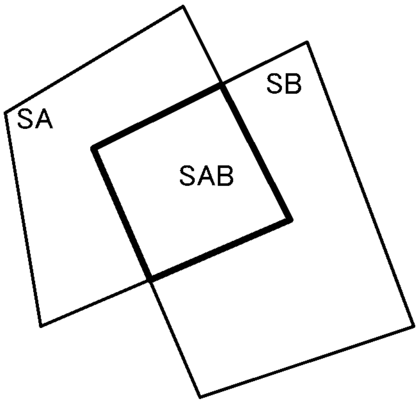
FIG. 27 is an example non-limiting diagram illustrating the method for deforming the bonding object 78.

FIG. 27 shows a cross section SA obtained by cutting the bounding box 73A of the selected object 70A at the cut plane 74A, and a cross section SB obtained by cutting the bounding box 73B of the other virtual object 70B at the cut plane 74B. A plane SAB is calculated by overlapping these two cross sections, namely the cross section SA and the cross section SB. The plane SAB is a plane obtained by projecting the cross section SA onto the cross section SB (or projecting the cross section SB onto the cross section SA). Based on the size of the plane SAB, the sizes of the bones 781 of the bonding object 78 are determined. For example, the sizes of the bones 781 of the first portions 782 are determined so that the first portions 782 of the bonding object 78 match the shape of the plane SAB. Then, the first portions 782 of the bonding object 78 are placed on the plane SAB. That is, one of the first portions 782 of the bonding object 78 is placed in a portion of the cross section SA corresponding to the plane SAB. The other first portion 782 of the bonding object 78 is placed in a portion of the cross section SB corresponding to the plane SAB.

Figure 28:
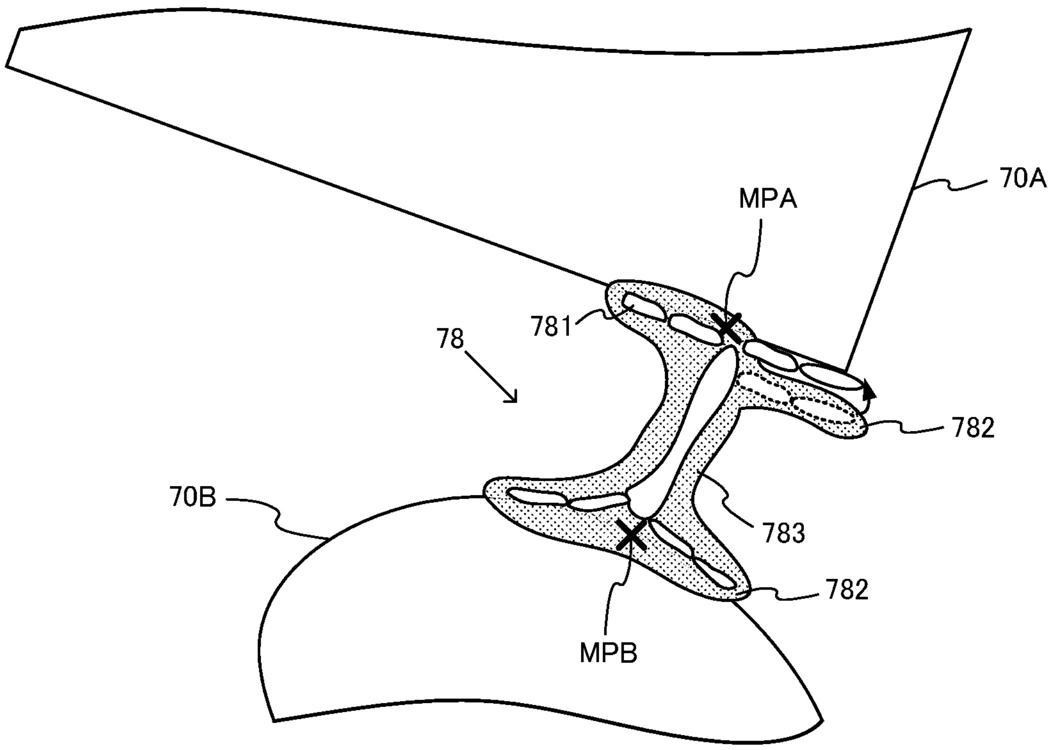
FIG. 28 is an example non-limiting diagram illustrating the method for deforming the bonding object 78.

Then, as shown in FIG. 28, the bones 781 of the bonding object 78 are deformed along the surface of each virtual object 70. For example, bones 781 indicated by dashed lines and included in one of the first portions 782 of the bonding object 78 are deformed along the surface of the selected object 70A. In FIG. 28, the bones 781 before being deformed are indicated by dashed lines, and the bones 781 after being deformed are indicated by solid lines. The bones 781 are thus deformed, whereby the bonding object 78 deforms in firm contact with the surfaces of the selected object 70A and the other virtual object 70B. Specifically, one of the first portions 782 of the bonding object 78 comes into firm contact with a surface in a predetermined range including the point MPA on the selected object 70A, and the other first portion 782 of the bonding object 78 comes into firm contact with a surface in a predetermined range including the point MPB on the other virtual object 70B. In accordance with the distance between the point MPA and the point MPB, the second portion 783 of the bonding object 78 is deformed. Thus, if the distance between the selected object 70A and the other virtual object 70B is short, the bonding object 78 becomes short. If the distance is long, the bonding object 78 becomes long.

As described above, if two virtual objects 70 are not bonded to each other at preferential bonding portions BP, first, the closest positions MPA and MPB on the two virtual objects 70 are set as bonding positions. Then, between the two virtual objects 70, the bonding object 78 is generated to connect the bonding positions. In a case where the two virtual objects 70 are not yet bonded to each other (i.e., in a case where a bonding instruction is not yet given since the bonding object 78 appears between the two virtual objects 70), and if the positional relationship between the two virtual objects 70 changes, the bonding positions also change. For example, if the selected object 70A is distanced from or brought close to the other virtual object 70B, the closest positions MPA and MPB change. If the orientation of the selected object 70A is changed, the closest positions MPA and MPB change. The bonding object 78 changes to always connect the closest positions MPA and MPB. In other words, the bonding positions on the two virtual objects 70 indicated by the bonding object 78 change in accordance with a change in the positional relationship between the two virtual objects 70 (in accordance with the movement of the selected object 70A). The shape of the entirety of the bonding object 78 also changes in accordance with a change in the positional relationship between the two virtual objects 70 (in accordance with the movement of the selected object 70A).

The bonding object 78 is thus generated, whereby the user can easily recognize the position where the two virtual objects 70 are bonded to each other. Consequently, it is easy to assemble the two virtual objects 70.

If a bonding instruction is given by the user in the state shown in FIG. 28, the selected object 70A and the other virtual object 70B are bonded to each other at the closest positions MPA and MPB. Specifically, the positions of the selected object 70A and the other virtual object 70B are changed so that the distance between the two closest positions MPA and MPB becomes 0 for a predetermined time (a plurality of frame times). In this period, the orientation of the other virtual object 70B relative to the selected object 70A does not change. Also in this period, the shape of the bonding object 78 is obtained as described above. In accordance with the distance between the closest positions MPA and MPB, the shape of the bonding object 78 also changes. Then, if the two closest positions MPA and MPB match each other, the bonding between the two virtual objects 70 is completed. Also after the two virtual objects 70 are bonded to each other, the bonding object 78 stays in the periphery of the bonding positions. The shape of the bonding object 78 after the two virtual objects 70 are bonded to each other is also obtained by the above method. After the two virtual objects 70 are bonded to each other, the relative positional relationship between the two virtual objects 70 does not change. Thus, the shape of the bonding object 78 does not change.

Here, that the bonding object "stays" may include the state where the same bonding object as a bonding object before the bonding strictly on data stays as it is, and the state where a bonding object stays in a form in which the bonding object apparently seems as if the bonding object were present although data of the bonding object is different from that of a bonding object before the bonding. For example, while the bonding object includes the plurality of bones (data for determining the three-dimensional shape of the bonding object) as described above, a bonding object that stays after two virtual objects 70 are bonded to each other may include a plurality of bones similarly to a bonding object before the bonding. The bonding object that stays after the two virtual objects 70 are bonded to each other may be displayed between the two virtual objects 70 as an object which apparently seems as if the bonding object were the same as the above bonding object including the plurality of bones, but which does not include a plurality of bones or in which the number of bones is reduced. The bonding object that stays after the two virtual objects 70 are bonded to each other may be displayed between the two virtual objects 70 as a mere image that apparently seems as if the mere image were the same as the above bonding object.

A cover object that covers bonding positions on the two virtual objects 70 bonded to each other may be displayed. The above bonding object displayed before the bonding may stay as the cover object at the bonding positions after the bonding. The cover object may be the same object as the bonding object on data, or may be an object (including a mere image) that can be apparently regarded as the bonding object, or may be an object also apparently different from the bonding object.

As described above, after the two virtual objects 70 are bonded to each other, the cover object that covers the bonding positions (the above bonding object, the object that can be apparently regarded as the bonding object, or the object also apparently different from the bonding object) is present, whereby the user can recognize the bonding positions. For example, in a case where an assembled object is formed by two large virtual objects 70 coming into point contact with each other, and if the cover object is not present in a portion where the two virtual objects 70 are in the point contact with each other, the two virtual objects 70 may seem to be assembled by point contact, and the user may feel discomfort. In the exemplary embodiment, in a portion where the two virtual objects 70 are in contact with each other, the cover object having a volume covering the contact portion is present. Thus, the two virtual objects 70 seem to be bonded to each other by such a cover object (e.g., a bonding object like an adhesive). Thus, it is possible to reduce such discomfort.

Figure 29:
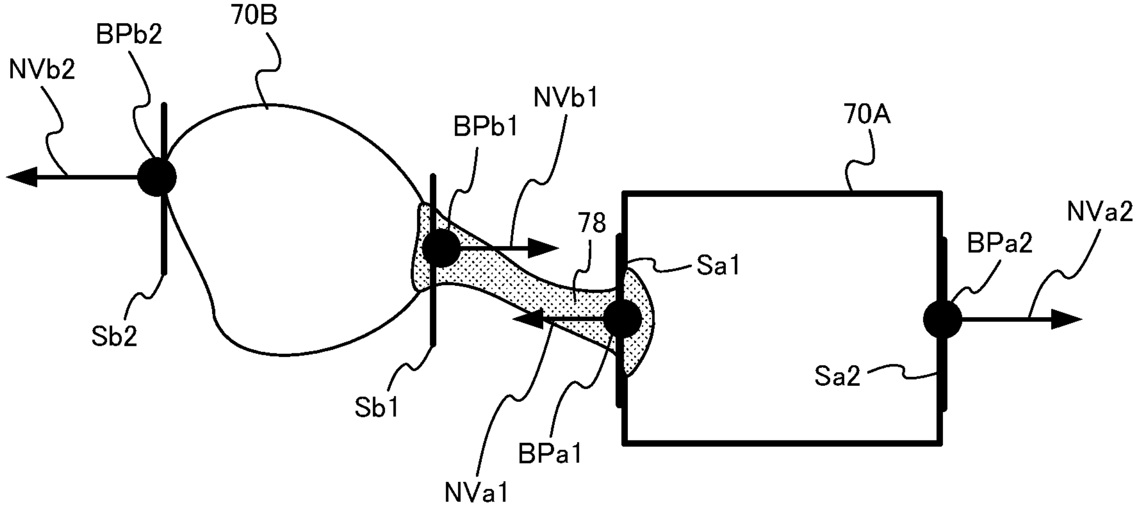
FIG. 29 is an example non-limiting diagram illustrating the generation of the bonding object 78 in a case where two virtual objects 70 are bonded to each other at preferential bonding portions BP.

Next, a case is described where two virtual objects 70 are bonded to each other at preferential bonding portions BP. FIG. 29 is a diagram illustrating the generation of the bonding object 78 in a case where two virtual objects 70 are bonded to each other at preferential bonding portions BP.

In a case where a selected object 70A and another virtual object 70B satisfy the predetermined bonding condition, and if a preferential bonding portion BPa on the selected object 70A and a preferential bonding portion BPb on the other virtual object 70B satisfy the first condition, the two preferential bonding portions BP are set as bonding positions. Then, the bonding object 78 connecting these two preferential bonding portions BP is generated. For example, if a preferential bonding portion BPa1 on the selected object 70A and a preferential bonding portion BPb1 on the other virtual object 70B satisfy the first condition, the bonding object 78 connecting the preferential bonding portion BPa1 and the preferential bonding portion BPb1 is generated.

Here, the first condition includes the following three conditions A to C.

(Condition A) The distance between the preferential bonding portion BPa on the selected object 70A and the preferential bonding portion BPb on the other virtual object 70B is less than or equal to a predetermined threshold.

(Condition B) The angle between a normal vector NVa set at the preferential bonding portion BPa and the reverse vector of a normal vector NVb set at the preferential bonding portion BPb is less than or equal to a predetermined threshold.

(Condition C) (C-1) The preferential bonding portion BPa is present further on a side indicated by the normal vector NVb than a plane Sb passing through the preferential bonding portion BPb and perpendicular to the normal vector NVb, and (C-2) the preferential bonding portion BPb is present further on a side indicated by the normal vector NVa than a plane Sa passing through the preferential bonding portion BPa and perpendicular to the normal vector NVa.

For example, in the example shown in FIG. 29, the distance between the preferential bonding portion BPa1 and the preferential bonding portion BPb1 is less than or equal to the predetermined threshold. Thus, these two preferential bonding portions BPa1 and BPb1 satisfy the condition A. In FIG. 29, the normal vector NVa1 and the normal vector NVb1 are directed in opposite directions to each other. That is, the angle between the normal vector NVa1 and the reverse vector of the normal vector NVb1 is 0 degrees. Thus, in the example shown in FIG. 29, the two preferential bonding portions BPa1 and BPb1 satisfy the condition B. At each preferential bonding portions BP, a normal vector NV indicating a normal at this point is set in advance. The normal vector NV at the preferential bonding portion BP may not be set in advance, and may be obtained by calculation each time.

The above condition C is that, as in the preferential bonding portions BPa1 and BPb1 in FIG. 29, the two preferential bonding portions BPa and BPb have a relationship where the two preferential bonding portions BPa and BPb face each other. That is, the preferential bonding portion BPa1 is present further on a side indicated by the normal vector NVb1 (the right side in FIG. 29) than a plane Sb1 passing through the preferential bonding portion BPb1 and perpendicular to the normal vector NVb1 (satisfies the above C-1). The preferential bonding portion BPb1 is present further on a side indicated by the normal vector NVa1 (the left side in FIG. 29) than a plane Sa1 passing through the preferential bonding portion BPa1 and perpendicular to the normal vector NVa1 (satisfies the above C-2). Thus, in the example shown in FIG. 29, the preferential bonding portion BPa1 and the preferential bonding portion BPb1 satisfy the condition C.

A preferential bonding portion BPb2 does not satisfy the condition C in a relationship with the preferential bonding portion BPa1. That is, the preferential bonding portion BPa1 is not present further on a side indicated by the normal vector NVb2 (the left side in FIG. 29) than a plane Sb2 passing through the preferential bonding portion BPb2 and perpendicular to the normal vector NVb2. In other words, the preferential bonding portion BPa1 is located on the opposite side of the normal vector NVb2 with respect to the plane Sb2.

Thus, in a relationship with the preferential bonding portion BPa1, only the preferential bonding portion BPb1 satisfies the above three conditions A to C. Thus, the preferential bonding portion BPa1 and the preferential bonding portion BPb1 are set as bonding positions. Then, as shown in FIG. 29, the bonding object 78 is generated to connect the preferential bonding portion BPa1 and the preferential bonding portion BPb1.

The bonding object 78 is generated by the same method as the above method. That is, in FIGS. 25 to 28, the closest positions on the selected object 70A and the other virtual object 70B to each other are set as bonding positions. Instead of the closest positions, the preferential bonding portions BPa1 and BPb1 are set as bonding positions. Then, the bonding object 78 is generated to connect these two bonding positions. Specifically, the bonding object 78 is generated in firm contact with a surface in a predetermined range including the preferential bonding portion BPa1 on the selected object 70A and in firm contact with a surface in a predetermined range including the preferential bonding portion BPb1 on the other virtual object 70B.

There can also be a case where, for a single certain preferential bonding portion BPa on the selected object 70A, a plurality of preferential bonding portions BPb on another virtual object 70B satisfying the first condition are present. In this case, any one of the plurality of preferential bonding portions BPb satisfying the first condition in a relationship with the preferential bonding portion BPa is selected as a preferential bonding portion BPb to be paired with the preferential bonding portion BPa. For example, among the plurality of preferential bonding portions BPb, the closest preferential bonding portion BPb to the preferential bonding portion BPa may be selected. Among the plurality of preferential bonding portions BPb, a preferential bonding portion BPb having the normal vector NVb closest in direction to the normal vector NVa set in the preferential bonding portion BPa (whose angle to the normal vector NVa is closest to 180 degrees) may be selected. Then, these two preferential bonding portions BPa and BPb paired with each other are set as bonding positions, and the bonding object 78 connecting the two preferential bonding portions BPa and BPb is generated.

There is also a case where a plurality of pairs of preferential bonding portions BPa and BPb satisfying the first condition are present. In this case, among the plurality of pairs of preferential bonding portions BPa and BPb, a pair having the shortest distance may be selected, and the bonding object 78 connecting the two preferential bonding portions BPa and BPb of the selected pair may be generated. If a plurality of pairs having the shortest distance are present, a plurality of bonding objects 78 connecting the pairs are generated.

If a bonding instruction is given by the user when the preferential bonding portion BPa1 and the preferential bonding portion BPb1 are bonded to each other by the bonding object 78, the two preferential bonding portions BP are bonded to each other. In this case, the positional relationship between the two virtual objects 70 is changed so that the positions of the preferential bonding portion BPa1 and the preferential bonding portion BPb1 match each other, and the angle between the normal vector NVa1 and the reverse vector of the normal vector NVb1 is 0 degrees.

Figure 30:
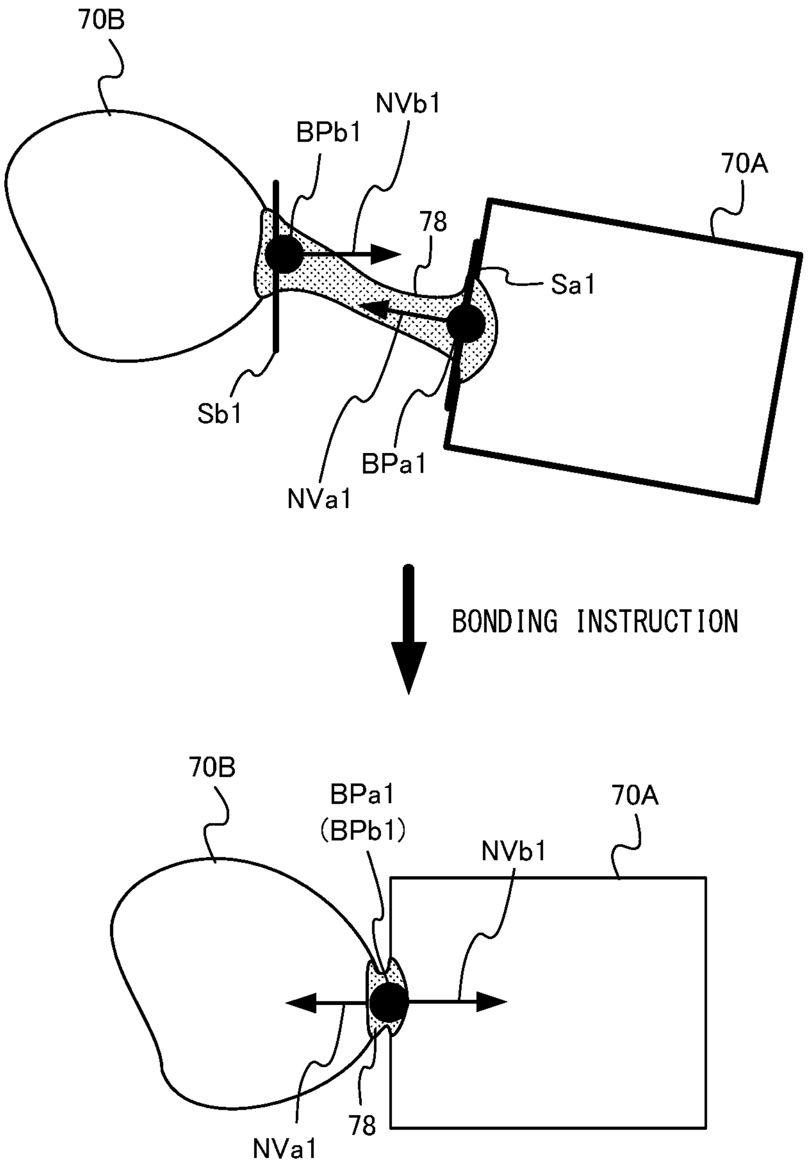
FIG. 30 is an example non-limiting diagram showing the positional relationship before and after a bonding instruction is given in a case where the two virtual objects 70 are bonded to each other at the preferential bonding portions BP.

FIG. 30 is a diagram showing the positional relationship before and after a bonding instruction is given in a case where the two virtual objects 70 are bonded to each other at the preferential bonding portions BP.

As shown in the upper diagram of FIG. 30, before a bonding instruction is given, the preferential bonding portion BPa1 on the selected object 70A and the preferential bonding portion BPb1 on the other virtual object 70B are not the closest positions on the two virtual objects 70, but satisfy the first condition. That is, (Condition A) the distance between the preferential bonding portion BPa1 and the preferential bonding portion BPb1 is less than or equal to the predetermined threshold. Further, (Condition B) the angle between the normal vector NVa1 at the preferential bonding portion BPa1 and the reverse vector of the normal vector NVb1 at the preferential bonding portion BPb1 is greater than 0 degrees, but is less than or equal to the predetermined threshold. From the figure, the preferential bonding portion BPa1 and the preferential bonding portion BPb1 satisfy the condition C. Thus, the preferential bonding portion BPa1 and the preferential bonding portion BPb1 satisfy the first condition. Thus, the preferential bonding portions BPa1 and BPb1 are set as bonding positions, and the bonding object 78 connecting the preferential bonding portions BPa1 and BPb1 is generated.

If a bonding instruction is given by the user in this state, as shown in the lower diagram of FIG. 30, the preferential bonding portion BPa1 and the preferential bonding portion BPb1 are bonded to each other. Specifically, the positions of the preferential bonding portion BPa1 and the preferential bonding portion BPb1 match each other. Further, the orientations of the two virtual objects 70 are adjusted so that the angle between the normal vector NVa1 and the reverse vector of the normal vector NVb1 is 0 degrees. In other words, the orientation of at least either one of the selected object 70A and the other virtual object 70B is adjusted so that a direction normal to the preferential bonding portion BPa1 and a direction normal to the preferential bonding portion BPb1 are parallel to each other.

At each preferential bonding portion BP, in addition to a normal vector NV, a tangent vector TL perpendicular to the normal vector NV is set. The tangent vector TL is a vector indicating a tangent at the preferential bonding portion BP. If two virtual objects 70 are bonded to each other at preferential bonding portions BP, the relative orientation of the two virtual objects 70 is controlled in accordance with the tangent vector TL.

Figure 31:
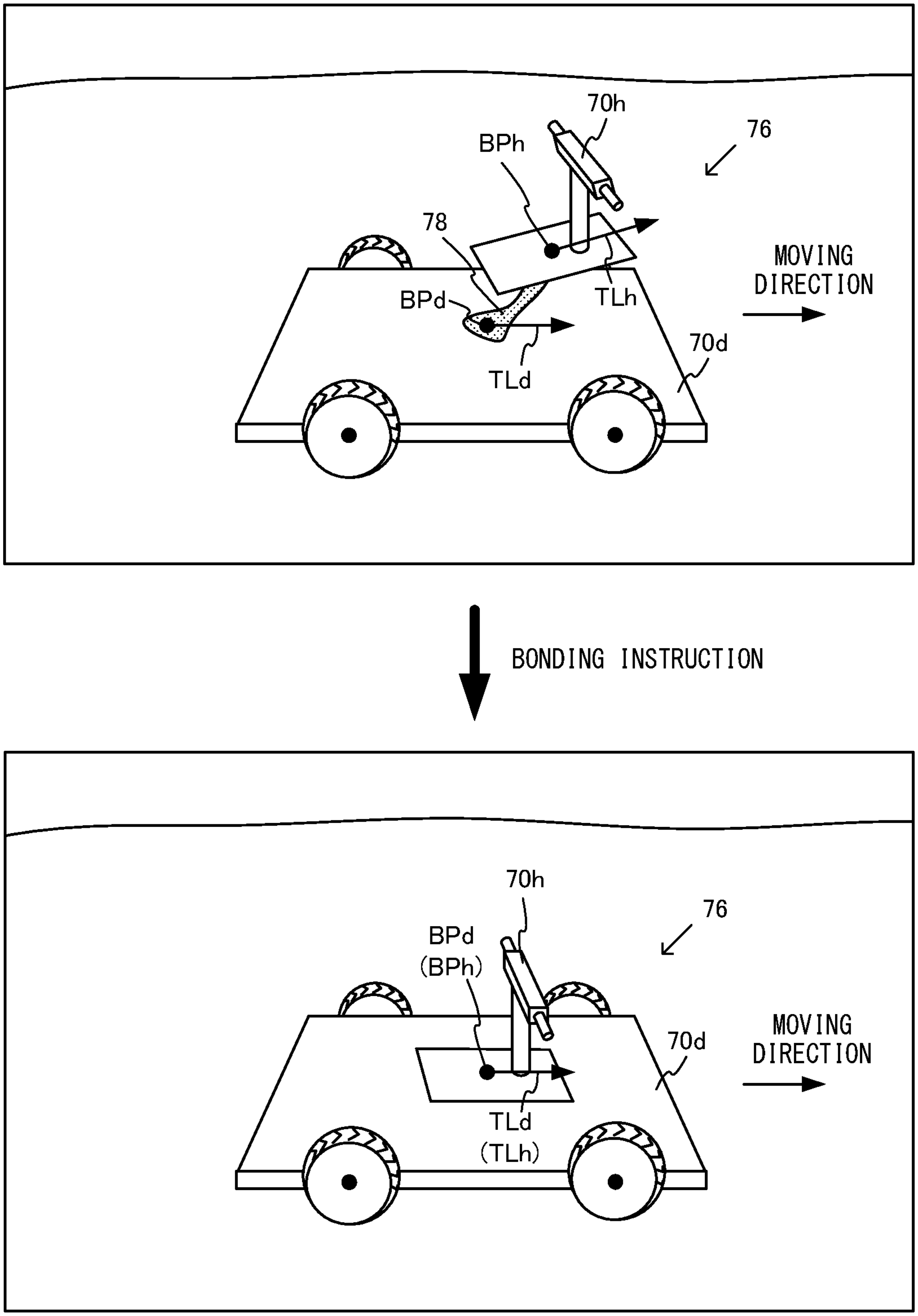
FIG. 31 is an example non-limiting diagram illustrating an example where the orientation of a selected object is controlled in accordance with a tangent vector TL.

FIG. 31 is a diagram illustrating an example where the orientation of a selected object is controlled in accordance with the tangent vector TL.

In the upper diagram of FIG. 31, the board object 70*d* and the control yoke object 70*h* are not yet bonded to each other, and a preferential bonding portion BPd on the board object 70*d* and a preferential bonding portion BPh on the control yoke object 70*h* are bonded to each other by the bonding object 78. For example, at the preferential bonding portion BPd set on an upper surface of the board object 70*d*, a tangent vector TLd parallel to the upper surface of the board object 70*d* and directed in the forward direction of the board object 70*d* is set in advance. At the preferential bonding portion BPh set on a bottom surface of the control yoke object 70*h*, a tangent vector TLh parallel to the bottom surface of the control yoke object 70*h* and directed in the forward direction of the control yoke object 70*h* is set in advance. In the upper diagram of FIG. 31, the angle between the tangent vector TLd and the tangent vector TLh is not 0 degrees, but has a certain angle.

If a bonding instruction is given in this state, as shown in the lower diagram of FIG. 31, the direction of the control yoke object 70*h* is controlled so that the angle between the tangent vector TLd and the tangent vector TLh is any of a plurality of preset angles, and the control yoke object 70*h* and the board object 70*d* are bonded to each other. The preset angles may be, for example, 0 degrees, 45 degrees, 90 degrees, 135 degrees, and 180 degrees. For example, if the angle between the tangent vector TLd and the tangent vector TLh immediately before the bonding instruction is given is in the range of 0 degrees to 30 degrees, and when the bonding instruction is given, the direction of the control yoke object 70*h* is adjusted so that the angle between the tangent vector TLd and the tangent vector TLh is 0 degrees. If the angle between the tangent vector TLd and the tangent vector TLh immediately before the bonding instruction is given is in the range of 31 degrees to 74 degrees, and when the bonding instruction is given, the direction of the control yoke object 70*h* is adjusted so that the angle between the tangent vector TLd and the tangent vector TLh is 45 degrees. That is, if the angle between the tangent vector TLd and the tangent vector TLh is in a first range, the direction of the control yoke object 70*h* is adjusted so that the angle between the tangent vector TLd and the tangent vector TLh is a first angle. If the angle between the tangent vector TLd and the tangent vector TLh is in a second range, the direction of the control yoke object 70*h* is adjusted so that the angle between the tangent vector TLd and the tangent vector TLh is a second angle.

In the example of FIG. 31, the direction of the control yoke object 70*h* is controlled so that the angle between the tangent vector TLh on the control yoke object 70*h* and the tangent vector TLd on the board object 70*d* is 0 degrees. Consequently, it is possible to easily bond the control yoke object 70*h* in the same direction as the moving direction of the four-wheel vehicle object 76.

As described above, the selected object 70A and the other virtual object 70B are preferentially bonded to each other between preferential bonding portions. Preferential bonding portions are set in advance on each virtual object 70 and set at the center of the virtual object 70, at symmetrical positions, or the like. The preferential bonding portion BPa on the selected object 70A and the preferential bonding portion BPb on the other virtual object 70B are bonded to each other in an overlapping manner. Thus, the user can bond the selected object 70A and the other virtual object 70B at appropriate positions without finely controlling the position of the selected object 70A.

At each preferential bonding portions BP, a normal vector NV is set in advance. If two preferential bonding portions BP are bonded to each other, two normal vectors NV are controlled to be directed in opposite directions to each other. Thus, the user can bond the selected object 70A and the other virtual object 70B in appropriate orientations without finely controlling the orientation of the selected object 70A.

At each preferential bonding portions BP, a tangent vector TL is set in advance. If two preferential bonding portions BP are bonded to each other, two tangent vectors TL are controlled so that the two tangent vectors TL have any of a plurality of preset angles. Thus, the user can bond the selected object 70A in an appropriate orientation to the other virtual object 70B.

Such adjustments of the orientations of the selected object 70A and the other virtual object 70B based on the normal vector NV or the tangent vector TL are made only in a case where the selected object 70A and the other virtual object 70B are bonded to each other at preferential bonding portions BP.

(Details of Release of Bonding)

Next, a description is given of the method for, in a case where a plurality of virtual objects 70 are bonded to each other, releasing the bonding between the plurality of virtual objects 70. After an assembled object is formed by bonding a plurality of virtual objects 70 as described above, and if an input satisfying a predetermined release condition (hereinafter referred to as a "bonding release operation") is provided, the bonding between the virtual objects 70 is released.

Figure 32:
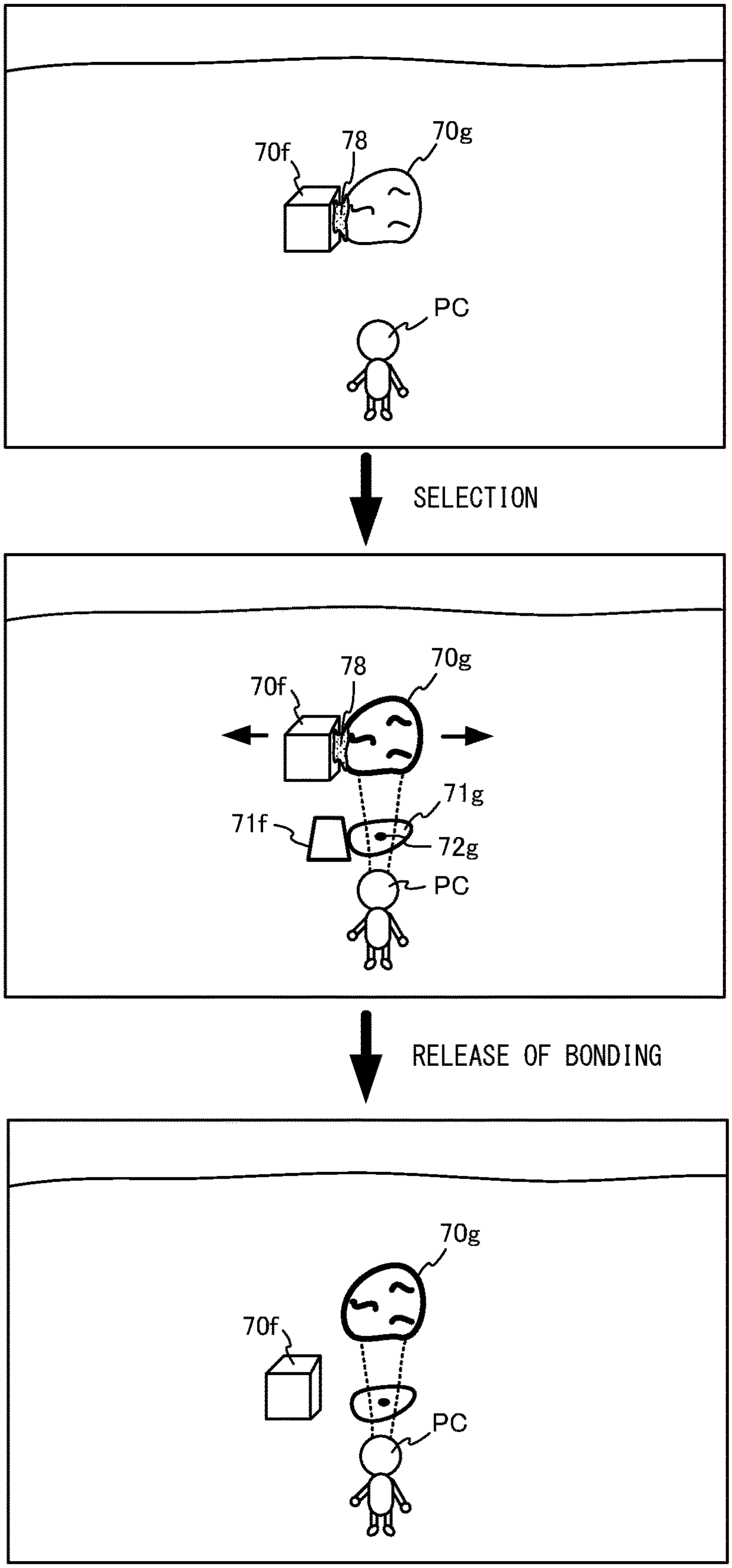
FIG. 32 is an example non-limiting diagram showing an example where a bonding release operation is performed in the state where two virtual objects 70 are bonded to each other.

FIG. 32 is a diagram showing an example of a case where the bonding release operation is performed in the state where two virtual objects 70 are bonded to each other.

If a selection operation is performed when the box object 70*f* and the rock object 70*g* are bonded to each other by the bonding object 78, either one of the two virtual objects 70*f* and 70*g* is selected. For example, if the selection operation is performed when the rock object 70*g* is indicated between the box object 70*f* and the rock object 70*g* forming an assembled object, as shown in FIG. 32, the rock object 70*g* is selected as a selected object. If the rock object 70*g* is selected, the display form of the rock object 70*g* changes. If the rock object 70*g* is selected, images 71*f* and 71*g* of the box object 70*f* and the rock object 70*g* forming the assembled object are projected onto the ground. Further, a point 72*g* indicating the center position of the rock object 70*g* that is being selected is projected onto the ground. If the bonding release operation is performed when the rock object 70*g* is being selected, the bonding between the box object 70*f* and the rock object 70*g* is released.

Here, the bonding release operation is, for example, the execution of the operation of reversing the direction of the user character PC (the direction of the virtual camera) a predetermined number of times within a predetermined time. If a selected object is being set (i.e., if a virtual object 70 is being selected), the selected object, the user character PC, and the virtual camera maintain predetermined positional relationships. Specifically, the direction of the user character PC and the direction of the virtual camera roughly match each other, and the selected object is controlled to be located roughly in front of the user character (in front of the virtual camera). Thus, if the direction of the user character PC (the direction of the virtual camera) changes, the position in the virtual space of the selected object also changes.

For example, in accordance with the input direction of the analog stick 52, the direction of the user character PC (the direction of the virtual camera) changes. If a direction input operation in the opposite direction is performed using the analog stick 52 the predetermined number of times within the predetermined time, the bonding release operation is detected, and the bonding between the box object 70*f* and the rock object 70*g* is released. Here, the direction input operation in the opposite direction is the provision of, after a direction input in a first direction is provided, a direction input in a second direction having an angle greater than a predetermined threshold (e.g., 150 degrees) to the first direction.

The direction of the user character PC (the direction of the virtual camera) may change in accordance with, for example, the orientation of the right controller 4 (or the left controller 3 or the main body apparatus 2). For example, the orientation of the right controller 4 is calculated based on the output of the angular velocity sensor 115 (and the acceleration sensor 114). For example, based on the output of the angular velocity sensor 115, a swing operation on the right controller 4 may be detected, and in accordance with the detection result of the swing operation, the bonding between the box object 70*f* and the rock object 70*g* may be released. Specifically, if the swing operation in the opposite direction using the right controller 4 is performed the predetermined number of times within the predetermined time as the bonding release operation, the bonding between the box object 70*f* and the rock object 70*g* may be released. The swing operation in the opposite direction using the right controller 4 may be the execution of, after the swing operation is executed in a first direction, the swing operation in a second direction having an angle greater than a predetermined threshold (e.g., 90 degrees) to the first direction.

Figure 33:
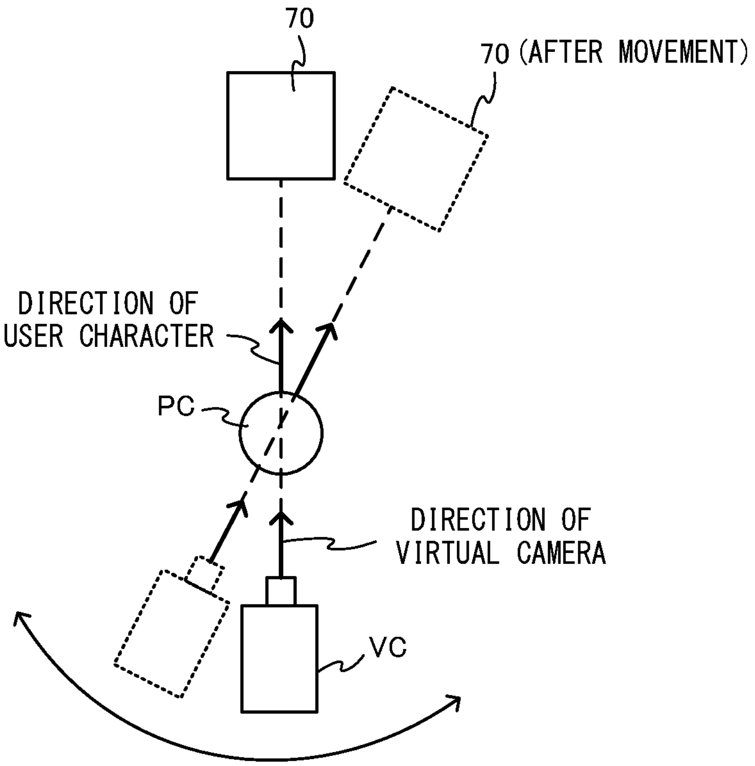
FIG. 33 is an example non-limiting diagram showing an example of the movement of a selected object when the direction of a virtual camera VC is changed in the right direction.

FIG. 33 is a diagram showing an example of the movement of a selected object when the direction of the user character PC (the direction of a virtual camera VC) is changed in the right direction. FIG. 33 shows a diagram of the virtual camera VC, the user character PC, and a selected object 70 as viewed from above in the virtual space. As shown in FIG. 33, if a virtual object 70 is set as a selected object, the user character PC and the virtual camera VC are directed in the same direction. For example, if the left-right direction of the analog stick 52 is input, the direction of the user character PC changes in the left-right direction, and the direction of the virtual camera VC also changes in the left-right direction while the virtual camera VC rotates in a yaw direction about the user character PC. Further, the selected object 70 is moved so that the selected object 70 is located in front of the user character PC (in front of the virtual camera VC). For example, if the right direction of the analog stick 52 is input, the direction of the user character PC (the virtual camera VC) changes in the right direction, and the selected object 70 also moves in the right direction. On the other hand, even if the right direction of the analog stick 52 is input, the user character PC does not move. For example, if an input of the left direction and an input of the right direction are provided using the analog stick 52 the predetermined number of times within the predetermined time (e.g., one second), the directions of the user character PC and the virtual camera VC change in the left direction and the right direction, and the selected object 70 moves in the right direction and the left direction in the virtual space. In this case, the selected object is displayed to shake in the left-right direction about the user character PC. Then, the bonding between the selected object and another virtual object bonded to the selected object is released, and the other virtual object is detached from the selected object.

The same applies to a case where the up-down direction of the analog stick 52 is input. That is, if the up-down direction of the analog stick 52 is input, the direction of the user character PC changes in the up-down direction, and the direction of the virtual camera VC also changes in the up-down direction while the virtual camera VC rotates in a pitch direction about the user character PC. If the up-down direction of the analog stick 52 is input the predetermined number of times within the predetermined time (e.g., one second) as the bonding release operation, the selected object is displayed to shake the up-down direction about the user character PC, and the bonding between the selected object and the other virtual object is released.

As described above, if the direction of the user character PC is shaken in a predetermined direction, a selected object also moves to be swung in the predetermined direction, and the bonding between the selected object and another virtual object is released, and the other virtual object is detached from the selected object. This results in the following behavior. The user object PC shakes the selected object, thereby shaking off the other virtual object bonded to the selected object. Thus, it is possible to release the bonding between the selected object and the other virtual object by an operation suited for the user's intuition.

In the exemplary embodiment, a selected object moves in conjunction with not only the direction of the user character PC but also the direction of the virtual camera VC. That is, it can also be understood that the direction of the virtual camera VC is shaken in a predetermined direction, whereby the selected object also moves to be swung in the predetermined direction, and the bonding between the selected object and another virtual object is released. This results in the following behavior. While the selected object remains displayed near the center of the screen, the entirety of the screen moves to be swung in the predetermined direction, thereby shaking off the other virtual object bonded to the selected object. Thus, it is possible to release the bonding between the selected object and the other virtual object by an operation suited for the user's intuition.

Between the left-right direction and the up-down direction, different types of control may be performed on the direction of the user character PC, the setting of the virtual camera, and the movement of a selected object. For example, if the left-right direction is input using the analog stick 52, in accordance with the amount of the input (the degree of the tilt), the directions of the user character PC and the virtual camera change in the left-right direction, and the selected object also similarly moves in the left-right direction. If, on the other hand, the up-down direction is input using the analog stick 52, the direction of the user character PC changes in the up-down direction, and the selected object also similarly moves in the up-down direction, but the amount of change in the direction of the user character PC in the up-down direction may be smaller than the amount of movement in the up-down direction of the selected object. The same may apply to the amount of change in the direction of the virtual camera. If the up-down direction is input using the analog stick 52, the virtual camera may zoom in or zoom out. For example, in accordance with an input of the up direction using the analog stick 52, the user character PC is directed in the up direction, the selected object moves in the up direction, and the distance between the user character PC and the selected object becomes longer. At this time, the virtual camera zooms out to include the user character PC and the selected object in the image capturing range of the virtual camera. If the down direction is input using the analog stick 52, the selected object may not move in the down direction due to the ground, the direction of the user character PC may not be the down direction, either, and may be almost the horizontal direction, and the virtual camera may zoom in. The same applies to a case where the up-down direction is input using the orientation of the right controller 4 (or the left controller 3 or the main body apparatus 2).

An input of the left-right direction may be detected as the above bonding release operation, whereas an input of the up-down direction may not be detected as the above bonding release operation. That is, a selected object may move in the up-down direction in accordance with an input of the up-down direction, but the bonding between the selected object and another virtual object 70 may not be released in accordance with the input of the up-down direction. Further, an input of the up-down direction using the analog stick 52 may not be detected as the bonding release operation, while an input of the up-down direction (the operation of swinging up and down the controller or main body apparatus 2) using the orientation of the controller (3 or 4 or the main body apparatus 2) may be detected as the bonding release operation.

Referring back to FIG. 32, if the bonding release operation is performed in the state where the rock object 70*g* is selected, the bonding between the rock object 70*g* and the box object 70*f* is released. As shown in FIG. 32, if the bonding between the rock object 70*g* and the box object 70*f* is released, the box object 70*f* separates from the rock object 70*g*, and the box object 70*f* falls to the ground. The bonding object 78 having bonded the box object 70*f* and the rock object 70*g* is erased. Also after the bonding between the rock object 70*g* and the box object 70*f* is released, the rock object 70*g* remains selected and remains up in the air.

Figure 34:
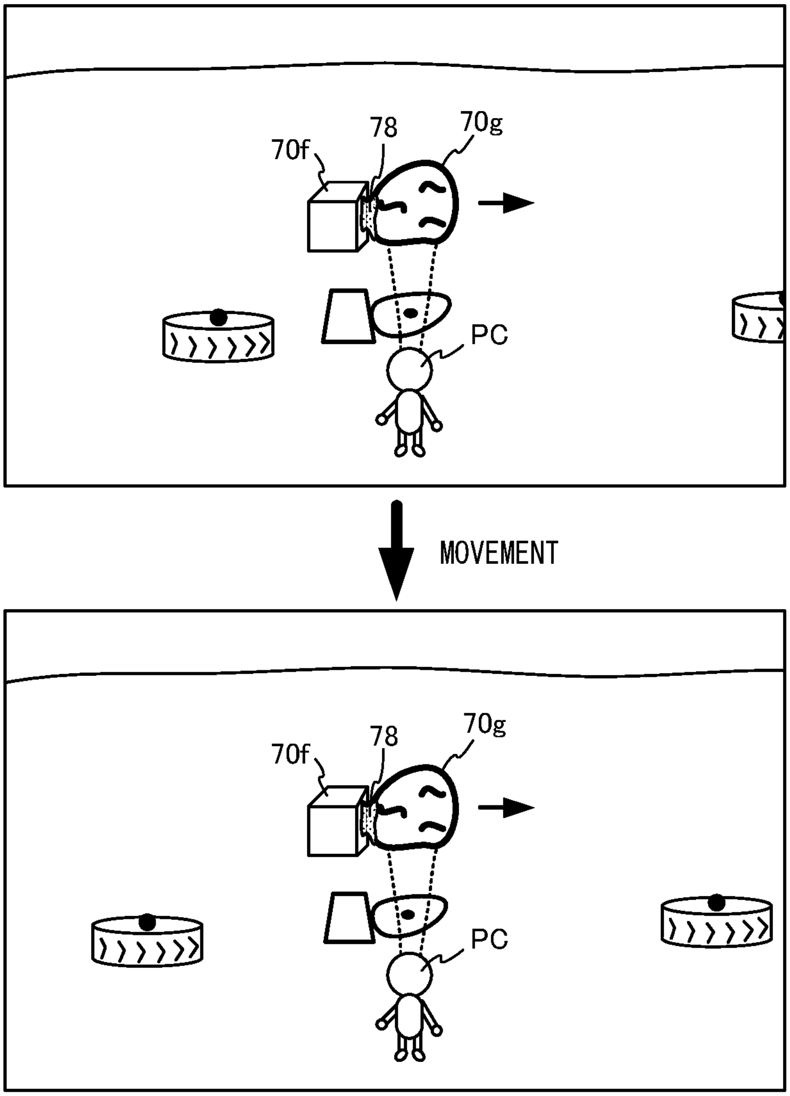
FIG. 34 is an example non-limiting diagram showing an example of a case where an input that does not satisfy a predetermined release condition is provided in the state where two virtual objects 70 are bonded to each other.

FIG. 34 is a diagram showing an example of a case where an input that does not satisfy the predetermined release condition is provided in the state where two virtual objects 70 are bonded to each other.

As shown in FIG. 34, if an input is provided to the analog stick 52 in the state where the rock object 70*g* is selected, and the input does not satisfy the predetermined release condition, the rock object 70*g* moves in accordance with a change in the direction of the user character PC (the virtual camera). In this case, the bonding between the rock object 70*g* and the box object 70*f* is not released, and the assembled object (the rock object 70*g* and the box object 70*f*) moves in the virtual space in accordance with a change in the direction of the user character PC (the virtual camera). For example, if the right direction of the analog stick 52 is input in the state where the rock object 70*g* is selected, the direction of the user character PC (the virtual camera) changes in the right direction, and a portion of the virtual space to the right of the upper diagram of FIG. 34 comes into view (the lower diagram of FIG. 34). In this case, the rock object 70*g* and the box object 70*f* also move in the right direction.

If an input is provided to the analog stick 32 of the left controller 3 in the state where the rock object 70*g* is selected, the user character PC moves in the virtual space, and the virtual camera also moves in the virtual space. With the movements of the user character PC and the virtual camera, the assembled object (the rock object 70*g* and the box object 70*f*) also moves. That is, if an input is provided to the analog stick 32, the relative positional relationship between the user character PC and the selected object does not change, and the user character PC and the selected object move in accordance with the input to the analog stick 32. Based on the input involving this movement of the user character PC (the input to the analog stick 32), the above release condition is not satisfied. For example, if an input of the opposite direction is provided the predetermined number of times within the predetermined time using the analog stick 32 for moving the user character PC, the bonding between the rock object 70*g* and the box object 70*f* is not released. In this case, in accordance with the input using the analog stick 32, the assembled object (the rock object 70*g* and the box object 70*f*) moves in the virtual space. On the other hand, in accordance with an input to the analog stick 52, the directions of the user character PC and the virtual camera change, and the selected object moves to be swung by the user character PC. By this swung movement of the selected object, the bonding between the selected object and another virtual object 70 is released.

Figure 35:
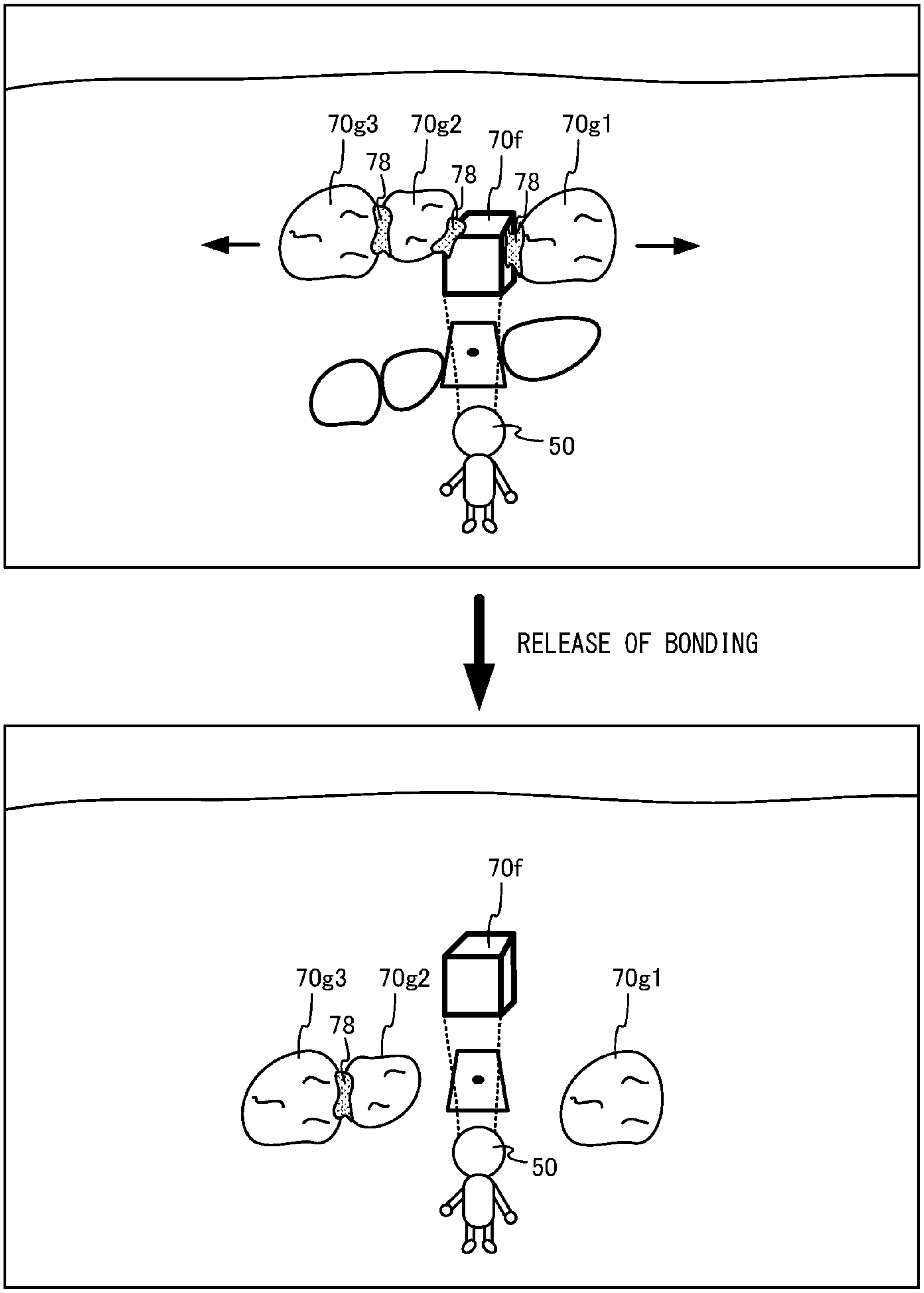
FIG. 35 is an example non-limiting diagram showing an example of, in a case where the bonding release operation is performed in the state where four virtual objects 70 are bonded to each other, the release of the bonding.

Also if three or more virtual objects 70 are bonded to each other and formed as an assembled object, the bonding state can be released by a similar bonding release operation. FIG. 35 is a diagram showing an example of, in a case where the bonding release operation is performed in the state where four virtual objects 70 are bonded to each other, the release of the bonding.

As shown in the upper diagram of FIG. 35, to the box object 70*f*, a rock object 70*g*1 and a rock object 70*g*2 are bonded. To the rock object 70*g*2, a rock object 70*g*3 is further bonded. Consequently, an assembled object composed of four virtual objects 70 is formed. In such a state, any one of the four virtual objects 70 forming the assembled object is selected by a selection operation of the user. For example, among the four virtual objects 70, the box object 70*f* is selected as a selected object.

If the bonding release operation is performed by the user when the selected object is being selected, the bonding between the selected object and all the virtual objects 70 bonded to the selected object is released (the lower diagram of FIG. 35). Specifically, the bonding between the box object 70*f* and the rock object 70*g*1 is released, and a bonding object 78 having bonded the box object 70*f* and the rock object 70*g*1 is erased. The bonding between the box object 70*f* and the rock object 70*g*2 is also released, and a bonding object 78 having bonded the box object 70*f* and the rock object 70*g*2 is also erased. On the other hand, even if the bonding between the box object 70*f* and the rock object 70*g*2 is released, the bonding between the rock object 70*g*2 and the rock object 70*g*3 is not released.

That is, if the bonding release operation is performed when a plurality of virtual objects 70 are bonded to a selected object, the bonding state between the selected object and a virtual object 70 bonded to the selected object is released, but the bonding state between virtual objects 70 other than the selected object is maintained. In other words, all bonding objects 78 bonded to the selected object are erased by the bonding release operation, and a bonding object 78 bonded to a virtual object 70 other than the selected object continues to exist.

As described above, in the exemplary embodiment, after an assembled object is generated by bonding a plurality of virtual objects 70, and if any one of the plurality of virtual objects 70 forming the assembled object is selected, and an input satisfying the predetermined release condition is provided, the bonding between the selected virtual object 70 and another virtual object bonded to the selected virtual object 70 is released. If any one of the plurality of virtual objects 70 forming the assembled object is selected, and an input that does not satisfy the predetermined release condition is provided, the entirety of the assembled object moves. If any one of the plurality of virtual objects 70 forming the assembled object is selected, a different virtual object 70 can also be further bonded to the selected virtual object. For example, any one of the plurality of virtual objects 70 forming the assembled object is selected, the user character PC is moved, and the entirety of the assembled object is moved. If the selected object comes close to another virtual object 70 placed in the virtual space, the bonding object 78 connecting the selected object and the other virtual object 70 appears. Then, in accordance with a bonding instruction from the user, the selected object and the other virtual object 70 are bonded to each other.

Consequently, the user can generate an assembled object by bonding a plurality of virtual objects 70 and then release the bonding between the virtual objects 70. Some of the virtual objects 70 included in the generated assembled object are detached, and a different virtual object can be bonded, whereby the assembled object can be formed again.

One of virtual objects forming an assembled object can be selected, and only a virtual object bonded to the selected object can be detached from the assembled object. Thus, it is possible to improve convenience for the user. For example, in a case where the bonding of the assembled object is released, it is also possible that all the bonding states between all the virtual objects 70 included in the assembled object are released. However, if all the bonding states are released, the user needs to assemble the assembled object from the start. In contrast, in the exemplary embodiment, the user can select some of virtual objects forming an assembled object and release the bonding state of only the selected virtual object. Thus, it is possible to reconstruct the assembled object while maintaining the bonding states between some of the virtual objects.

In the exemplary embodiment, a selected object is fixed in the forward direction of the user character PC (the virtual camera), and the direction of the user character PC (the virtual camera) is changed, whereby the selected object moves in the virtual space. Thus, for example, if the direction of the user character PC (the virtual camera) is shaken in the left-right direction or the up-down direction, the selected object shakes in the left-right direction or the up-down direction. By such an intuitive and easily understandable operation for the user, the bonding state of a virtual object can be released. That is, by the operation of shaking off the virtual object bonded to the selected object, it is possible to release the bonding state of the selected object.

(Description of Data Used in Game Processing)

Figure 36:
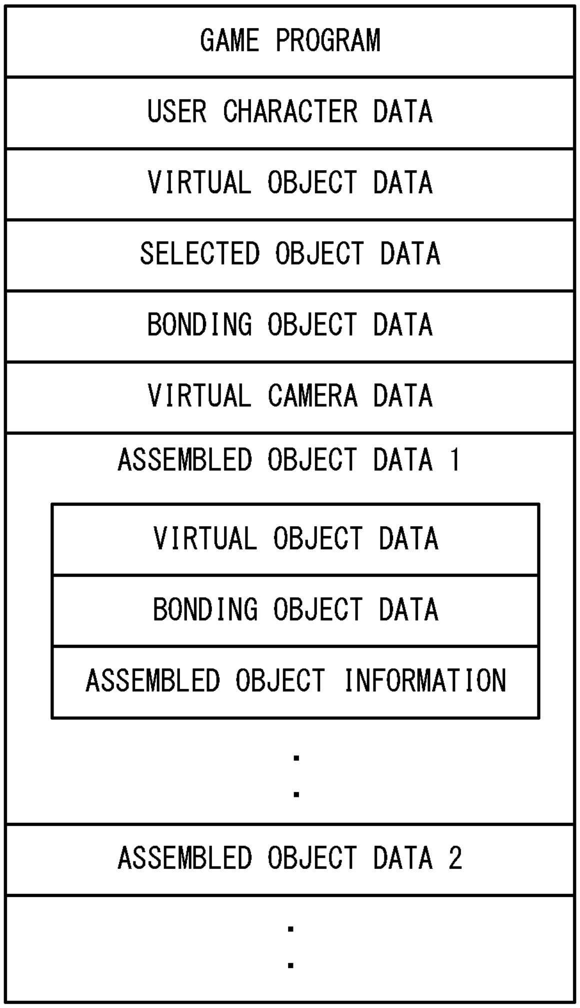
FIG. 36 is an example non-limiting diagram showing an example of data stored in a memory of the main body apparatus 2 during the execution of game processing.

Next, data used in the above game processing is described. FIG. 36 is a diagram showing an example of data stored in a memory of the main body apparatus 2 during the execution of the game processing.

As shown in FIG. 36, a memory (the DRAM 85, the flash memory 84, or an external storage medium) of the main body apparatus 2 stores a game program, user character data, virtual object data, selected object data, bonding object data, virtual camera data, and a plurality of pieces of assembled object data.

The game program is a program for executing the above game processing. The game program is stored in advance in the external storage medium attached to the slot 23 or the flash memory 84 and is loaded into the DRAM 85 when the game is executed. The game program may be acquired from another apparatus via a network (e.g., the Internet).

The user character data is data regarding the user character PC and includes information regarding the position in the virtual space and the orientation of the user character PC. The user character data may include information indicating items owned by the user character PC, the ability of the user character PC, and the like.

The virtual object data is data regarding a virtual object 70 that is placed in the virtual space and is not formed as a part of an assembled object. The virtual object data includes information indicating the types, the weights, the positions in the virtual space, and the orientations of virtual objects 70 (70*a* to 70*g*). The virtual object data includes information regarding the position of a preferential bonding portion BP set on each virtual object 70 in the virtual object 70, a normal vector NV, and a tangent vector TL.

The selected object data is data regarding a selected object that is being selected by the user.

The bonding object data includes information regarding the position, the shape, and the like of the above bonding object 78. The bonding object data includes information indicating a bonding position on a virtual object 70.

The virtual camera data includes information regarding the position and the direction of the virtual camera.

The assembled object data is data regarding a single assembled object composed of a plurality of virtual objects 70 created by the user. If a plurality of assembled objects are placed in the virtual space, the assembled object data is stored with respect to each assembled object.

Specifically, the assembled object data includes virtual object data regarding a plurality of virtual objects 70 forming an assembled object, and bonding object data regarding the bonding object 78 bonding the virtual objects 70. The assembled object data also includes assembled object information.

The assembled object information is information used to calculate the behavior of an assembled object, and for example, includes the weight and the position of the center of gravity of the assembled object. The position of the center of gravity of the assembled object is calculated based on the weights, the positions, the orientations, and the like in the assembled object, of a plurality of virtual objects 70 forming the assembled object. The assembled object information may include information regarding the velocity of the assembled object. If the assembled object includes one or more virtual objects 70 having power, based on the positions, the orientations, and the like in the assembled object, of the virtual objects 70 having the power, the velocity of the assembled object may be calculated. The calculated velocity of the assembled object is stored as the assembled object information. Every time a virtual object 70 forming the assembled object changes, the assembled object information is recalculated. For example, if there is an assembled object composed of two virtual objects 70A and 70B, based on the position, the orientation, the type, the weight, and the like of each of the virtual objects 70A and 70B, the assembled object information (e.g., the position of the center of gravity, the velocity, and the like) is calculated and stored. If a different virtual object 70C is bonded to this assembled object, based on the position, the orientation, the type, the weight, and the like of each of the three virtual objects 70A to 70C, the assembled object information is recalculated and stored.

(Details of Game Processing in Main Body Apparatus 2)

Figure 37:
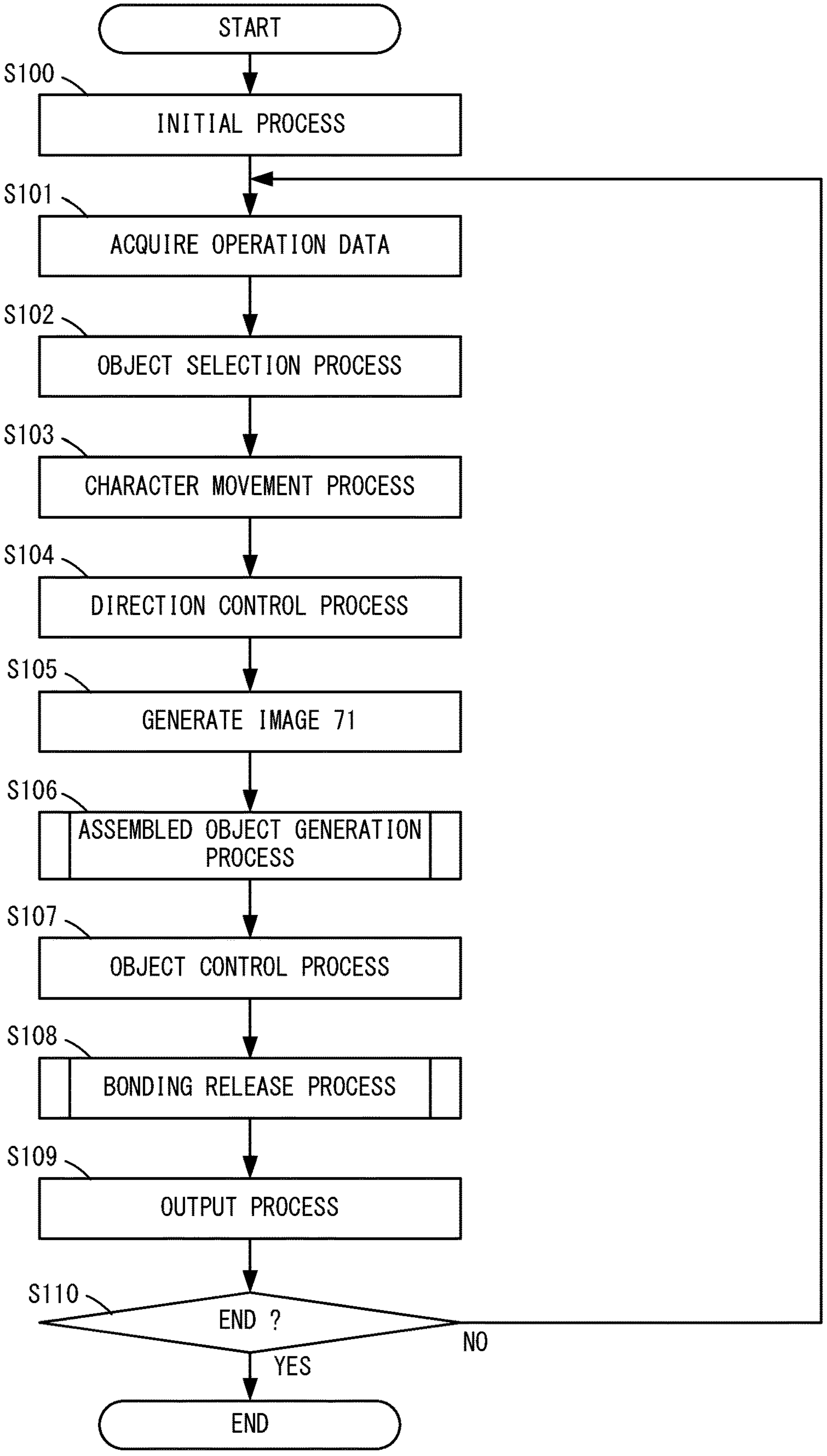
FIG. 37 is an example non-limiting flow chart showing an example of the game processing executed by a processor 81 of the main body apparatus 2.

Next, a description is given of the details of the game processing performed in the main body apparatus 2. FIG. 37 is a flow chart showing an example of the game processing executed by the processor 81 of the main body apparatus 2.

As shown in FIG. 37, first, the processor 81 executes an initial process (step S100). Specifically, the processor 81 sets the virtual space and places the user character PC, the virtual camera, a plurality of virtual objects 70, and the like in the virtual space. In addition to these, various objects (e.g., an object representing the ground of the virtual space and objects such as a tree and a building fixed to the virtual space) are placed in the virtual space.

Next, the processor 81 acquires the operation data from the controllers (step S101). The operation data includes data from the buttons 103, the analog stick 32, the acceleration sensor 104, and the angular velocity sensor 105 of the left controller 3 and data from the buttons 113, the analog stick 52, the acceleration sensor 114, and the angular velocity sensor 115 of the right controller 4. The main body apparatus 2 receives the operation data at predetermined time intervals (e.g., 1/200-second intervals) from each controller and stores the operation data in the memory. In step S101, the processor 81 acquires the operation data transmitted from each controller and stored in the memory. The processor 81 also acquires data from the acceleration sensor 89, the angular velocity sensor 90, and the touch panel 13 of the main body apparatus 2 as the operation data.

Next, the processor 81 performs an object selection process (step S102). The object selection process is the process of setting a single virtual object 70 as a selected object. Specifically, based on the operation data, the processor 81 determines whether or not a selection operation for selecting a virtual object 70 is performed. If the selection operation is performed, the processor 81 sets an indicated virtual object 70 as a selected object. For example, if a predetermined button of the left controller 3 is pressed when a single virtual object 70 that does not form an assembled object is indicated, the virtual object 70 that does not form the assembled object is set as a selected object. If a predetermined button of the left controller 3 is pressed when a single virtual object 70 forming an assembled object is indicated, the virtual object 70 forming the assembled object is set as a selected object. If a selected object is set, the processor 81 changes the display form of the selected object to a display form (e.g., yellow) different from normal. If a single virtual object 70 forming an assembled object is set as a selected object, the processor 81 changes the display form of the entirety of the assembled object including the selected object to a display form (e.g., yellow) different from normal. In this case, the selected object in the assembled object and another virtual object 70 in the assembled object may be displayed in different display forms.

Next, the processor 81 performs a character movement process (step S103). Specifically, based on the operation data, the processor 81 determines whether or not a movement operation on the user character PC is performed. If the movement operation is performed, the processor 81 moves the user character PC in the virtual space. For example, if a direction input is provided to the analog stick 32 of the left controller 3, the processor 81 moves the user character PC in the virtual space in accordance with the input direction of the analog stick 32. In accordance with the movement of the user character PC, the processor 81 moves the virtual camera in the virtual space. In accordance with the movement of the user character PC, the virtual camera moves to include the user character PC in the image capturing range of the virtual camera. If a selected object is set, the processor 81 moves the selected object in accordance with the movement of the user character PC. If the selected object is a virtual object 70 forming an assembled object, the entirety of the assembled object including the selected object is moved.

Next, the processor 81 performs a direction control process (step S104). Specifically, based on the operation data, the processor 81 determines whether or not the operation of changing the direction of the virtual camera is performed. If the operation is performed, the direction of the virtual camera is changed. More specifically, in a case where a selected object is set, and if a direction input is provided to the analog stick 52 of the right controller 4, the processor 81 changes the directions of the user character PC and the virtual camera in accordance with the input direction of the analog stick 52. In a case where a selected object is set, for example, based on data from the angular velocity sensor of the right controller 4, the processor 81 may calculate the orientation of the right controller 4, and based on the calculated orientation, may change the directions of the user character PC and the virtual camera. In a case where a selected object is set, in accordance with changes in the directions of the user character PC and the virtual camera, the processor 81 moves the selected object. The selected object is controlled to be located in the forward directions of the user character PC and the virtual camera. If the selected object is a single virtual object 70 forming an assembled object, the entirety of the assembled object including the selected object is moved. In step S104, the user character PC is not moved.

Next, the processor 81 performs the process of generating the image 71 of a selected object (step S105). Specifically, if a selected object is set, the processor 81 performs the process of projecting the selected object in the up-down direction in the virtual space, the left-right direction, and the depth direction viewed from the virtual camera. Consequently, the image 71 (a projected image) of the selected object is generated on surfaces present in the up-down direction, the left-right direction, and the depth direction of the selected object. For example, the image 71 of the selected object 71 is projected onto the surface of another virtual object 70 to the left of the selected object, and the image 71 of the selected object 71 is also projected onto the surface of another virtual object 70 to the right of the selected object.

After step S105, the processor 81 performs an assembled object generation process (step S106). The assembled object generation process is a process for bonding a selected object and another virtual object 70, thereby generating an assembled object. For example, if a selected object and another virtual object 70 are bonded to each other in accordance with a bonding instruction from the user, the selected object and the other virtual object 70 move to pull each other, and the selected object and the other virtual object 70 are ultimately bonded to each other. The details of the assembled object generation process will be described below.

Next, the processor 81 performs an object control process (step S107). In step S107, calculations in accordance with the laws of physics are made regarding all the objects in the virtual space based on the position, the size, the weight, the velocity, the rotational velocity, the applied force, the friction, and the like of each object, and the action of each object is controlled. In a case where a virtual object 70 or an assembled object in the virtual space moves, a collision determination with another object is made, and in accordance with the result of the collision determination, the behavior of each object is calculated.

For example, also in a case where a selected object is moved to bond the selected object to another virtual object 70, the collision determination between the selected object and the other virtual object 70 is made. The collision determination is made based on the position, the orientation, the size, and the shape of each object. As a result of the collision determination, if the selected object and the other virtual object 70 collide with each other, based on the weight of each object, the velocity of the collision, and the like, the behavior of each object is calculated. For example, based on the collision between the selected object and the other virtual object 70, the other virtual object 70 moves, or the movement of the selected object is hindered, or the moving direction of the selected object is changed.

Regarding the bonding object 78, the processor 81 does not make the above collision determination. For example, in a case where the bonding object 78 connecting a selected object and another virtual object 70 is generated, and even if a different object is present between the selected object and the other virtual object 70, a contact determination between the bonding object 78 and the different object is not made. Thus, even if the bonding object 78 and the different object collide with each other, the movement of the different object is not affected. That is, the bonding object 78 is not an object that hinders the movements of a virtual object 70, the user character PC, and another object, and is an immaterial object for display. Also after the selected object and the other virtual object 70 are bonded to each other, the bonding object 78 stays, but the collision determination is not made regarding the staying bonding object 78, either. Alternatively, also regarding the bonding object 78, the above collision determination may be made. That is, the collision determination may be made regarding the bonding object 78 before the selected object and the other virtual object 70 are bonded to each other, and the bonding object 78 after the selected object and the other virtual object 70 are bonded to each other. Then, if the bonding object 78 and a different object collide with each other, the movement of the different object may be affected.

In the object control process, if a selected object and another virtual object 70 are bonded to each other by a bonding instruction, the two virtual objects 70 move to pull each other. In this case, control is performed so that the moving distance of a relatively heavy virtual object 70 is short, and the moving distance of a relatively light virtual object 70 is long. If the difference in weight or the weight ratio between the two virtual objects 70 is greater than or equal to a predetermined value, only the lighter virtual object 70 may move.

In the object control process, based on the assembled object information and the operation data, the processor 81 controls the action of an assembled object. For example, the processor 81 moves the four-wheel vehicle object 76 including the control yoke object 70*h* shown in FIG. 19 as an assembled object. In this case, the processor 81 moves the four-wheel vehicle object 76 based on the velocity and the position of the center of gravity included in the assembled object information and also changes the moving direction of the four-wheel vehicle object 76 based on the operation data.

Next, the processor 81 performs a bonding release process (step S108). The bonding release process is the process of releasing the bonding between virtual objects 70 bonded to each other and is the process of detaching one or more virtual objects 70 from an assembled object. The details of the bonding release process will be described below.

Next, the processor 81 performs an output process (step S109). Specifically, based on the virtual camera, the processor 81 generates a game image and displays the game image on the display 12 or the stationary monitor. The processor 81 also outputs a sound corresponding to the result of the game processing from the speakers.

Next, the processor 81 determines whether or not the game processing is to be ended (step S110). For example, if the user gives an instruction to end the game, the determination of the processor 81 is YES in step S110, and the game processing shown in FIG. 37 ends. If the determination is NO in step S110, the processor 81 executes the process of step S101 again. The processor 81 repeatedly executes the processes of steps S101 to S110 at predetermined frame time intervals (e.g., 1/60-second intervals). This is the description of FIG. 37.

(Assembled Object Generation Process)

Figure 38:
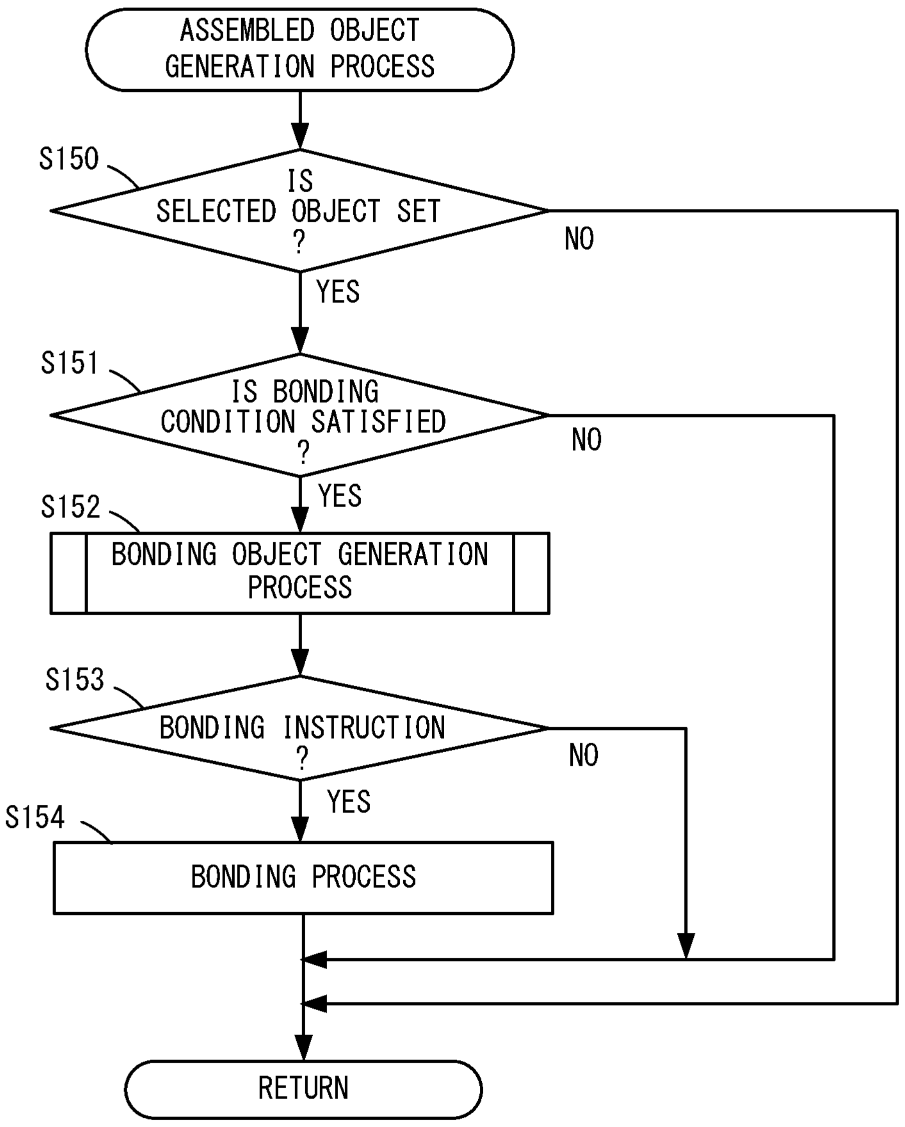
FIG. 38 is an example non-limiting flow chart showing an example of an assembled object generation process in step S106.

Next, the details of the assembled object generation process in the above step S106 are described. FIG. 38 is a flow chart showing an example of the assembled object generation process in step S106.

The processor 81 determines whether or not a selected object is set (step S150). If a selected object is not set (step S150: NO), the processor 81 ends the process shown in FIG. 38.

If a selected object is set (step S150: YES), the processor 81 determines whether or not the selected object and another virtual object 70 satisfy the predetermined bonding condition (step S151). Specifically, based on the position and the moving direction of the selected object, the processor 81 searches for another virtual object 70 satisfying the predetermined bonding condition. As a result of the search, if another virtual object 70 satisfying the predetermined bonding condition is found, the determination of the processor 81 is YES in step S151. If, on the other hand, another virtual object 70 satisfying the predetermined bonding condition is not found, the determination of the processor 81 is NO in step S151.

If the determination is YES in step S151, the processor 81 performs a bonding object generation process (step S152). The details of the bonding object generation process will be described below.

Next, based on the operation data, the processor 81 determines whether or not a bonding instruction is given by the user (step S153).

If a bonding instruction is given (step S153: YES), the processor 81 performs a bonding process for bonding the selected object and the other virtual object 70 (step S154). Here, the selected object and the other virtual object 70 are bonded to each other at bonding positions set in step S152. Consequently, an assembled object composed of a plurality of virtual objects 70 is generated. If two preferential bonding portions BP are set as bonding positions, the two preferential bonding portions BP are bonded to each other so that directions normal to the two preferential bonding portions BP are parallel to each other.

In the bonding process in step S154, the processor 81 calculates the assembled object information. Specifically, based on the types, the weights, the bonding positions, and the like of the virtual objects 70 forming the assembled object, the processor 81 calculates the assembled object information and stores the assembled object information in the memory. Every time a virtual object 70 is bonded, the assembled object information is calculated and stored in the memory.

If the process of step S154 is performed, or if the determination is NO in step S150, or if the determination is NO in step S151, or if the determination is NO in step S153, the processor 81 ends the process shown in FIG. 38.

(Bonding Object Generation Process)

Figure 39:
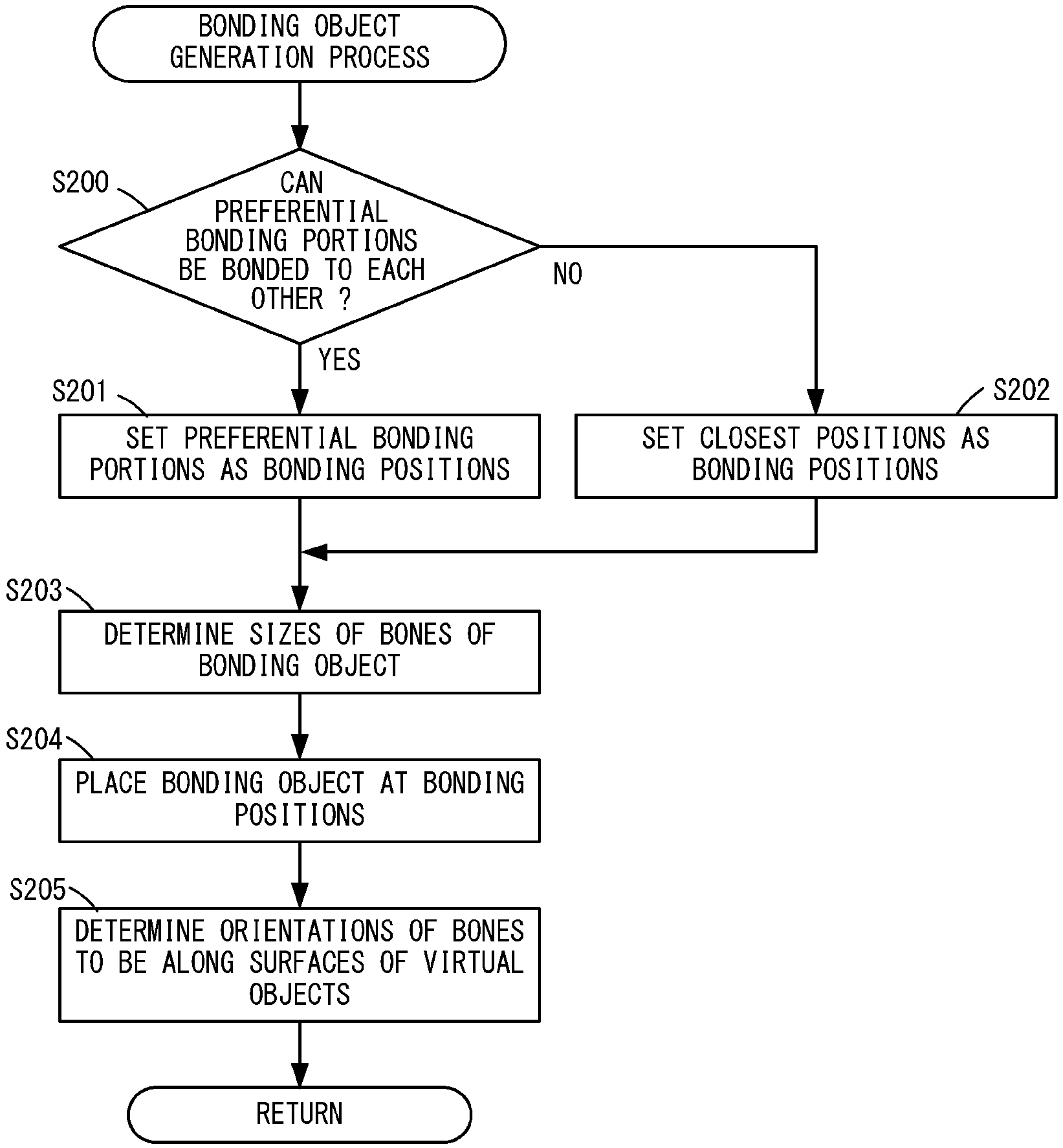
FIG. 39 is an example non-limiting flow chart showing an example of a bonding object generation process in step S152.

Next, the details of the bonding object generation process in the above step S152 are described. FIG. 39 is a flow chart showing an example of the bonding object generation process in step S152.

As shown in FIG. 39, the processor 81 determines whether or not preferential bonding portions can be bonded to each other (step S200). Specifically, the processor 81 determines whether or not a preferential bonding portion BP on the selected object and a preferential bonding portion BP on the other virtual object 70 that satisfies the predetermined bonding condition according to the determination in step S151 satisfy the above first condition (all the conditions A to C). If there is a pair of preferential bonding portions BP that satisfy the first condition, the determination of the processor 81 is YES in step S200. If there is not a pair of preferential bonding portions BP that satisfy the first condition, the determination of the processor 81 is NO in step S200.

If the determination is YES in step S200, the processor 81 sets the two preferential bonding portions BP that satisfy the first condition as bonding positions (step S201). If there are a plurality of pairs of two preferential bonding portions BP that satisfy the first condition, the processor 81 sets the pair of two preferential bonding portions BP at the closest distance as bonding positions.

If, on the other hand, the determination is NO in step S200, the processor 81 calculates the closest positions on the selected object and the other virtual object 70 and sets the closest positions as bonding positions (step S202). In step S202, regarding the selected object and the other virtual object 70, if portions other than one of the preferential bonding portions BP and the other preferential bonding portion are the closest positions, these portions are set as bonding positions.

If the process of step S201 or S202 is executed, the processor 81 determines the sizes of the bones 781 of the bonding object 78 (step S203). The method for determining the sizes of the bones 781 of the bonding object 78 is as described with reference to FIGS. 26 and 27.

Next, based on the bonding positions set in step S201 or S202, the processor 81 places the bonding object 78 (step S204). Specifically, the processor 81 places one of the first portions 782 of the bonding object 78 at the bonding position on the selected object and places the other first portions 782 of the bonding object 78 at the bonding position on the other virtual object 70.

Next, the processor 81 determines the orientations of the bones 781 of the bonding object 78 to be along the surface of the virtual objects 70 (step S205). Here, the orientations of the bones 781 are changed while the shapes of the bones 781 are maintained. Consequently, the bonding object 78 connecting the bonding position of the selected object and the bonding position of the other virtual object 70 is generated. One of the first portions 782 of the bonding object 78 is along a surface including the bonding position on the selected object, and the other first portions 782 of the bonding object 78 is along a surface including the bonding position on the other virtual object 70. The shapes of the bones 781 may be changed to be along the surfaces of the virtual objects 70.

If the process of step S205 is executed, the processor 81 ends the bonding object generation process shown in FIG. 39.

(Bonding Release Process)

Figure 40:
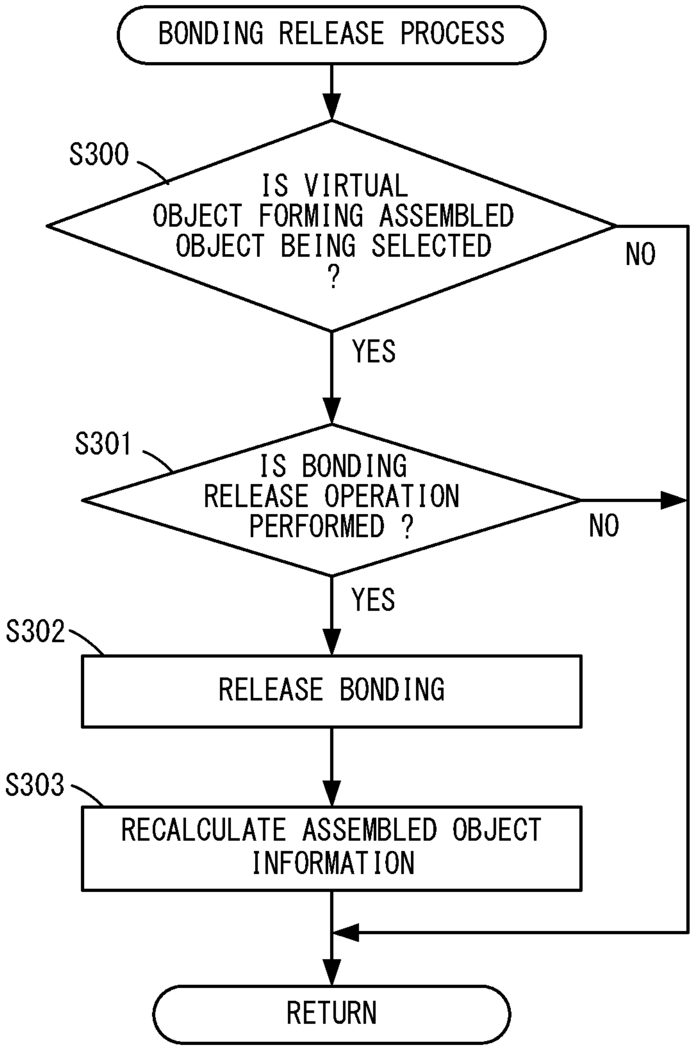
FIG. 40 is an example non-limiting flow chart showing an example of a bonding release process in step S108.

Next, the details of the bonding release process in the above step S108 are described. FIG. 40 is a flow chart showing an example of the bonding release process in step S108.

As shown in FIG. 40, the processor 81 determines whether or not a single virtual object 70 forming an assembled object is being selected (step S300).

If the determination is YES in step S300, based on the operation data, the processor 81 determines whether or not the bonding release operation is performed (step S301). Specifically, the processor 81 determines whether or not the operation of reversing the direction of the user character PC (the virtual camera) is performed the predetermined number of times within the predetermined time (e.g., one second). For example, if the direction input operation in the opposite direction is performed the predetermined number of times within the predetermined time using the analog stick 52, the processor 81 determines that the bonding release operation is performed. Based on the output of the angular velocity sensor 115, the processor 81 calculates the orientation of the right controller 4 and detects the swing operation on the right controller 4. If the swing operation in the opposite direction is detected the predetermined number of times within the predetermined time using the right controller 4, the processor 81 determines that the bonding release operation is performed. If the direction input operation in the opposite direction using the analog stick 52 and the swing operation in the opposite direction using the right controller 4 are detected within the predetermined time, the numbers of times of the respective operations are totaled. Then, if the totaled number of times of the operations reaches the predetermined number of times within the predetermined time, it is determined that the bonding release operation is performed. For example, in a case where the predetermined number of times is set to four times, and if the direction input operation in the opposite direction using the analog stick 52 is performed twice and the swing operation in the opposite direction using the right controller 4 is performed twice within the predetermined time, the processor 81 determines that the bonding release operation is performed. The direction input operation using the analog stick 52 and the swing operation using the right controller 4 may not be totaled, and may be counted as different operations.

If the bonding release operation is performed (step S301: YES), the processor 81 releases the bonding between the selected object and all the virtual objects 70 bonded to the selected object (step S302). The processor 81 erases the bonding object 78 bonded to the selected object.

Next, the processor 81 recalculates the assembled object information (step S303). Here, the assembled object information regarding an assembled object formed by the process of step S302 is recalculated and stored in the memory. For example, if an assembled object composed of three virtual objects 70 becomes an assembled object composed of two virtual objects 70 by the process of step S302, the assembled object information regarding the assembled object composed of the two virtual objects 70 is recalculated.

If the process of step S303 is performed, or if the determination is NO in step S300, or if the determination is NO in step S301, the processor 81 ends the bonding release process shown in FIG. 40.

The processing shown in the above flow charts is merely illustrative, and the processing order, the content of the processing, and the like may be appropriately changed.

As described above, in the exemplary embodiment, the user selects by a selection operation a first object among a plurality of virtual objects 70 that can be moved in the virtual space and bonded to each other (step S102). If the selected first object (a selected object) and a second object (another virtual object 70) that is not being selected satisfy the predetermined bonding condition (step S151: YES), the bonding object 78 indicating bonding positions on the first object and the second object appears (step S152). In accordance with a bonding instruction from the user, the first object and the second object are bonded to each other at the bonding positions indicated by the bonding object (step S154). If the first object is moved or the orientation of the first object changes by an operation of the user, the bonding positions on the first object and the second object indicated by the bonding object 78 change (steps S201 and S202).

A bonding object is displayed, whereby, when assembling an assembled object by bonding a plurality of virtual objects, the user can easily recognize that a first object and a second object are to be bonded to each other, and also recognize which portions the first object and the second object are to be bonded to each other at. In accordance with the movement of the first object or a change in the orientation of the first object, bonding positions indicated by the bonding object change. Thus, it is possible to bond the first object and the second object while adjusting the bonding positions.

In the exemplary embodiment, in a case where, to bond a first object and a second object, the first object is moved by the user, the collision determination between the first object and the second object is made (step S106). That is, even when the user assembles a plurality of virtual objects, the collision determination is made. If the first object and the second object collide with each other, the movement of at least either one of the first object and the second object is controlled. For example, in accordance with the collision, the second object moves, or the moving direction of the first object changes, or the moving velocity of the first object decreases.

Even when a plurality of virtual objects are assembled, the collision determination is made, and the behaviors of the virtual objects are controlled. Thus, the user can recognize the distance between a first object and a second object. If two virtual objects are separated from each other to avoid collision, bonding positions on the two virtual objects are displayed by a bonding object. Thus, the user can recognize which virtual object the first object is to be bonded to and which positions the virtual objects are to be bonded to each other at.

In the exemplary embodiment, the image 71 of a first object (a selected object) is generated on the surface of a second object (another virtual object 70) (step S105). Specifically, the first object is projected in three directions orthogonal to each other (the up-down direction, the left-right direction, and the front-back direction), and the image 71 (a projected image) is generated in three directions. The image 71 is generated separately from the shadow of the first object generated by a light source in the virtual space. The first object selected by the user is displayed in a predetermined color (e.g., yellow) different from that before the first object is selected. The image 71 of the first object is also displayed in the same predetermined color. Thus, the user can easily recognize the positional relationship between the first object and the second object. The first object and the image 71 of the first object are displayed in the same display form. Thus, the user can easily recognize that the image 71 on the surface of the second object is an image of the first object. Thus, the user can easily recognize the positional relationship between the first object and the second object. The color of the selected first object and the color of the image 71 of the selected first object may not need to be displayed in exactly the same color. For example, both colors may be displayed in colors of the same type, and one of the colors may be darker than the other color.

In the exemplary embodiment, on a virtual object 70, a preferential bonding portion that is more likely to be bonded than another portion is set. In a case where preferential bonding portions are set on both a first object and a second object, these preferential bonding portions are set as bonding positions. Specifically, if a preferential bonding portion on the first object and a preferential bonding portion on the second object satisfy the first condition (the conditions A to C), the preferential bonding portion on the first object and the preferential bonding portion on the second object are set as bonding positions. If a bonding instruction is given in this state, the preferential bonding portion on the first object and the preferential bonding portion on the second object are bonded to each other. If, on the other hand, the preferential bonding portion on the first object and the preferential bonding portion on the second object do not satisfy the first condition, or if a preferential bonding portion is not set on at least either one of the first object and the second object, positions (closest positions) satisfying the second condition in the first object and the second object are set as bonding positions.

In a case where the preferential bonding portion on the first object and the preferential bonding portion on the second object are bonded to each other, using predetermined directions (e.g., normal directions or tangent directions) based on the preferential bonding portions, the orientation of at least either one of the first object and the second object is adjusted, and the first object and the second object are bonded to each other. Consequently, the user can bond the first object and the second object in appropriate orientations without finely adjusting the orientation of the first object relative to the second object.

Specifically, directions normal to the preferential bonding portions are set, and the first object and the second object are bonded to each other so that the directions normal to the preferential bonding portions are parallel to each other (e.g., normal vectors are directed in opposite directions to each other). Consequently, for example, it is possible to bond the first object and the second object so that a certain surface of the first object and a certain surface of the second object are parallel to each other.

Further, directions tangent to the preferential bonding portions are set. The first object and the second object are bonded to each other so that the set direction tangent to the preferential bonding portion on the first object and the set direction tangent to the preferential bonding portion on the second object have a preset angle. Consequently, it is possible to bond the first object and the second object so that the direction of the first object and the direction of the second object have a predetermined angle. For example, it is possible to bond two virtual objects in the same direction or bond two virtual objects in directions at a right angle.

In the exemplary embodiment, a bonding object connects a bonding position on a first object and a bonding position on a second object. If the positional relationship between the bonding position on the first object and the bonding position on the second object changes due to the movement of the first object or a change in the orientation of the first object, the shape of the bonding object changes. Thus, the user can intuitively recognize that the two objects are bonded to each other. The shape of the bonding object changes due to the movement of the first object or a change in the orientation of the first object. Thus, the user can recognize a change in the positional relationship between the first object and the second object.

In the exemplary embodiment, in the state where a first object and a second object are bonded to each other, either one of the first object and the second object is selected, and a bonding object connecting bonding positions on the selected one object and a third object is generated. Then, in accordance with a bonding instruction from the user, the selected one object and the third object are bonded to each other. Consequently, a new object can be easily further bonded to a desired position at an assembled object composed of a plurality of virtual objects. In a case where the entirety of the assembled object including the plurality of virtual objects is selected, and the entirety of the assembled object is the bonding range of the new object, it may be difficult to specify bonding positions. In the exemplary embodiment, however, the user selects any of a plurality of virtual objects forming an assembled object and bonds a new object to the selected virtual object. Thus, it is easy to specify bonding positions.

In the exemplary embodiment, a first object and a second object are bonded to each other at bonding positions indicated by a bonding object, and then, the bonding object remains in a predetermined range including the bonding positions. Consequently, it is possible to indicate that the first object and the second object are bonded to each other by an operation of the user. Since the first object and the second object are in contact with each other at the bonding positions, to be exact, the bonding object does not stay at the bonding positions (bonding points) of the two objects, and the bonding object stays in the periphery of the bonding positions. "The bonding object stays in a certain range including the bonding positions" also includes a case where, as described above, to be exact, the bonding object does not stay at the bonding positions, and stays in the periphery of the bonding positions.

In the exemplary embodiment, a weight is set for each of a plurality of virtual objects. If a first object and a second object are bonded to each other, the first object and the second object are moved so that the moving distance of the lighter object is longer than that of the heavier object. Consequently, based on the behaviors of two virtual objects when bonded to each other, it is possible to grasp the relationship between the weights of the two virtual objects. Thus, it is possible to estimate the position of the center of gravity of an assembled object after the bonding. It is also possible to represent the state where objects having different weights move to pull each other, and the two objects are bonded to each other.

In the exemplary embodiment, in accordance with a bonding instruction, an assembled object is formed by bonding virtual objects, and every time a virtual object is bonded, the assembled object information is calculated and stored. In accordance with the bonding release operation, a virtual object is detached from the assembled object, and every time a virtual object is detached, the assembled object information is calculated and stored. The assembled object information (e.g., the position of the center of gravity of the assembled object) is information calculated based on a plurality of virtual objects forming the assembled object. Based on the assembled object information, the action of the assembled object is controlled. Consequently, when the behavior of the assembled object is calculated, it is possible to calculate the behavior of the assembled object using the assembled object information without examining the bonding between a plurality of virtual objects included in the assembled object each time. Thus, it is possible to reduce load related to calculation.

In the exemplary embodiment, after an assembled object is generated by bonding a plurality of virtual objects, any one of the plurality of virtual objects forming the assembled object can be set as a selected object, and based on an input to an input section, the assembled object including the selected object can be moved, and a different virtual object can be further bonded to the assembled object. If a selected object is set, in accordance with a movement input using an input section (e.g., the analog stick 52 or the angular velocity sensor of the controller), the assembled object including the selected object is moved (step S104). If a selected object is set, when a movement input using an input section satisfies a release condition, among the virtual objects forming the assembled object, the bonding between another virtual object bonded to the selected object and the selected object is released (step S302), and the bonding of another virtual object that is not bonded to the selected object is maintained. Consequently, it is possible to select an individual virtual object included in the assembled object and release only the bonding of some of the virtual objects. Thus, it is possible to improve convenience for the user when an assembled object is formed by assembling a plurality of virtual objects by a user operation. That is, if the bonding between all the virtual objects included in the assembled object is released, the user needs to assemble the virtual objects from the start. In the exemplary embodiment, however, the bonding of some of the virtual objects can be released. Thus, the user does not need to assemble the virtual objects from the start. The input section for moving an assembled object is used also to detach a virtual object. Thus, it is possible to detach the virtual object and move the assembled object by an intuitive operation.

In the exemplary embodiment, if the bonding between a selected object and another virtual object is released, the selected object is continuously selected (the selected object remains set). Consequently, immediately after detaching the other virtual object from the selected object, the user can transition to the operation of bonding a different virtual object to the selected object.

In the exemplary embodiment, based on a movement input using a first input section (the analog stick 32), the user character is moved, and an assembled object including a selected object is also moved (step S103). Based on a movement input using a second input section (the analog stick 52), an assembled object including a selected object is moved without moving the user character, and when the movement input using the second input section satisfies the release condition, the bonding between the selected object and another virtual object is released. The selected object is moved without moving the user character, thereby releasing the bonding with the other virtual object. Thus, it is possible to intuitively detach another virtual object by an easily understandable operation.

In the exemplary embodiment, the above different virtual object can also be bonded to a selected object. Consequently, it is possible to detach another virtual object from the selected object or bond a different virtual object to the selected object by an input to an input section.

In the exemplary embodiment, if the number of changes in the moving direction of an assembled object reaches a predetermined number of times within a predetermined time, the bonding between a selected object and another virtual object is released. "Changes in the moving direction of an assembled object" refers to changes from the state where the assembled object moves in a first direction to the state where the assembled object moves in a second direction different from the first direction. For example, if the number of times of the movement of the assembled object in the opposite direction reaches the predetermined number of times within the predetermined time, the bonding between the selected object and the other virtual object is released. "The movement of the assembled object in the opposite direction" as used herein may refer to a change from the state where the assembled object moves in a first direction to the state where the assembled object moves in a second direction having a predetermined angle (e.g., 150 degrees to 180 degrees) to the first direction. Consequently, it is possible to detach another virtual object by an intuitive operation. For example, if the assembled object moves in the opposite direction the predetermined number of times within the predetermined time, the assembled object performs an action to shake. Thus, by an intuitive operation for shaking off another virtual object bonded to a selected object from the assembled object, it is possible to detach the other virtual object.

The release condition may be a condition that the greater the number of changes in the movement input using the input section within the predetermined time is, the more likely the condition is satisfied. That is, the greater the number of changes in the movement input using the input section within the predetermined time is, the more likely it is determined that the release condition is satisfied. If it is determined that the release condition is satisfied, the bonding between a selected object and another virtual object may be released. Here, "changes in the movement input using the input section" refers to changes in an input for moving a selected object, and for example, may be changes from an input of a first direction using the analog stick 52 to an input of a second direction. "Changes in the movement input using the input section" may be, for example, changes from the state where an input is provided to a first button for a movement to the state where an input is provided to a second button for a movement. "The greater the number of changes in the movement input using the input section within the predetermined time is, the more likely the release condition is satisfied" may include, for example, the satisfaction of the release condition in a case where the number of changes in the movement input using the input section reaches the predetermined number of times within the predetermined time. That is, if the number of changes in the movement input using the input section is counted within the predetermined time, and the counted number reaches "the predetermined number of times", the bonding between a selected object and another virtual object may be released. "The predetermined number of times" may be a certain value set in advance by the game creator, or may be a value that changes during the game, or may be a value set by the user.

Not only by the method for counting the number of changes in the movement input using the input section within the predetermined time, but also by another method, it may be determined whether or not the release condition is satisfied. For example, a value regarding the movement input using the input section within the predetermined time (e.g., an angle indicating an input direction) may be accumulated, and if the accumulated value reaches a predetermined value, the release condition may be satisfied. Also in such a case, the greater the number of changes in the movement input using the input section within the predetermined time is, the more likely the release condition is satisfied.

In the exemplary embodiment, the greater the number of changes in a movement input using a third input section (the analog stick 52) within the predetermined time is, the more likely it may be determined that the release condition is satisfied. The greater the number of changes in a movement input using a fourth input section (the angular velocity sensor) within the predetermined time is, the more likely it may be determined that the release condition is satisfied. If the movement inputs to both the third input section and the fourth input section are provided within the predetermined time, it may be more likely that it is determined that the release condition is satisfied than in a case where the movement input to one of the third input section and the fourth input section is provided. For example, when the number of changes in the movement input using the third input section reaches the predetermined number of times, it may be determined that the release condition is satisfied. When the number of changes in the movement input using the fourth input section reaches the predetermined number of times, it may be determined that the release condition is satisfied. In this case, when the total of the number of changes in the movement input using the third input section and the number of changes in the movement input using the fourth input section reaches the predetermined number of times, it may be determined that the release condition is satisfied, and the bonding between a selected object and another virtual object may be released. Consequently, it is possible to release the bonding between a selected object and another virtual object using two input sections, and if inputs to the two input sections are simultaneously provided, it is possible to quickly release the bonding.

(Variations)

While the exemplary embodiment has been described above, the exemplary embodiment is merely an example and may be modified as follows, for example.

For example, in the above exemplary embodiment, an assembled object is formed by bonding virtual objects 70 placed in the virtual space in advance. In another exemplary embodiment, however, the virtual objects 70 may not be placed in the virtual space in advance. For example, the virtual objects 70 may be accommodated in an accommodation area owned by the user character PC, a virtual object 70 in the accommodation area may be selected by an operation of the user, and the selected virtual object 70 may appear in the virtual space.

Aside from the virtual space where the user character PC and an enemy character appear, a different virtual space for generating an assembled object using a plurality of virtual objects 70 may be prepared. In this case, in the different virtual space, a plurality of virtual objects 70 are placed, and an assembled object is generated. If an assembled object is generated, the assembled object may appear in the virtual space where the user character PC and the enemy character appear.

In the above exemplary embodiment, the bonding object 78 indicating bonding positions is generated, and two virtual objects 70 are bonded to each other by pulling each other so that the bonding positions indicated by the bonding object 78 match each other. In another exemplary embodiment, for example, when two virtual objects 70 are at positions somewhat close to each other, a bonding command (e.g., the same operation as or a different operation from the above bonding instruction) may be able to be used, and in accordance with the execution of the bonding command, the positional relationship between the two virtual objects 70 is fixed (maintained) without the two virtual objects 70 pulling each other, thereby bonding the two virtual objects 70 to each other. That is, when the two virtual objects 70 are close to each other at a predetermined distance, the bonding command may be enabled, and in accordance with the execution of the bonding command, the positional relationship (the distance and the orientations of) between the two virtual objects 70 when the command is executed may be fixed, thereby bonding the two virtual objects 70 to each other. Between the two virtual objects 70, the above bonding object may or may not be present. The positional relationship between the two virtual objects 70 when the bonding command is executed may be corrected (e.g., the orientations may be adjusted), and the corrected positional relationship may be fixed.

In the above exemplary embodiment, preferential bonding portions BP are bonded to each other so that a normal vector at a preferential bonding portion BP on a selected object and a normal vector at a preferential bonding portion BP on another virtual object 70 are directed in opposite directions to each other. In another exemplary embodiment, the preferential bonding portions BP may be bonded to each other so that the normal vector at the preferential bonding portion BP on the selected object and the normal vector at the preferential bonding portion BP on the other virtual object 70 are directed in the same direction.

In the above exemplary embodiment, if a preferential bonding portion BP on a selected object and a preferential bonding portion BP on other virtual object 70 satisfy the first condition, the preferential bonding portions BP are bonded to each other. The first condition may not be limited to the above, and may be another condition. For example, the first condition may be any one of the conditions A to C, or may be a different condition. For example, the first condition may only need to be a condition under which the user does not feel discomfort about the bonding between preferential bonding portions.

If a preferential bonding portion BP on a selected object and a preferential bonding portion BP on another virtual object 70 do not satisfy the first condition, the two objects are bonded to each other at positions (the closest positions) where the selected object and the other virtual object 70 satisfy the second condition. In another exemplary embodiment, the positions where the second condition is satisfied are not limited to the closest positions.

In the above exemplary embodiment, if preferential bonding portions are set on both a selected object and another virtual object 70, the two preferential bonding portions are preferentially bonded to each other. In another exemplary embodiment, if a preferential bonding portion is set on either one of a selected object and another virtual object 70, the preferential bonding portion on the either one may be preferentially set as a bonding position, and a portion other than a preferential bonding portion on the other may be set as a bonding position.

In the above exemplary embodiment, a virtual object for forming an assembled object is selected, and a new virtual object is further bonded to the selected object. In another exemplary embodiment, a virtual object for forming an assembled object may be selected, and a new virtual object may be able to be bonded to a virtual object other than the selected object forming the assembled object.

In the above exemplary embodiment, a selected object is projected in three directions orthogonal to each other in the virtual space, and if another virtual object 70 is present in each of these directions, the image 71 of the selected object is generated on the surface of the other virtual object 70. In another exemplary embodiment, a selected object may be projected in a direction from the selected object to another virtual object 70, and the image 71 of the selected object may be generated on the surface of the other virtual object 70. In this case, for example, even if another virtual object 70 is not present immediately beside the selected object, and another virtual object 70 is present in an oblique direction from the selected object, the image 71 of the selected object is generated on the surface of the other virtual object 70.

In the above exemplary embodiment, in a case where a first virtual object is moved and bonded to a second virtual object, a collision determination between the two virtual objects is made. If, however, a bonding object is generated between the two virtual objects before a bonding instruction is given, the collision determination between the two virtual objects may not be made.

In the above exemplary embodiment, in a case where a first virtual object is moved and bonded to a second virtual object, an image of the first virtual object is projected onto the surface of the second virtual object. Such an image, however, may not necessarily need to be projected. In the above exemplary embodiment, the image of the first virtual object is projected in the up-down direction and the left-right direction orthogonal to the up-down direction. The directions of the projection, however, is not limited to these. The image of the first virtual object may not necessarily need to be projected in two directions. When the first virtual object is moved, the shadow of the first virtual object may not necessarily need to be generated.

In the above exemplary embodiment, in a case where a first virtual object is selected and bonded to a second virtual object, the first virtual object is displayed in a predetermined color, and an image of the first virtual object is also displayed in the predetermined color. In another exemplary embodiment, even if the first virtual object is selected, the first virtual object may be displayed in the original color. The image of the first virtual object may or may not be displayed in a color relating to the original color.

In the above exemplary embodiment, a virtual object in which a preferential bonding portion is set and a virtual object in which a preferential bonding portion is not set are present. In another exemplary embodiment, only a virtual object in which a preferential bonding portion is not set may be present, or only a virtual object in which a preferential bonding portion is set may be present.

In the above exemplary embodiment, using a predetermined direction based on a preferential bonding portion (a direction normal to the preferential bonding portion or a direction tangent to the preferential bonding portion), the orientation of at least either one of a first virtual object and a second virtual object is adjusted. In another exemplary embodiment, such an orientation adjustment may be made based not only on the normal direction or the tangent direction, but also on any direction. The orientation adjustment method may be any method. Such an orientation adjustment may not be made.

In the above exemplary embodiment, a bonding object is an object connecting bonding positions on two virtual objects. In another exemplary embodiment, a bonding object may be an object that indicates bonding positions on two virtual objects, but does not connect the bonding positions.

In the above exemplary embodiment, in accordance with a bonding instruction, two virtual objects 70 pull each other and are moved so that the moving distance of the lighter virtual object 70 is longer than that of the heavier virtual object 70. Another exemplary embodiment is not limited to such a movement form, and for example, the two virtual objects 70 may be moved by the same distance, regardless of the weights of the two virtual objects 70.

In the above exemplary embodiment, in a case where a selected object is selected, and if the operation of changing the direction of the user character PC (the direction of the virtual camera) is performed a predetermined number of times using the analog stick 52 as a bonding releasing operation, an object bonded to the selected object is detached, and the bonding between objects other than the selected object is maintained. In another exemplary embodiment, in a case where a selected object is selected (set), and the above bonding releasing operation is performed, an object bonded to the selected object may be detached, and the bonding between some or all of objects other than the selected object may also be released. That is, in a case where the bonding releasing operation (the operation of shaking the screen about the selected object) is performed, and if an object bonded to the selected object is detached, the bonding between objects other than the selected object may be released or maintained.

Further, while an object bonded to the selected object may be detached by an operation other than the above selection cancellation operation, the bonding between objects other than the selected object may be maintained.

For example, in a case where the operation of pressing a particular button is performed, or in a case where a predetermined touch operation on the touch panel is performed, bonding may be released. For example, if a particular button is pressed in the state where a selected object is selected, an object bonded to the selected object may be detached, and the bonding between objects that are not bonded to the selected object may be maintained. For example, if a particular button is pressed in the state where a selected object is selected, an object bonded to the selected object may be detached, and a part or all of the bonding between objects that are not bonded to the selected object may also be released.

In the above exemplary embodiment, a single virtual object included in an assembled object is selected as a selected object. In another exemplary embodiment, a plurality of virtual objects included in an assembled object may be able to be selected as selected objects. In a case where a plurality of virtual objects included in an assembled object are selected as selected objects, and an operation for releasing bonding is performed, another virtual object bonded to the plurality of selected objects may be detached. In this case, the bonding between the plurality of selected objects may be maintained, or the bonding between the plurality of selected objects may also be released. In a case where the entirety of an assembled object is selected, and an operation for releasing bonding is performed, the entirety or a part of the bonding of the assembled object may be released.

Further, the entirety of an assembled object may be selected as a selected object, and in accordance with a bonding instruction, another virtual object placed in the virtual space may be further bonded to the assembled object. In this case, the other virtual object may be bonded to any of a plurality of virtual objects included in the assembled object.

In the above exemplary embodiment, the bonding between a plurality of virtual objects 70 bonded to each other by a bonding object can be released. In another exemplary embodiment, a configuration may be employed in which the bonding cannot be released.

In the above exemplary embodiment, virtual objects included in an assembled object are selected as selected objects, the selected objects are moved, and another virtual object is further bonded to the assembled object in accordance with a bonding instruction. In the above exemplary embodiment, virtual objects included in an assembled object are selected as selected objects, and in accordance with a bonding releasing operation, an object bonded to the selected objects is detached. In another exemplary embodiment, an assembled object may be generated or bonding may be released by another method in addition to (or instead of) such methods for generating an assembled object and releasing bonding.

For example, as another method for generating an assembled object, if, first, a combining command is input by an operation of the user, and next, a selected object is selected, and further, a bonding instruction is given, another virtual object may be bonded to the selected object. The order of the input of the combining command, the selection of the selected object, and the bonding instruction is not limited to this. In a case where the selected object is selected in the state where the combining command is input, and even if the bonding instruction is not given, the other virtual object may be bonded to the selected object. In a case where the entirety of an assembled object is selected, and a combining command is input, and even if virtual objects included in the assembled object are not selected, another virtual object may be further bonded to the assembled object.

Further, as another method for releasing bonding, if, first, a bonding releasing command is input by an operation of the user, and next, a selected object is selected, and further, a separation instruction is given, the bonding between virtual objects included in an assembled object may be released. In this case, the above bonding releasing operation may be performed as the separation instruction. The order of the input of the bonding releasing command, the selection of the selected object, and the separation instruction is not limited to this. In a case where the selected object is selected in the state where the bonding releasing command is input, and even if the separation instruction is not given, the bonding may be released. In a case where the entirety of an assembled object is selected, and a bonding releasing command is input, and even if virtual objects included in the assembled object are not selected, the bonding of the entirety or a part of the assembled object may be released.

Further, the user character PC may have a virtual accommodation area where an item (e.g., a virtual bag, pouch, item box, or the like owned by the user character PC) can be accommodated. In the accommodation area, a material object that can be included in the above assembled object may be able to be accommodated. The accommodation area may be carried by the user character PC and displayed, or may not normally be displayed, and may be displayed in accordance with an operation of the user. In a case where the assembled object includes a virtual object (a material object) that can be accommodated in the accommodation area, and if a particular operation (e.g., the pressing of a particular button) is performed near the assembled object, the material object may be able to be accommodated in the accommodation area. In this case, in accordance with the pressing of the particular button, the bonding of the material object included in the assembled object may be released, and the material object may be accommodated in the accommodation area. For example, an assembled object including a virtual object 70X, a virtual object 70Y, and a virtual object 70Z is generated. In a case where the virtual object 70X and the virtual object 70Y are bonded to each other by a first bonding object, and the virtual object 70Y and the virtual object 70Z are bonded to each other by a second bonding object, and when the virtual object 70X is accommodated as a material object in the accommodation area in accordance with the pressing of the particular button, the bonding between the virtual object 70X and the virtual object 70Y is released, and the first bonding object is erased. Then, the virtual object 70X is accommodated as the material object in the accommodation area. On the other hand, the virtual object 70Y and the virtual object 70Z are not virtual objects that can be accommodated in the accommodation area, and therefore, the bonding between the virtual object 70Y and the virtual object 70Z is not released, and the second bonding object is not erased. Thus, the virtual object 70Y and the virtual object 70Z remain present as the assembled object in the virtual space. The material object (the virtual object 70X) accommodated in the accommodation area may be used to generate another assembled object.

In the above exemplary embodiment, bonding is released in accordance with a bonding releasing operation. Alternatively, bonding may be released not in accordance with the bonding releasing operation. For example, if a great force (a force exceeding a predetermined threshold) is applied in the direction in which virtual objects included in an assembled object separate from each other, the bonding between the virtual objects may be released.

The configuration of hardware for performing the above game is merely an example. Alternatively, the above game processing may be performed by any other piece of hardware. For example, the above game processing may be executed in any information processing system such as a personal computer, a tablet terminal, a smartphone, or a server on the Internet. The above game processing may be executed in a dispersed manner by a plurality of apparatuses.

The configurations of the above exemplary embodiment and its variations can be optionally combined together unless they contradict each other. Further, the above description is merely an example of the exemplary embodiment, and may be improved and modified in various manners other than the above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system, comprising: at least one processor and a memory coupled thereto, the at least one processor being configured to control the information processing system to at least:

place in a game space a plurality of virtual objects that can be moved in the game space and bonded to each other;

select, by a selection operation of a user, a first object among the plurality of virtual objects placed in the game space;

generate a bonding object indicating respective positions on the first object selected by the selection operation and a second object among the plurality of virtual objects;

in accordance with a bonding instruction from the user, bond the first object and the second object at the respective positions on the first object and the second object indicated by the bonding object; and in accordance with a movement of the selected first object or a change in an orientation of the selected first object in the game space before the bonding instruction is given, change the respective positions on the first object and the second object indicated by the bonding object.

2. The information processing system according to claim 1, wherein the at least one processor is further configured to control the information processing system to, if the first object moves, make a collision determination between the first object and the second object, and if the first object and the second object collide with each other, control a movement of at least either one of the first object and the second object.

3. The information processing system according to claim 1, wherein the at least one processor is further configured to control the information processing system to generate a projected image obtained by projecting the first object onto a surface of the second object.

4. The information processing system according to claim 3, wherein the at least one processor generates a first projected image obtained by projecting the selected first object in a first direction and a second projected image obtained by projecting the selected first object in a second direction orthogonal to the first direction.

5. The information processing system according to claim 3, wherein the at least one processor is further configured to control the information processing system to, based on a light source set in the game space, generate a shadow of the first object separately from the projected image.

6. The information processing system according to claim 3, wherein the selected first object is displayed in a predetermined color, and the projected image of the first object is displayed in the predetermined color.

7. The information processing system according to claim 1, wherein in each of the virtual objects, a preferential bonding portion that is more likely to be bonded than another portion is set.

8. The information processing system according to claim 7, wherein the at least one processor, if the preferential bonding portion on the first object and the preferential bonding portion on the second object satisfy a first condition, generates the bonding object indicating the preferential bonding portion on the first object and the preferential bonding portion on the second object, and if the preferential bonding portion on the first object and the preferential bonding portion on the second object do not satisfy the first condition, generates the bonding object indicating respective positions on the first object and the second object that satisfies a second condition.

9. The information processing system according to claim 7, wherein the at least one processor, if the preferential bonding portion on the first object and the preferential bonding portion on the second object satisfy a first condition, generates the bonding object indicating the preferential bonding portion on the first object and the preferential bonding portion on the second object, and if the preferential bonding portion is not set on at least one of the first object and the second object, generates the bonding object indicating respective positions on the first object and the second object that satisfies a second condition.

10. The information processing system according to claim 7, wherein the at least one processor, if the first object and the second object are bonded to each other at the preferential bonding portions on the first object and the second object, using a predetermined direction based on the preferential bonding portions, adjusts an orientation of at least either one of the first object and the second object, and bonds the first object and the second object to each other.

11. The information processing system according to claim 10, wherein the at least one processor, if the first object and the second object are bonded to each other at the preferential bonding portions on the first object and the second object, bonds the first object and the second object to each other so that directions normal to the preferential bonding portions are parallel to each other.

12. The information processing system according to claim 10, wherein the at least one processor, if the first object and the second object are bonded to each other at the preferential bonding portions on the first object and the second object, bonds the first object and the second object to each other so that a direction tangent to the preferential bonding portion on the first object and a direction tangent to the preferential bonding portion on the second object have a preset angle.

13. The information processing system according to claim 1, wherein the bonding object is an object connecting the position on the first object and the position on the second object.

14. The information processing system according to claim 1, wherein the at least one processor, in a state where the first object and the second object are bonded to each other, selects either one of the first object and the second object, generates the bonding object indicating respective positions on the selected either one virtual object and a third object among the plurality of virtual objects, and in accordance with a bonding instruction from the user, bonds the selected either one virtual object and the third object to each other at the respective positions on the selected either one virtual object and the third object indicated by the bonding object.

15. The information processing system according to claim 1, wherein a cover object that covers bonding positions on the bonded first object and second object is displayed.

16. The information processing system according to claim 15, wherein after the first object and the second object are bonded at the positions indicated by the bonding object, the bonding object stays as the cover object at the positions.

17. The information processing system according to claim 1, wherein after the first object and the second object are bonded to each other at the respective positions indicated by the bonding object, the bonding object stays in a certain range including the respective positions.

18. The information processing system according to claim 1, wherein the at least one processor in a case where the first object and the second object are bonded to each other, moves the first object and the second object to come close to each other and bonds the first object and the second object to each other.

19. The information processing system according to claim 16, wherein a weight is set for each of the plurality of virtual objects, and the at least one processor moves the first object and the second object so that a moving distance of a lighter object is longer than a moving distance of a heavier object.

20. The information processing system according to claim 1, wherein the at least one processor is configured to:

in accordance with the bonding instruction, generate an assembled object obtained by bonding the plurality of virtual objects;

detach at least any one of the virtual objects from the assembled object including the plurality of virtual objects;

based on the plurality of virtual objects forming the assembled object, calculate assembled object information regarding the assembled object and store the assembled object information;

based on the assembled object information, control an action of the assembled object, and every time the virtual objects are bonded to each other, calculate and store the assembled object information, and every time the virtual object is detached from the assembled object, calculate and store the assembled object information.

21. A non-transitory computer-readable storage medium having stored therein an information processing program executed by a computer of an information processing apparatus, the computer being configured to:

place in a game space a plurality of virtual objects that can be moved in the game space and bonded to each other;

select, by a selection operation of a user, a first object among the plurality of virtual objects placed in the game space;

generate a bonding object indicating respective positions on the first object selected by the selection operation and a second object among the plurality of virtual objects;

in accordance with a bonding instruction from the user, bond the first object and the second object at the respective positions on the first object and the second object indicated by the bonding object; and in accordance with a movement of the selected first object or a change in an orientation of the selected first object in the game space before the bonding instruction is given, change the respective positions on the first object and the second object indicated by the bonding object.

22. An information processing method executed by an information processing system, the information processing method comprising:

placing in a game space a plurality of virtual objects that can be moved in the game space and bonded to each other;

selecting, by a selection operation of a user, a first object among the plurality of virtual objects placed in the game space;

generating a bonding object indicating respective positions on the first object selected by the selection operation and a second object among the plurality of virtual objects;

in accordance with a bonding instruction from the user, bonding the first object and the second object at the respective positions on the first object and the second object indicated by the bonding object; and in accordance with a movement of the selected first object or a change in an orientation of the first object in the game space before the bonding instruction is given, changing the respective positions on the first object and the second object indicated by the bonding object.

23. An information processing apparatus comprising at least one processor, the at least one processor being configured to:

place in a game space a plurality of virtual objects that can be moved in the game space and bonded to each other;

select, by a selection operation of a user, a first object among the plurality of virtual objects placed in the game space;

generate a bonding object indicating respective positions on the first object selected by the selection operation and a second object among the plurality of virtual objects;

in accordance with a bonding instruction from the user, bond the first object and the second object at the respective positions on the first object and the second object indicated by the bonding object; and in accordance with a movement of the selected first object or a change in an orientation of the selected first object in the game space before the bonding instruction is given, change the respective positions on the first object and the second object indicated by the bonding object.

* * * * *